United States Patent
Jung et al.

(10) Patent No.: US 12,407,041 B2
(45) Date of Patent: Sep. 2, 2025

(54) IMMERSION COOLING BATTERY SYSTEM INTEGRATED WITH ENCLOSURE

(71) Applicant: INCELL CO., LTD., Gwangju (KR)

(72) Inventors: Chang Kwon Jung, Gwangju (KR); Choung Yeol Seo, Seoul (KR)

(73) Assignee: INCELL CO., LTD., Gwangju (KR)

( * ) Notice: Subject to any disclaimer, the term of this patent is extended or adjusted under 35 U.S.C. 154(b) by 0 days.

(21) Appl. No.: 18/528,799

(22) Filed: Dec. 5, 2023

(65) Prior Publication Data
US 2024/0372173 A1 Nov. 7, 2024

(30) Foreign Application Priority Data

Apr. 28, 2023 (KR) .................. 10-2023-0056100
Nov. 10, 2023 (KR) .................. 10-2023-0155611
Nov. 20, 2023 (KR) .................. 10-2023-0160698

(51) Int. Cl.
*H01M 10/6567* (2014.01)
*H01M 10/613* (2014.01)
*H01M 50/209* (2021.01)
*H01M 50/24* (2021.01)

(52) U.S. Cl.
CPC ..... *H01M 10/6567* (2015.04); *H01M 10/613* (2015.04); *H01M 50/209* (2021.01); *H01M 50/24* (2021.01)

(58) Field of Classification Search
CPC .................. H01M 10/6567; H01M 10/6568
See application file for complete search history.

(56) References Cited

U.S. PATENT DOCUMENTS

| | | | | |
|---|---|---|---|---|
| 6,006,944 | A | * 12/1999 | Machledt | H01M 10/658 220/567.1 |
| 2010/0159317 | A1 | * 6/2010 | Taghikhani | B60L 50/64 429/120 |
| 2011/0027631 | A1 | * 2/2011 | Koenigsmann | H01M 10/6567 429/62 |

(Continued)

FOREIGN PATENT DOCUMENTS

| | | |
|---|---|---|
| JP | 2011124056 A | 6/2011 |
| JP | 2020095863 A | 6/2020 |

(Continued)

OTHER PUBLICATIONS

Korean Notice of Allowance mailed on Jun. 24, 2024.
Korean Non Final Office Action mailed on Apr. 23, 2024.

*Primary Examiner* — Maria Laios
*Assistant Examiner* — Jordan E Berresford
(74) *Attorney, Agent, or Firm* — You & IP, LLC

(57) ABSTRACT

Proposed is a stand-alone enclosure that integrates an immersion thermal management system and a battery. More particularly, proposed is an immersion cooling battery system integrated with an enclosure, which is a battery system integrated with an immersion method that complements various shortcomings of a battery system using the immersion method, thereby reducing production costs, simplifying manufacturing, easing maintenance and repair, enabling efficient thermal management, and securing high fire safety, wherein the battery system enables battery operation regardless of external environmental conditions and is designed to prevent surrounding environmental pollution due to leakage of a fluid, an immersion cooling medium.

23 Claims, 42 Drawing Sheets

(56) References Cited

U.S. PATENT DOCUMENTS

| | | | |
|---|---|---|---|
| 2011/0229749 A1* | 9/2011 | Kim | H01M 10/486 |
| | | | 429/120 |
| 2014/0335381 A1* | 11/2014 | Krolak | H01M 10/0525 |
| | | | 429/50 |
| 2017/0064862 A1* | 3/2017 | Miyoshi | H01L 23/32 |
| 2020/0227796 A1* | 7/2020 | Miki | H01M 10/6556 |
| 2020/0406415 A1* | 12/2020 | Shimizu | B25F 5/008 |
| 2021/0210809 A1* | 7/2021 | Cheon | H01M 50/213 |
| 2021/0359360 A1* | 11/2021 | Haeusler | H01M 10/617 |

FOREIGN PATENT DOCUMENTS

| | | |
|---|---|---|
| KR | 1020130140249 A | 12/2013 |
| KR | 102009221 B1 | 8/2019 |
| KR | 1020220124218 A | 9/2022 |

* cited by examiner

A-A' section

IMMERSION COOLING BATTERY SYSTEM INTEGRATED WITH ENCLOSURE

CROSS REFERENCE TO RELATED APPLICATION

The present application claims priority to Korean Patent Application No. 10-2023-0056100, filed Apr. 28, 2023, and Korean Patent Application No. 10-2023-0155611, filed Nov. 10, 2023, the entire contents of which are incorporated herein for all purposes by this reference.

BACKGROUND OF THE INVENTION

Field of the Invention

The present disclosure relates generally to a stand-alone enclosure that integrates an immersion thermal management system and a battery. More particularly, the present disclosure relates to an immersion cooling battery system integrated with an enclosure, which is a battery system integrated with an immersion method that complements various shortcomings of a battery system using the immersion method, thereby reducing production costs, simplifying manufacturing, easing maintenance and repair, enabling efficient thermal management, and securing high fire safety, wherein the battery system enables battery operation regardless of external environmental conditions and is designed to prevent surrounding environmental pollution due to leakage of a fluid, an immersion cooling medium.

Description of the Related Art

Electrical energy is used in various fields, but due to the depletion of fossil energy sources that generate electric energy, policies to reduce greenhouse gas emissions, and various environmental regulations, policies to use infinite new and renewable energy that are more environmentally friendly and are not depleted are being encouraged. However, due to the nature of renewable energy, continuous and stable energy supply cannot be guaranteed.

Energy storage systems (ESS) have the advantage of complementing the intermittency of renewable energy, and have been growing rapidly in recent years along with the development of battery technology, and this trend is expected to continue.

In response to these market demands, continuous technological development is taking place in an energy storage system to improve energy density, efficiency, safety, and economic feasibility. Among the various types of batteries, lithium-ion batteries, which are electrochemical batteries, are the most widely used in the energy storage system due to their high energy density and economic efficiency. However, such an energy storage system is relatively sensitive to temperature, and thus if the energy storage system is operated for a predetermined period of time beyond an appropriate temperature range, the energy storage system may be overheated locally or threatened in performance and safety due to the increase of a temperature difference between batteries. Accordingly, the energy storage system requires an appropriate thermal management system.

The battery of an energy storage system generates heat in charging and discharging processes. When the heat generated is excessive, the heat may accelerate the deterioration of the battery, and the battery deterioration causes damage to the internal components of the battery, which is a direct cause of fire. Therefore, the effective control of the heat of the battery is very important in terms of battery life and safety.

Methods for controlling the heat of a battery include air cooling, water cooling, and immersion cooling. Air cooling, which uses air as a cooling medium, circulates air through natural or forced convection to decrease the heat of a battery. Air cooling is the most widely used as the simplest and most economical method of battery thermal management for applications that do not require high output. In the air cooling, due to circulating air, dust and moisture may enter the battery, and the low specific heat and density of air results in a low cooling performance.

The water cooling is an indirect cooling method that circulates a coolant around a battery through a cooling plate. The water cooling method mainly uses a mixture of water and ethyl glycol as a cooling medium, and has high cooling efficiency due to the high specific heat and density of the cooling medium. However, the water cooling has the disadvantage of increased complexity and cost compared to air cooling due to additional manufacturing processes, high manufacturing difficulty, risk of a short circuit due to leakage of a conductive cooling medium, and need for additional devices for cooling medium heat exchange.

The immersion cooling is a method of cooling a heat source by direct contact of the heat source with a fluid by fully or partially immersing the heat source in the fluid, which is a cooling medium. A fluid used for immersion cooling includes mineral oil, synthetic oil, silicone oil, biodegradable vegetable oil, etc., which have insulating properties and high thermal safety.

The immersion cooling method began to be partially used a decade ago in data centers or cryptocurrency mining farms that use IT devices that generate large amounts of heat. Recently, cases of applying the immersion cooling method as a battery thermal management system for EVs have begun to appear. In particular, in the case of batteries applied to high-performance cars or special vehicles requiring high output, the batteries are discharged at high C-rates to shorten charging and discharging time and enable instantaneous high-mobility, thus generating a lot of heat. Accordingly, it is difficult to control the heat of a battery even with an existing thermal management system using the water cooling, so there is an attempt to use the immersion cooling method that directly controls the heat of the battery by filling a battery module with a di-electric fluid.

A di-electric fluid used as a cooling medium contacts a heat source directly to have a large heat dissipation area, has a heat energy absorption capacity of more than 1,000 times than that of air, and has excellent cooling efficiency, so the di-electric fluid can effectively control the temperature of a battery. The heated fluid can be cooled through a heat exchanger and returned to the battery to circulate, thereby maximizing a cooling effect.

In addition, even when thermal runaway occurs in a battery, a di-electric fluid can quickly disperse heat energy to surroundings due to the high heat transfer capability and high flash point of the fluid and eliminate local hot spots. In addition, in a state in which the battery is immersed in the fluid, a combustion condition is limited by a lack of surrounding oxygen, eliminating the possibility of combustion even if thermal runaway occurs, thereby securing excellent fire safety.

However, the research and development on a battery system using the immersion cooling method is mostly focused on EV batteries. Battery cells are cooled by filling the inside of a battery module, which is a casing that accommodates the battery cells, with a di-electric fluid, or for more effective cooling, a device to cool and circulate heated fluid through an external circulation loop formed by connecting the modules with manifolds and piping may be added.

However, the immersion design of the module, in which the module is filled with a fluid, requires a high degree of sealing of the module, which requires the production of a special module case and the use of expensive connectors. In particular, a typical energy storage system follows the format of stacking a plurality of modules that accommodate battery cells in a cabinet to increase a system capacity per unit area. At this time, the number of the connectors increases proportionally to the number of the modules, so an increase in manufacturing costs cannot be avoided. In addition, depending on the quality of the assembly, as the number of connectors increases, potential leakage points increase, which may cause maintenance to be difficult.

A fluid reservoir may be required to accommodate pressure changes due to thermal expansion and contraction of a fluid, and when thermal runaway occurs in battery cells, the inside of a sealed battery module becomes overpressured, and thus to prevent structural damage to internal devices or a module casing, a pressure relief safety device is required. However, the safety devices cannot prevent fluid leaks that occur with pressure.

When a portion of the body of battery cells inside the module is exposed and partially immersed in a fluid due to the escaping of the fluid, a thermal runaway phenomenon may instantly spread to the surroundings due to a thermal shock transmitted directly to surrounding battery cells, so the partial immersion of the battery cells is not preferable in terms of safety from a fire. To avoid this, the volume of the module may be increased to maintain complete immersion of the battery cells even if a certain amount of fluid leakage occurs, but this is not preferable in terms of space efficiency.

In a typical energy storage system composed of a plurality of modules, the modules filled with a fluid, which is a cooling medium, are connected to each other by using pipes to form a circulation loop that moves the fluid to the outside. Due to this configuration, refilling or draining a fluid during installation or maintenance is very cumbersome, there is a high risk of worker injury due to a leaked fluid on the floor during work, and cleaning work at an installation site separately after the installation may be additionally required. Accordingly, during installation or maintenance, a separate means is required to prevent fluid leakage or to ensure that work is not affected even if fluid leakage occurs. In particular, a typical di-electric fluid does not decompose naturally and may cause pollution to the surrounding environment, so a separate means to prevent fluid leakage is required.

Accordingly, on the basis of this background technology, it became necessary to provide a battery system using immersion cooling method and an enclosure to accommodate the battery system.

In other words, the battery system of the present disclosure can be applied to effectively control the heat of batteries used in various fields, not just batteries for an ESS.

SUMMARY OF THE INVENTION

Accordingly, the present disclosure has been made keeping in mind the above problems occurring in the related art, and the present disclosure is intended to propose an immersion cooling battery system integrated with an enclosure, in which the battery system may include a battery module configured to accommodate a plurality of battery cells and having a plurality of openings arranged therein so that the entry and exit of a fluid is free, a fluid in which the battery module is immersed to control the heat of the battery cells to be cooled, wherein the fluid has di-electric properties and excellent thermodynamic properties, and a sealed immersion tank, which is an internal enclosure, filled with the di-electric fluid so that the battery module is submerged in the di-electric fluid. Even with this simple configuration, due to the high thermal energy absorption ability (specific heat times density) of a fluid, a much higher cooling effect can be achieved when a fluid is used as a cooling medium than when air is used. This method does not require a high degree of sealing of the module, and thus the design of a complicated casing is unnecessary and the use of special parts can be minimized, thereby facilitating manufacturing and assembly, economic feasibility, and simplifying installation and maintenance work.

In addition, the present disclosure is intended to propose an immersion cooling battery system integrated with an enclosure, in which an external circulation loop as a means of moving a fluid into an out of the immersion tank is formed, wherein the external circulation loop may include a heat exchanger that can exchange heat energy of a fluid, and an internal circulation loop provides a means to allow the fluid to pass, at an equal flow rate, through the inside of each module arranged inside the tank in a process in which the fluid is introduced into the tank and returned to the outside of the tank, so that the temperature of the battery is efficiently controlled and the reliability and efficiency of the battery system are increased by reducing a temperature difference between battery cells.

In addition, the present disclosure is intended to propose an immersion cooling battery system integrated with an enclosure, in which the immersion tank includes a free space configured to accommodate a fluid, a cooling medium which is expanded and contracted and a safety device to equalize pressure, wherein the safety device can function to prevent the inflow of external dust, dust, and moisture into the immersion tank. The immersion tank includes an upper-end cover which is usually closed and is opened when necessary, and a system that manages the battery is accommodated in a separate attached space located outside the immersion tank to easily separate the system from the fluid so as to increase the safety of the system.

In addition, the present disclosure is intended to propose an immersion cooling battery system integrated with an enclosure, in which when the battery system is installed outdoor, an external enclosure enclosing the immersion tank may be formed by coupling a plurality of reinforcement frames attached at predetermined positions around the immersion tank and external panels to define space between the external panels and the immersion tank, wherein the external enclosure and the immersion tank may include an insulation material in space defined therebetween and may take the form of a double-layered enclosure that can emergently store a fluid to prevent the fluid leaking from the immersion tank from escaping to the outside. The coupling of the reinforcement frames and external enclosure panels does not impair an insulation effect and does not affect the painting state of the external enclosure, thereby preventing the influence of the external environment (solar heat, and tornado, etc.) and the contamination of an installation site.

In addition, the present disclosure is intended to propose an immersion cooling battery system integrated with an enclosure, in which the battery system may include an explosion proof disk or a pressure relief valve provided on the upper end of the immersion tank, wherein the explosion proof disk or pressure relief valve as a safety device operates at a predetermined pressure to primarily protect internal facilities due to battery explosion and secondarily to prevent the risk of accidents from spreading to surrounding facilities due to the enclosure scattering. As described above, when the form of the double-layered enclosure is taken, to discharge pressure released by the explosion proof disk or the pressure relief valve to the outside of the enclosure, a safety device opened in one direction by the discharging pressure is provided on the upper end of the external enclosure or openings are formed in a side surface of the upper end of the external enclosure to discharge the pressure for safety from the explosion.

In order to achieve the above objectives, according to one aspect of the present disclosure, there is provided an immersion cooling battery system integrated with an enclosure, the battery system including: a battery module configured to accommodate a plurality of battery cells; a fluid having di-electric properties; an immersion tank, which is a battery enclosure, having space to accommodate the battery module, with the immersion tank being configured to completely immerse the battery module in the fluid by supplying the fluid into the immersion tank; a plurality of openings provided in an outer surface of the battery module so that the fluid is capable of flowing in and out of the battery module to be in direct contact with the battery cells; and an opening and closing upper-end cover located on an upper end of the immersion tank so that the battery module is introduced into the immersion tank.

The battery system may further include: circulation pipes constituting an external circulation loop formed outside the immersion tank to allow the fluid to enter the immersion tank and return to the outside of the immersion tank, wherein a circulation pump may be formed in the external circulation loop so that the fluid is circulated.

A heat exchanger located in a path of the external circulation loop may include a cooling part configured to cool the circulating fluid.

The heat exchanger may include a heating part configured to heat the circulating fluid.

The battery system may further include: an inlet distribution pipe formed on either an upper surface or a lower surface inside the immersion tank, with the inlet distribution pipe being configured to distribute the fluid introduced into the immersion tank by being discharged by the circulation pump discharges inside the immersion tank; and a suction pipe formed on one remaining surface corresponding to a moving direction of the introduced fluid, with the suction pipe being configured to suction the fluid inside the immersion tank and return the fluid to the circulation pump, wherein a plurality of holes of different sizes may be formed in series in each of the inlet distribution pipe and the suction pipe in a longitudinal direction thereof so that the fluid is distributed or suctioned at an even flow rate.

The battery system may further include: a porous panel formed on a lower surface inside the immersion tank and having a plurality of holes, the porous panel allowing the fluid in the immersion tank to be evenly distributed and moved inside the immersion tank.

A flow rate control device may be formed under the porous panel by slanting gradually toward a stop end of the flow rate control device from a start end thereof so that the fluid is distributed at an even flow rate.

The battery system may further include: a free space constituting an air layer of a predetermined depth defined in an inner upper part of the immersion tank; and a level gauge formed on an outer side surface of the immersion tank so that a position of a surface of the fluid in contact with a lower surface of the free space is checked from the outside without opening an immersion tank upper-end cover.

The battery system may further include: an explosion proof disk located on the immersion tank upper-end cover and opened at a predetermined pressure so as to protect the immersion tank and electrical devices in the immersion tank by rapidly discharging gas and pressure released due to failures of the battery cells.

According to one aspect of the present disclosure, the immersion cooling battery system includes: the battery module configured to accommodate the plurality of battery cells; the fluid having di-electric properties; an immersion tank, which is an internal enclosure, having space to accommodate the battery module, with the immersion tank being configured to completely immerse the battery module in the fluid by supplying the fluid into the immersion tank; the plurality of openings provided in an outer surface of the battery module so that the fluid is capable of flowing in and out of the battery module to be in direct contact with the battery cells; the opening and closing upper-end cover located on an upper end of the immersion tank so that the battery module is introduced into the immersion tank; a plurality of reinforcement frames attached at predetermined positions around the immersion tank to structurally reinforce the immersion tank; external enclosure bottom and side panels coupled to outer side surfaces of the reinforcement frames to define space between the panels and the internal enclosure; and an external enclosure configured to enclose the immersion tank.

The battery system may further include: an attached box located on a side surface of the external enclosure and attached to the external enclosure side panel, with the attached box being configured to accommodate a battery management system or other electrical protection devices; a level gauge configured to measure a level of a surface of the fluid in the immersion tank; an attached box access part provided on one surface of the attached box corresponding to an upper part of the external enclosure side panel to which the attached box is attached so that the attached box access part matches a free space constituting an air layer defined in an upper part of the immersion tank, with the attached box access part allowing a power cable and a communication cable coming from the immersion tank to access to an inside of the attached box; and a heat exchanger located on one side surface of the external enclosure in a path of an external circulation loop formed outside the immersion tank so that the fluid enters the immersion tank and returns to the outside of the immersion tank, with the heat exchanger being configured to exchange heat energy of the circulating fluid.

The battery system may further include: a plurality of lower openings provided in a bottom surface of the attached box so that cold outside air is introduced into the attached box through the lower openings to remove heat from an electrical device in the attached box; a plurality of louver-type upper side openings formed in an upper end of a side surface of the attached box so that air heated after exchanging heat energy is discharged out of the attached box; a mesh net provided on each of inner surfaces of the louver-type upper side openings and the lower openings to prevent introduction of external insects or foreign substances through the openings; and a rainwater inflow prevention partition provided slantingly along the inner surface of the louver-type upper side openings to block rainwater introduced inward through the louver-type upper side openings.

The battery system may further include: a drain pipe formed on a bottom surface of the immersion tank so as to drain the fluid accommodated in the immersion tank to an outside thereof; and a tank fitting configured to couple the drain pipe with an opening of the external enclosure bottom panel, wherein an open/close lock valve may be provided on an end of the drain pipe, and the drain pipe may protrude outward from the external enclosure through the opening of the external enclosure bottom panel formed at a position corresponding to the bottom surface of the immersion tank on which the drain pipe is formed.

The battery system may further include: a fueling device provided on the opening and closing upper-end cover of the immersion tank to supply the fluid into the immersion tank.

The battery system may further include: a removable external enclosure roof provided on an upper end of the external enclosure to allow access into the external enclosure.

The battery system may further include: an explosion proof disk provided on the opening and closing upper-end cover of the immersion tank, which opens at a predetermined pressure to quickly release gases and pressure resulting from the failure of the battery cells located inside the immersion tank, thereby protecting the immersion tank and its internal components.

The battery system may further include: a plurality of openings provided along a side surface of the external enclosure roof to discharge pressure and gas discharged from the explosion proof disk to the outside; a mesh net provided on an inner surface of the openings so as to prevent introduction of external insects or foreign substances through the openings; a rainwater inflow prevention partition provided slantingly along the inner surface of the openings so that rainwater introduced through the openings is prevented from being introduced inward; and a drain hole configured to discharge raindrops collected by being blocked by the rainwater inflow prevention partition to the outside of the external enclosure.

The battery system may further include: a hinge configured to couple one side surface of the external enclosure roof to the external enclosure side panel; a fixing plate provided on each of opposite side surfaces of the external enclosure; a bolt fixed on a surface of the external enclosure roof at a position corresponding to the fixing plate; a groove formed in the fixing plate along a path H through which the bolt moves while the external enclosure roof opens relative to the hinge; and a nut configured to compress the fixing plate by being coupled to the bolt and to slide along the groove of the fixing plate while the external enclosure roof is opened, wherein a force N is applied to the nut configured to compress the fixing plate so that the external enclosure roof is opened by pressure released from the explosion proof disk satisfies Equation 1 below.

The battery system may further include: gaskets sandwiched between the reinforcement frames and the panels, wherein the external enclosure constituting a double-layered enclosure may be formed by coupling the panels, the reinforcement frames, and the gaskets to each other by using screws, self-tapping screws, or nail guns as coupling members so that contact surfaces between the panels, the reinforcement frames, and the gaskets are compressed.

The battery system may further include: an insulation material accommodated in an empty space defined between the immersion tank and the outer enclosure panels to block introduction of external heat.

The battery system may further include: a pressure equalization device installed on a side wall of the immersion tank to match a free space defined as an air layer in an upper part of the immersion tank, with the pressure equalization device configured to equalize a pressure difference that occurs due to thermal expansion and contraction of the fluid, and a dehumidifier provided in the pressure equalization device to remove moisture from air introduced from the outside in the process of pressure difference equalization.

According to the embodiment of the present disclosure, battery modules that accommodate a plurality of battery cells are completely immersed in a di-electric fluid, which is a cooling medium, so that the battery cells inside the battery modules are in direct contact with the fluid to remove heat from the battery cells, and the immersion tank is provided to provide space that accommodates the plurality of battery modules and is filled with the di-electric fluid, wherein the di-electric fluid has more than 1,000 times the ability to absorb heat energy than air, thereby providing an excellent effect in battery thermal management even with the battery cells simply immersed in the fluid.

The battery system of the present disclosure includes an external circulation loop that receives the fluid from the inlet of the immersion tank, increases or decreases heat energy thereof, and circulates the fluid to return to the immersion tank, thereby enabling more efficient thermal control of batteries and more actively reducing a temperature difference between the batteries.

Compared to a module level immersion method, which fills the module with the di-electric fluid such as a cooling medium, a tank level immersion method, which fills the inside of the tank with the fluid as described above does not require a high degree of sealing in the module, and does not require pipe connection between modules for fluid movement and special connectors, thereby making manufacturing simple and inexpensive and significantly eliminating potential leakage points.

In addition, compared to the module level immersion method, in this tank level immersion method, a moving distance of a fluid inside the module is shorter, and the fluid moves uniformly in a flow direction inside the battery module, thereby improving thermal management efficiency.

In addition, the battery module, the di-electric fluid, the immersion tank, and the heat exchanger are integrated with each other to constitute one enclosure so that the moving distance of the fluid outside the immersion tank can be reduced and installation space can be decreased, thereby providing efficient maintenance.

In addition, the heat exchanger consists of the cooling part, the heating part, and the circulation pump, and quickly and accurately controls the temperature of the fluid, thereby optimizing a battery performance.

In addition, an attached space that accommodates power and communication cables, protection equipment, and BMS is provided outside the immersion tank to be separated from the fluid to realize stable management and protection. The attached space provides an important element that increases safety and efficiency in a complex battery system.

In addition, pipes are installed on the inner lower and upper surface of the immersion tank for inflow and outflow of the fluid and facilitate the circulation of the fluid, thereby maximizing heat exchange efficiency. Particularly, the fluid is distributed at an even flow rate by holes of different sizes formed in series in the pipes, thereby improving thermal management performance of the entire system.

In addition, in replacement of the pipe, the porous panel may be installed by corresponding to the lower surface of the immersion tank. A series of holes are formed in the porous panel, and thus the fluid is distributed at an even flow rate and moved. This allows the fluid to pass through each module at an even flow rate, thereby reducing a temperature difference between modules for stable management.

In addition, the flow rate control device is installed, thereby achieving a more efficient flow distribution effect. As an example of the flow rate control device, an inclined panel is installed under the porous panel to manage the fluid to move evenly to the upper part of the immersion tank, thereby maximizing the thermal management performance of the entire system. This configuration has the effect of efficiently distributing the fluid without installing pipes.

In addition, the pressure equalization device is installed in the immersion tank to accommodate pressure generated by the expansion and contraction of the fluid, and a path through which air moves is placed in the pressure equalization device and the dehumidifier is installed in the path so as to remove moisture from external air introduced into the tank, thereby protecting the insulation performance of internal electrical devices.

In addition, the free space constituting the air layer is provided in the upper part of the immersion tank to prevent the formation of excessive pressure in the immersion tank due to the expansion and contraction of the fluid, thereby increasing safety. In this case, the surface of the fluid in contact with the free space maintains a predetermined distance from a battery cell located on an uppermost end in the immersion tank so that the battery is maintained to be completely immersed in the fluid even if there is fluid loss, thereby increasing safety.

The level gauge is installed on the immersion tank, so that the level of the fluid and the state of fluid leak can be checked from the outside without directly looking inside the immersion tank, enabling efficient maintenance.

In addition, the plurality of reinforcement frames can surround the immersion tank for structural reinforcement, and panels are coupled to the outer side surfaces of a reinforcement frame and a reinforcement frame to define space between the panels and the immersion tank to form the external enclosure enclosing the immersion tank, which constitutes the double-layered enclosure. This configuration improves the stability and thermal efficiency of the overall structure and facilitates environmental management by preventing fluid leakage in an emergency.

In addition, the external enclosure panels and the reinforcement frames may be coupled to each other by welding or a gasket sealing. However, in the case of the welding, there may be problems such as difficulty in maintaining paint quality, the possibility of rust due to this, distortion of the panels due to thermal deformation, difference in welding quality depending on a worker's skill level, and heat intrusion from the outside to the inside along a welded surface. Accordingly, a gasket sealing method is more preferable and can improve the manufacturing quality and insulation performance of the structure.

In addition, insulation material is attached in space between the immersion tank and the external enclosure panels, thereby minimizing heat loss and improving energy efficiency.

In addition, in order to prevent a fluid leaking from the immersion tank from leaking to the outside, a pipe passing through the external enclosure panels uses a tank fitting to facilitate manufacturing and assembly, and the fueling device is installed on the upper end of the immersion tank upper-end cover to enable the supply of a fluid into the immersion tank without opening the immersion tank upper-end cover during installation or maintenance, thereby preventing the contamination of the fluid.

In addition, the explosion proof disk or a pressure relief valve opened at a predetermined pressure is installed on the upper end of the immersion tank, thereby protecting the overall structure from pressure of battery explosion. In addition, a roof facing the immersion tank upper-end cover is installed on the external enclosure and openings are formed in the side surface of the roof or the combination of the hinge to allow one surface of the roof to be opened and a fixing device allows internal pressure to be discharged to the outside in an emergency, thereby increasing safety.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The present disclosure as described above will be described in detail through the accompanying drawings and embodiments.

It should be noted that technical terms used in the present disclosure are merely used to describe specific embodiments and are not intended to limit the present disclosure. In addition, technical terms used in the present disclosure, unless specifically defined in a different way in the present disclosure, should be construed as generally understood by those skilled in the art to which the present disclosure belongs, but should not be interpreted in an excessively comprehensive or excessively reduced sense. In addition, if a technical term used in the present disclosure is an incorrect technical term that does not accurately express the idea of the present disclosure, it should be replaced with a technical term that can be correctly understood by those skilled in the art. In addition, general terms used in the present disclosure should be interpreted as defined in the dictionary or according to the context, but should not be interpreted in an excessively reduced sense.

In addition, as used in the present disclosure, singular expressions include plural expressions unless the context clearly dictates otherwise. In the present disclosure, terms such as "consists of" or "includes" should not be construed as necessarily including all of the components or steps described in the present disclosure, and some of the components or steps may not be included or additional components or steps may be included.

Hereinafter, preferred embodiments according to the present disclosure will be described in detail with reference to the accompanying drawings, but identical or similar components will be assigned the same reference numbers regardless of drawing symbols, and overlapping descriptions thereof will be omitted.

In addition, when explaining the present disclosure, if it is judged that a detailed description of the related known technology may obscure the gist of the present disclosure, detailed description thereof will be omitted. In addition, it should be noted that the accompanying drawings are only intended to make the idea of the present disclosure easier to understand, and the idea of the present disclosure should not be construed as limited by the accompanying drawings.

Figure 1A:
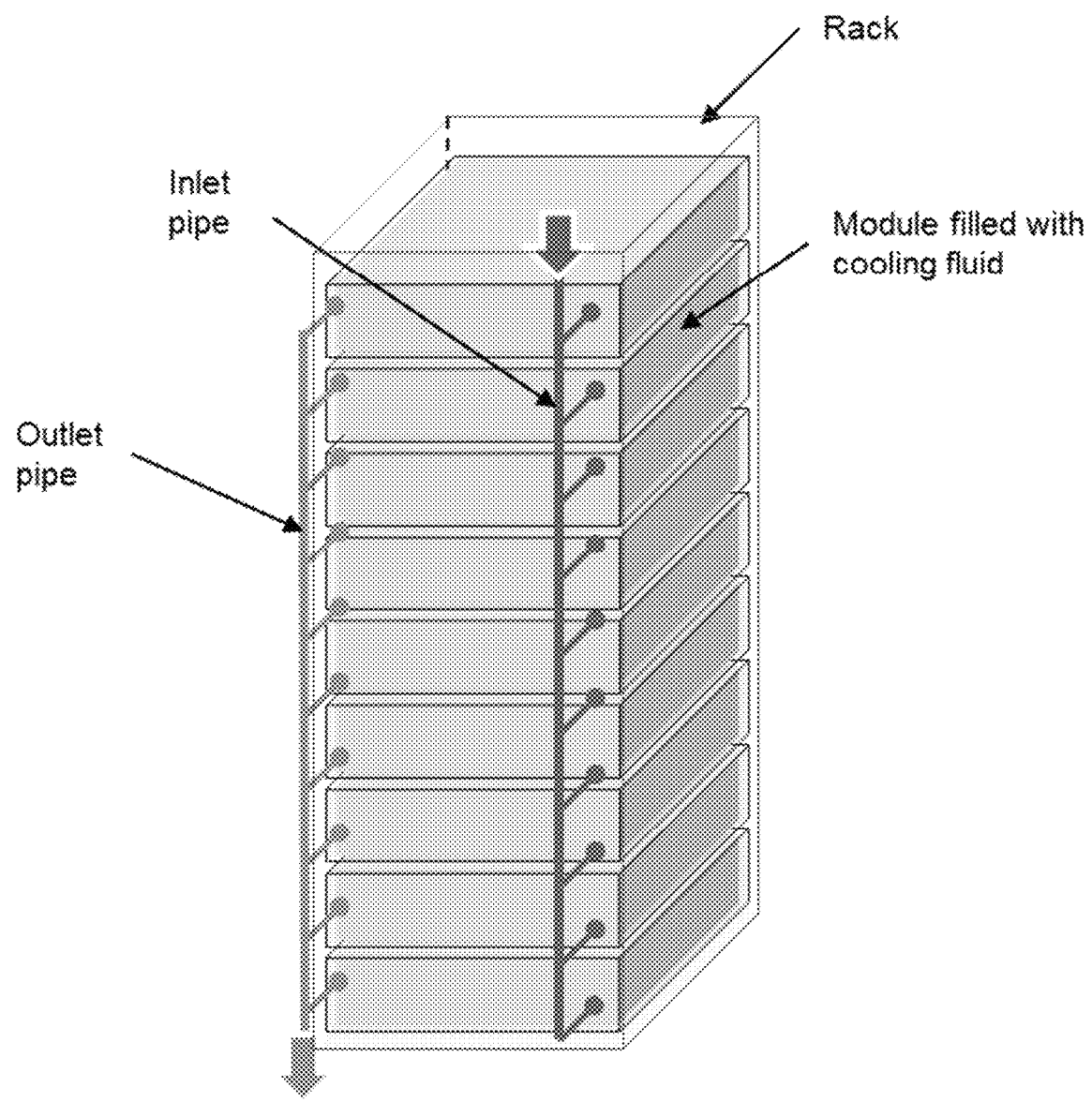
FIG. 1A is an example of applying an immersion method to a conventional rack-type battery system.
Figure 1B:
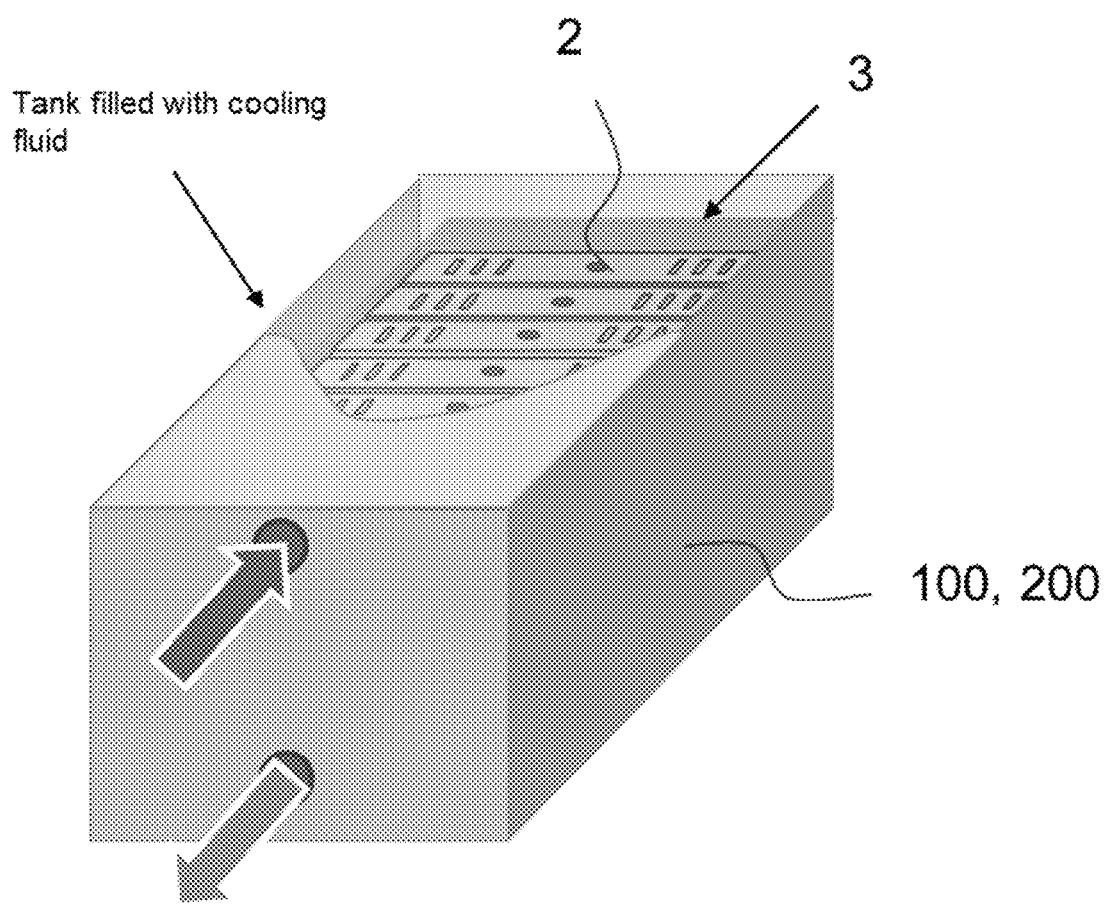
FIG. 1B is a view illustrating the concept of integrating a battery system integrated with an immersion method into a tank-type enclosure according to an embodiment of the present disclosure.

FIGS. 1A and 1B are views schematically illustrating a rack method and a tank method, respectively, which implement a battery system using an immersion cooling method.

As illustrated in FIG. 1A, a typical battery system structure is the form of a rack in which modules configured to accommodate battery cells are vertically stacked. This form has the advantage of increasing energy density per unit area, but in order to implement an immersion cooling method, the modules are required to be filled with a fluid, a cooling medium. To prevent fluid leakage, the modules filled with the fluid require a casing design for a high sealing degree and special connectors, and pipe connection between modules to move the fluid. Accordingly, potential leak points increases to complicate maintenance issues, and an overall vertical weight due to the weight of the modules increases. In addition, in order to circulate the fluid, the moving distance of the fluid moving from the outside through pipes between the modules increases, which is not efficient in terms of thermal management.

In order to compensate for these shortcomings, as illustrated in FIG. 1B, the battery system of the present disclosure uses the tank method in which an immersion tank 100, which is an internal enclosure, configured to accommodate the battery module 2 is filled with the cooling fluid 3 to completely immerse the battery module in the fluid, and thus the module does not require a high degree of sealing, thereby minimizing the number of parts and making manufacturing and assembly simple. Since the number of potential leak points is minimized, maintenance is easy, and a separate fluid reservoir for pressure control and circulation within the tank is not required, and the moving distance of the fluid outside the immersion tank 100 is short, increasing efficiency in terms of thermal management.

Accordingly, the battery system of the present disclosure includes the battery module 2 and the immersion tank 100 designed to effectively immerse the battery module 2 in the fluid 3 which is a cooling medium so as to maximize the cooling efficiency of a battery and minimize leakage points, thereby improving the safety and reliability of the entire battery system.

The battery system includes the immersion tank 100 and an external enclosure 200 surrounding the immersion tank 100, which constitute the structure of a double-layered enclosure, wherein in preparation for the leakage of a fluid which may occur the immersion tank 100, a protection function is provided to prevent the fluid from leaking to the outside, thereby having a function of storing the fluid 3 in preparation for fluid leakage in an emergency.

Figure 2A:
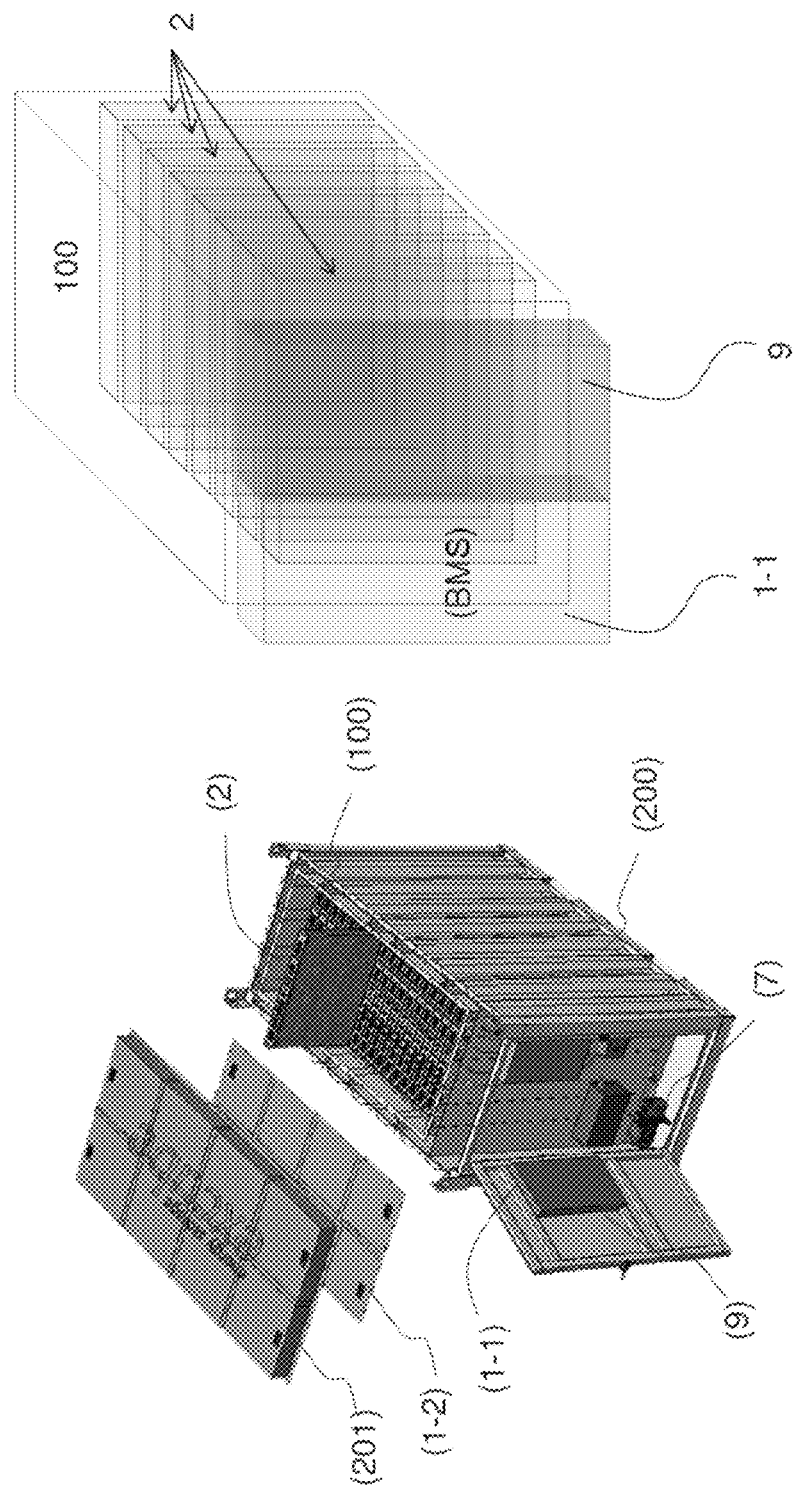
FIGS. 2A and 2B are views schematically illustrating the configuration of an immersion cooling battery system integrated with an enclosure according to the embodiment of the present disclosure.
Figure 2B:
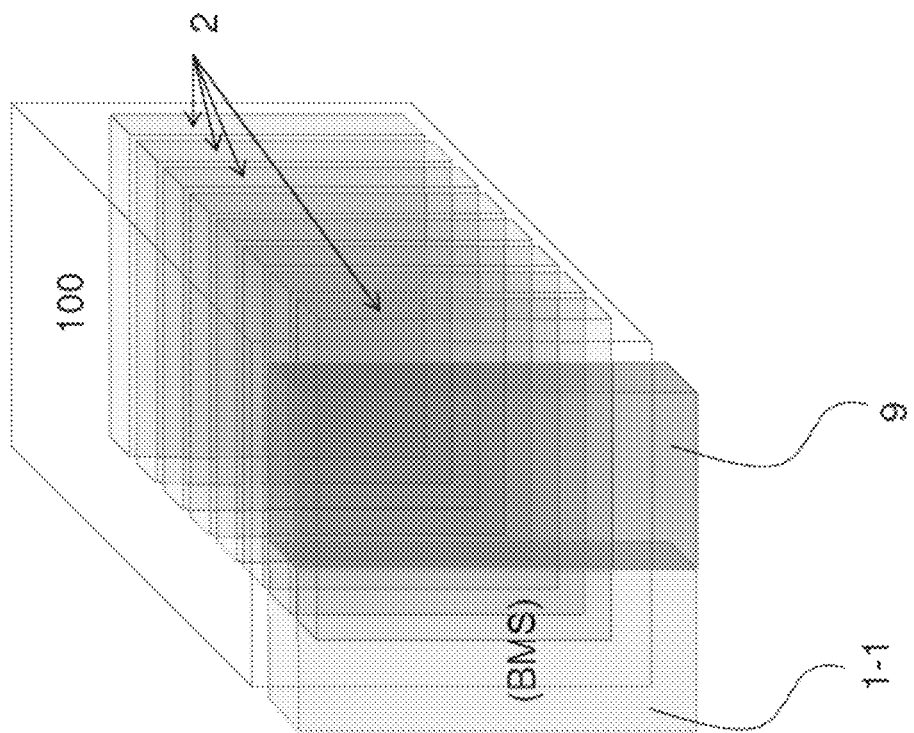
Figure 2B:
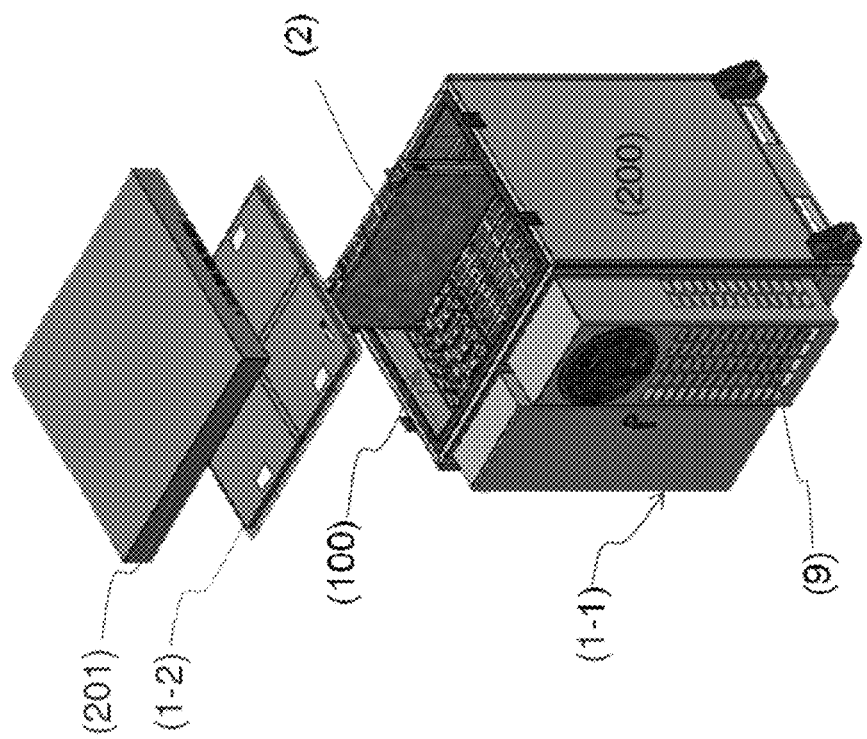

According to the present disclosure, FIGS. 2A and 2B illustrate the embodiment of the immersion cooling battery system integrated with an enclosure integrating the immersion tank, space accommodating a battery management system (BMS) and other electrical protection devices, and the heat exchanger in one space, and a rough spatial configuration diagram. The battery system includes an attached box 1-1 which is located on one side surface of the external enclosure and provides space to accommodate attached BMS or other electrical protection devices. The heat exchanger 9 is located in an external circulation loop to control the heat energy of a fluid introduced from the immersion tank 100 and then return the fluid to the immersion tank. In order to minimize the flow distance of a fluid moving outside, the heat exchanger is provided on one side of the external enclosure, thereby providing the enclosure accommodating the battery system integrated with the heat exchanger.

The heat exchanger 9 includes a cooling part and a circulation pump, and may include a heating part when required. The cooling part (not shown) cools the fluid, and the cooled fluid removes heat from a battery. The circulation pump 7 increases cooling efficiency by forcefully circulating the fluid. The heating part (not shown) heats a fluid to help a battery maintain optimal performance even in a low-temperature environment.

The heat exchanger 9 is integrated with the battery system and is accommodated in the enclosure having space to be integrated therewith, thereby decreasing system complexity, improving system efficiency, and providing ease of maintenance. Accordingly, the heat exchanger 9 optimizes the performance of the battery system, ensures a stable operation thereof under various operating conditions, and improves overall energy management efficiency.

The graphs of FIGS. 3A to 3F illustrate experiment results for checking the efficiency of the immersion cooling method and safety from a fire.

The graphs Of FIGS. 3A, 3B, 3C, and 3D are time history data that are the results of experiment to determine the effect of battery thermal control by immersion cooling and internal fluid circulation. A total of 10 battery modules were arranged side by side inside the tank, the tank was filled with a di-electric fluid, and the batteries were charged and discharged under three conditions.

A first condition is a simple immersion state in which the fluid did not circulate, a second condition is a state in which the fluid was forced to be circulated by using the circulation pump, and a third condition is a state in which the circulating fluid is cooled through the heat exchanger while the charging and discharging of batteries were performed.

For comparison, seven battery modules were stacked in a separate battery rack and then charged and discharged at the same C-rate while being cooled by a natural convection air cooling method.

In all experiments, the temperatures of the battery cell were measured at two different points per module, and were monitored for about 9 hours after charging and discharging were completed.

Figure 3A:
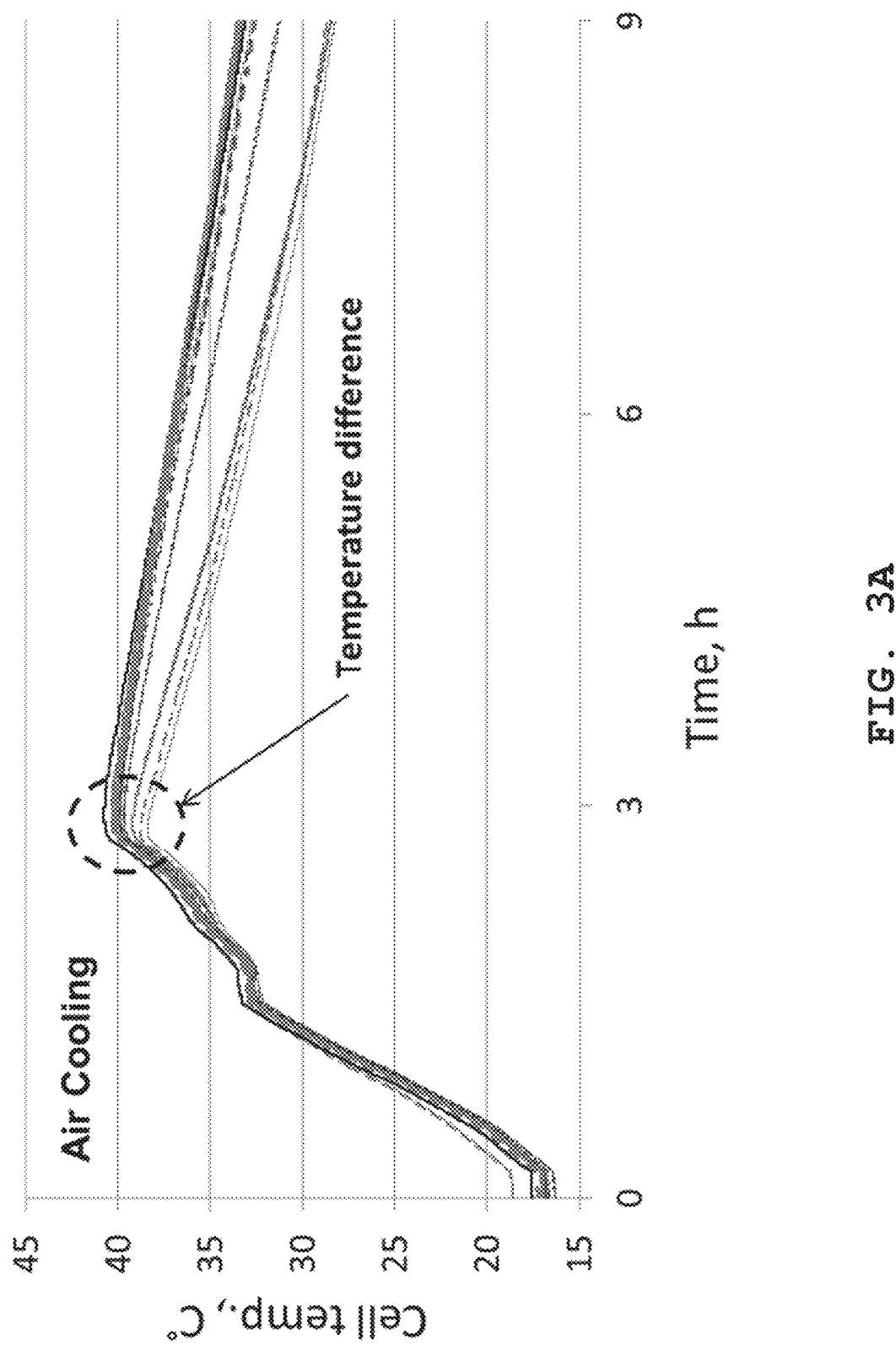
FIGS. 3A, 3B, 3C, and 3D are graphs of experimental data illustrating the cooling efficiency of an air cooling battery system and an immersion cooling battery system.
Figure 3B:
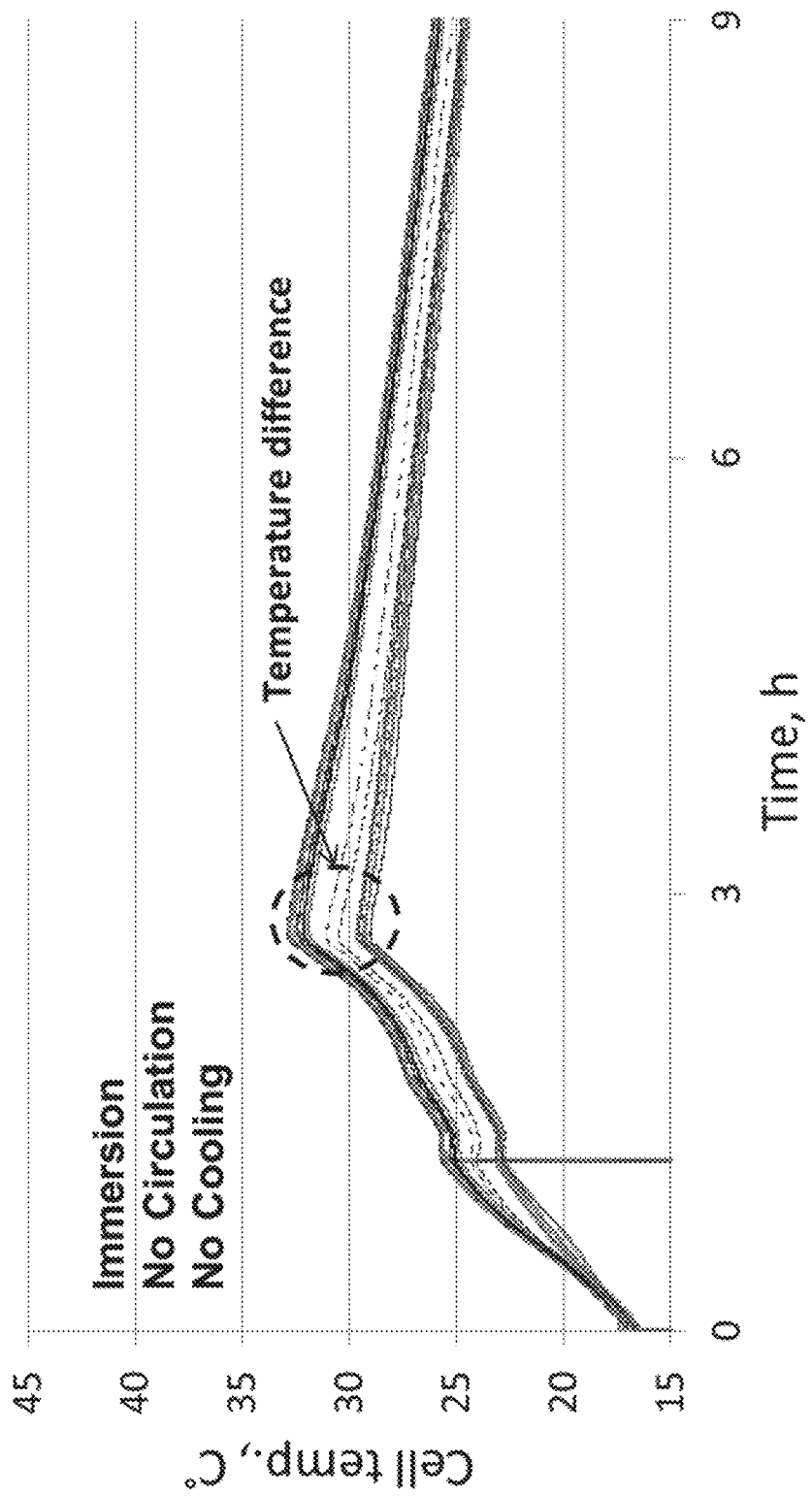
Figure 3C:
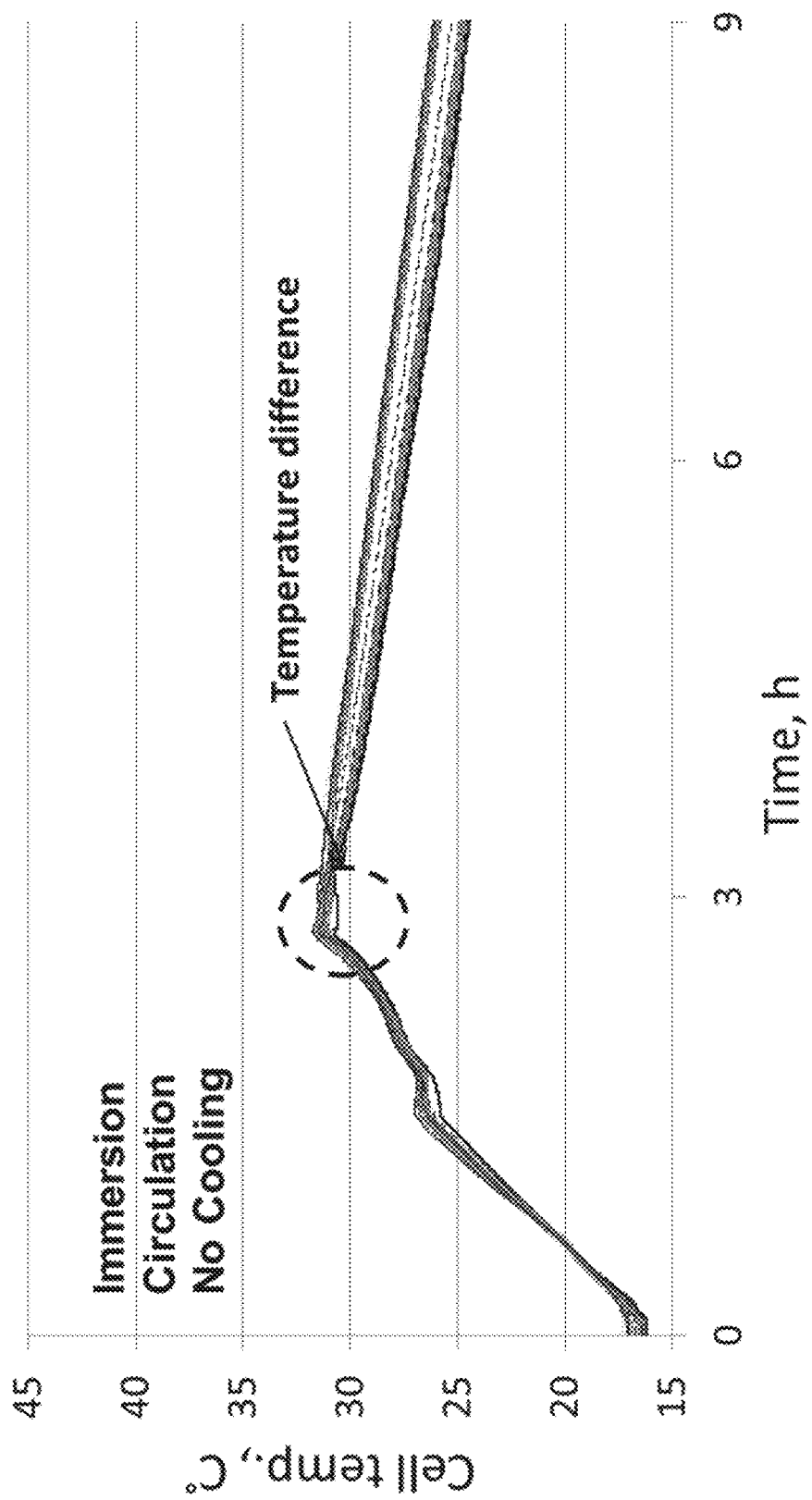
Figure 3D:
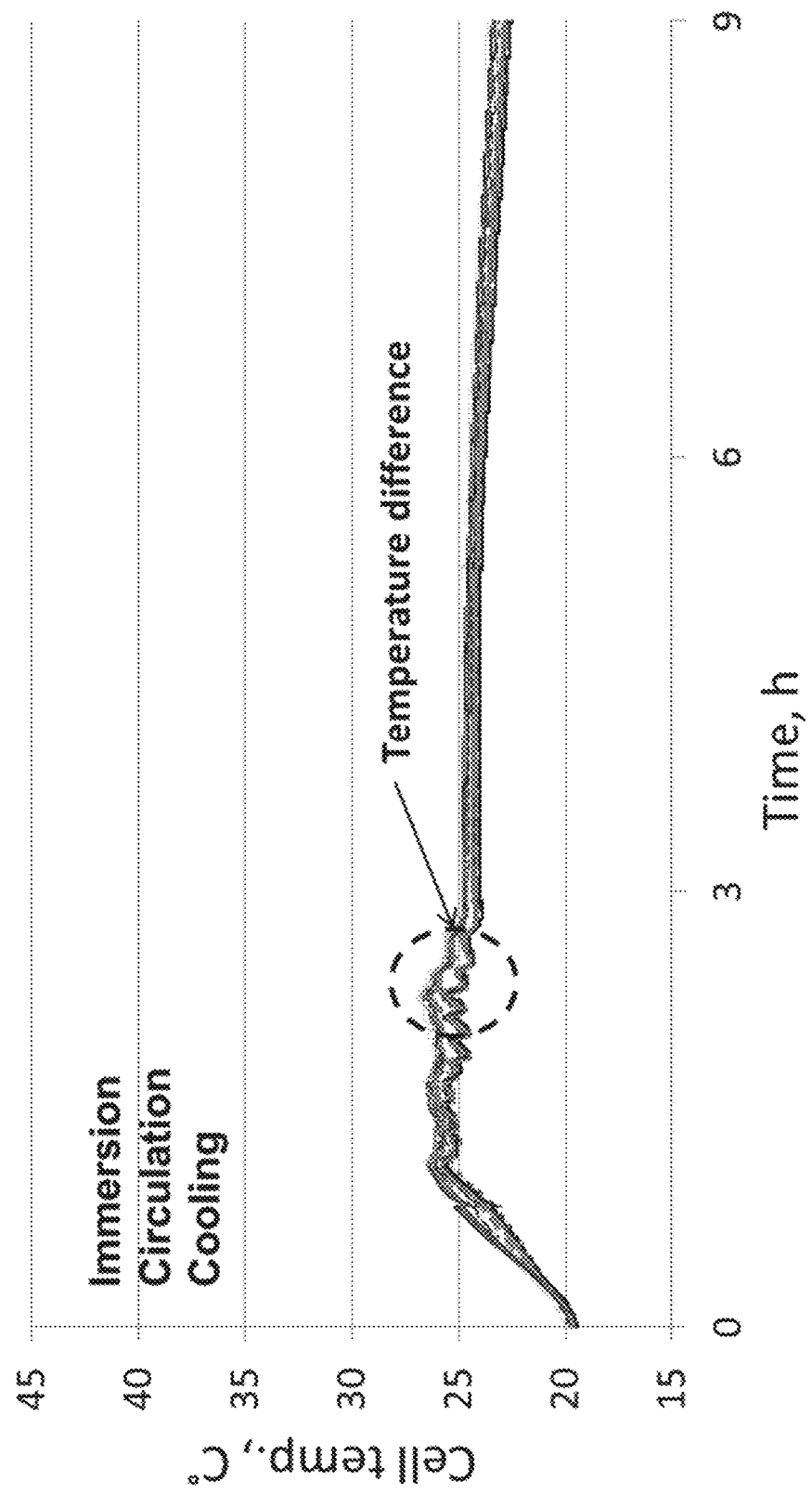

As illustrated in FIG. 3A, in the case of the natural convection air cooling method, the maximum temperature of a battery exceeded 40 degrees. However, in the case of the simple immersion state as illustrated in FIG. 3B, the maximum temperature of the battery was recorded in the low 30s. When circulating the fluid as illustrated in FIG. 3C, the maximum temperature of the battery was, on average, not significantly different from the simple immersion state, but a temperature difference between battery cells was greatly reduced. Lastly, when circulation and cooling through the heat exchanger were performed simultaneously as illustrated in FIG. 3D, the maximum temperature of the battery did not exceed 27 degrees, and a temperature difference between battery cells was also reduced even more than the cases of FIGS. 3A and 3B.

Therefore, a significant cooling effect can be achieved by simple immersion, and a temperature difference between batteries can be significantly reduced by the circulation of the fluid. When the fluid is cooled, it can be checked that a maximum battery temperature can be effectively controlled even in a high C-rate operation of a battery.

Among FIGS. 3A, 3B, 3C, 3D, 3E, and 3F, lower graphs and picture drawings are test specimens and results thereof for a fire safety evaluation experiment.

In a fire safety evaluation test, a specific battery cell is heated by an external power source to cause thermal runaway, and then it is checked whether the thermal runaway is propagated to surrounding cells. At a time point at which the thermal runaway occurs, the temperature of the battery cell rises rapidly, reaching an instantaneous maximum temperature of 600 degrees or more. Accordingly, by observing the body temperatures of the surrounding cells, it is possible to determine whether thermal runaway propagation has occurred.

Figure 3E:
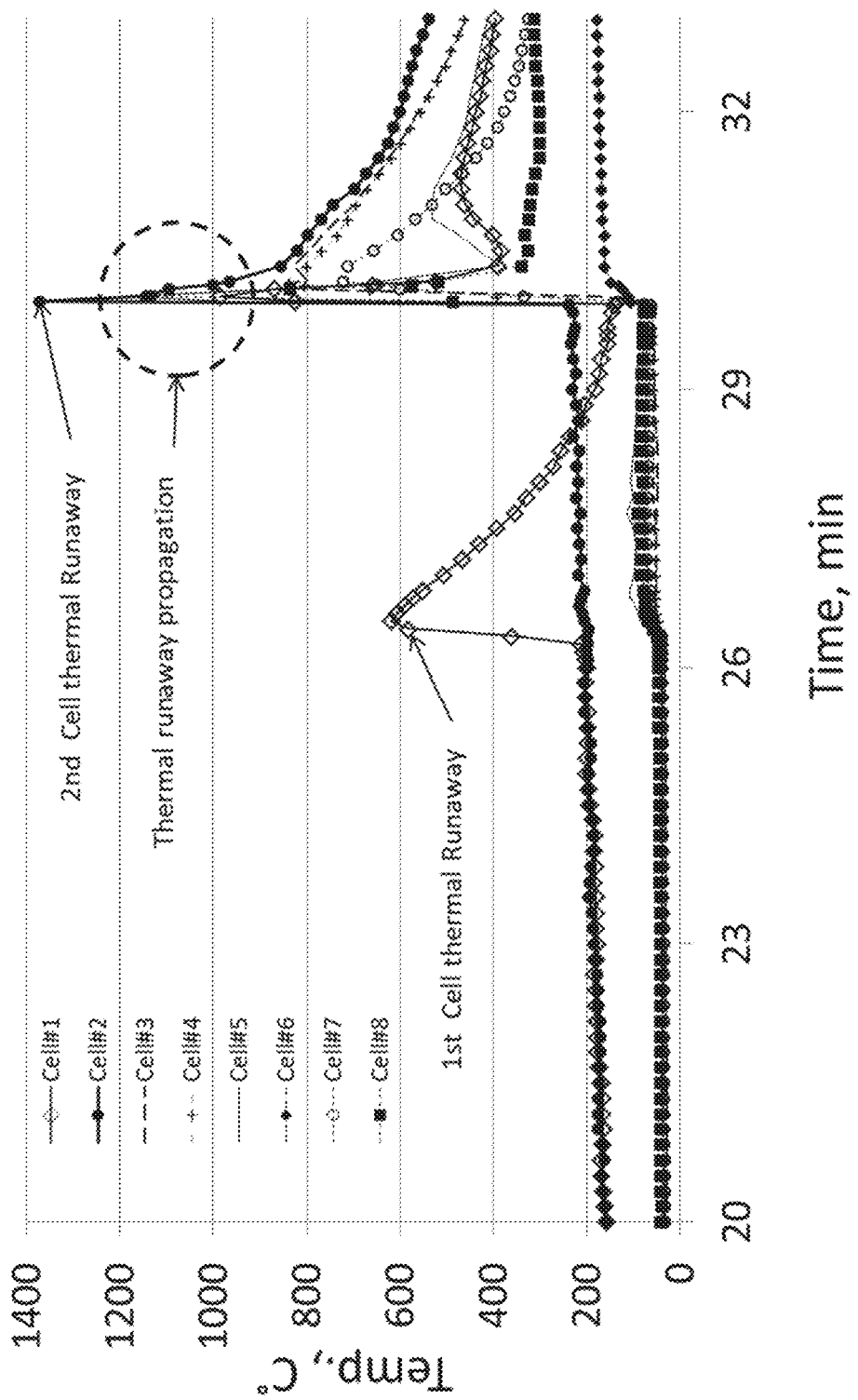
FIGS. 3E and 3F are graphs illustrating experimental data evaluating fire safety of the immersion cooling battery system.

As illustrated in FIG. 3E, in a first experiment, many battery cells were arranged vertically in a test chamber, the inside of the test chamber was completely filled with the fluid, and two predetermined adjacent battery cells were simultaneously heated, resulting in a first thermal runaway (over 600 degrees), and then when a second thermal runaway occurred, the body temperatures of surrounding battery cells also recorded high temperatures exceeding 800 degrees in an instant, which showed that the thermal runaway phenomenon had propagated to the surrounding battery cells. When the first thermal runaway occurred, a part of the fluid along with the pressure escaped to the outside of the chamber, and at this time, parts of the bodies of the remaining battery cells were exposed to the outside of the fluid. When thermal runaway occurred in a second cell, it was determined that surrounding cells were exposed to a high temperature, triggering thermal runaway propagation.

Figure 3F:
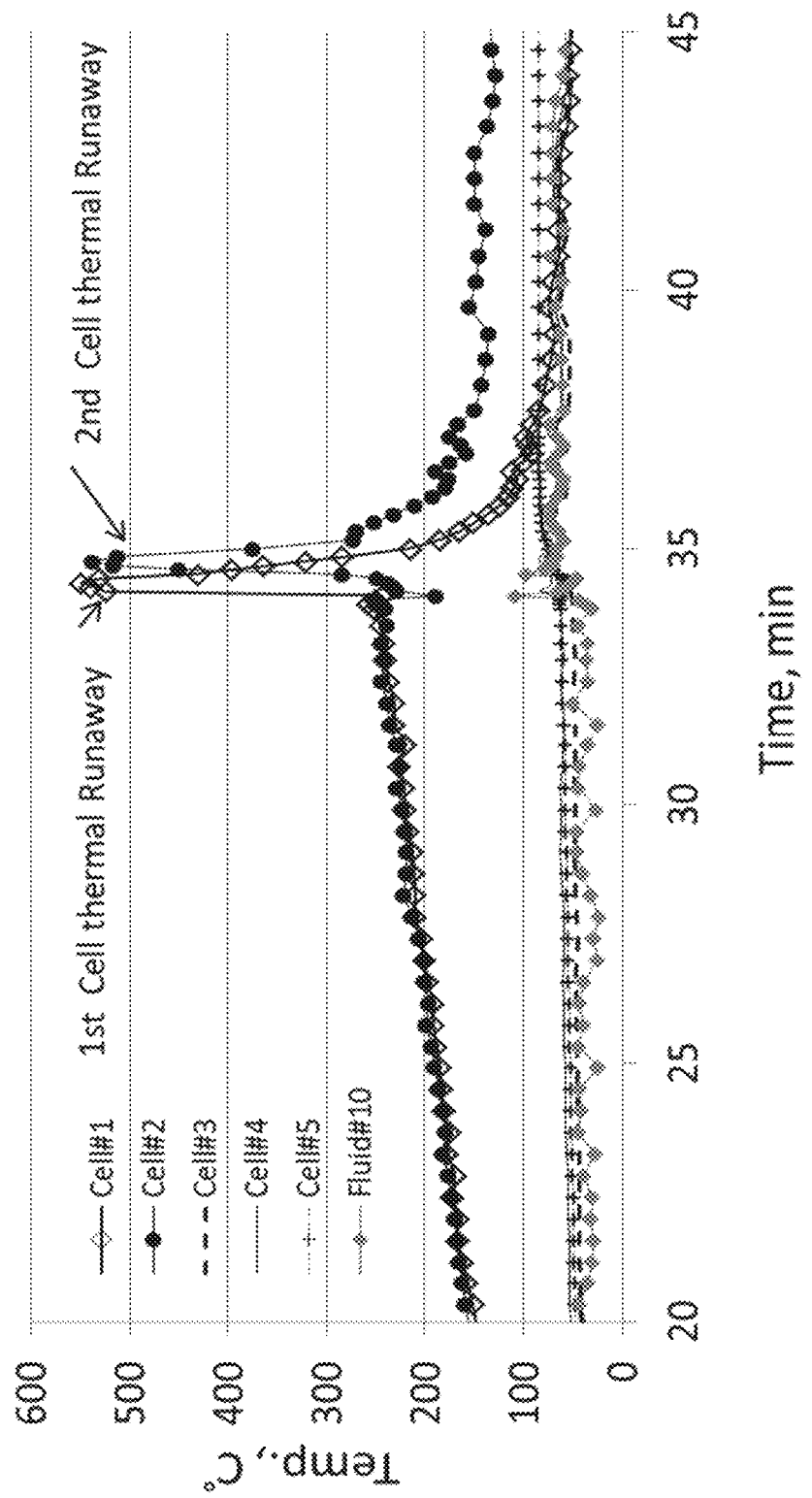

As illustrated in FIG. 3F, in a second experiment, the battery cells were arranged horizontally, and a predetermined distance was secured between the tops of the uppermost battery cells located uppermost and the top cover of the test chamber to ensure that the battery cells were fully immersed during the experiment, and the inside of the chamber was completely filled with the fluid. As a result of simultaneously heating two pre-designated adjacent battery cells, even while thermal runaway occurred in the designated cells, the body temperatures of the surrounding battery cells remained below 100 degrees and thermal runaway did not propagate. Even if a part of the fluid escaped to the outside during thermal runaway, the remaining battery cells remained completely immersed and were protected from thermal shock, indicating that thermal propagation did not occur.

The results of this experiment show that, as an important factor to consider in reducing the risk of fire, it is necessary to secure a predetermined distance between the surface level of the fluid and the top of the battery cells located uppermost and maintain a state of complete immersion even when the fluid is lost.

Figure 4A:
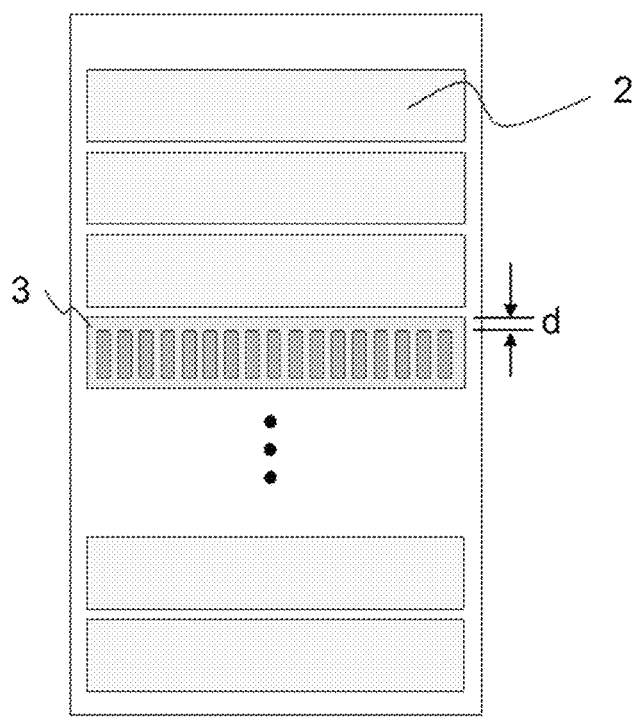
FIGS. 4A and 4B are views schematically illustrating the embodiment of the present disclosure to implement a safety distance d to increase fire safety.
Figure 4B:
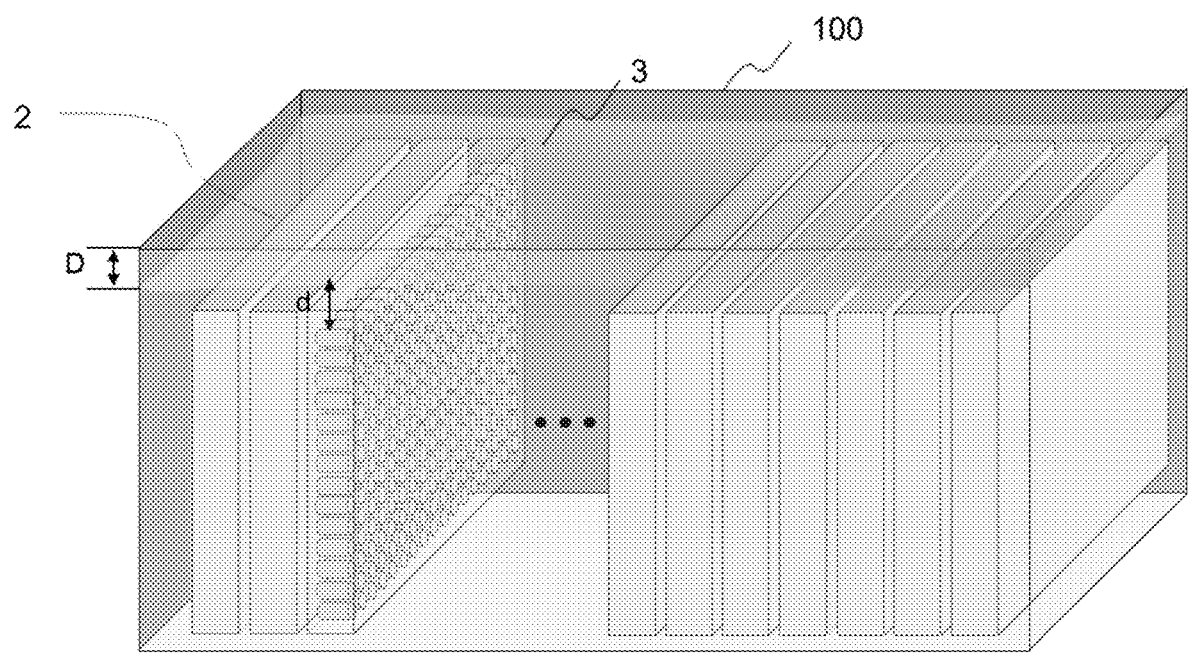

On the basis of fire safety evaluation experiment results of FIGS. 3E, and 3F, as illustrated in FIGS. 4A and 4B, it is important to increase fire safety by securing safety distance d between the surface of the fluid 3 and the battery cells located on the top end. As illustrated in FIGS. 4A and 4B, the safety distance d may be implemented in the rack method and tank method. However, as illustrated in 4A, in the case of the rack method, securing the predetermined distance d is difficult due to space constraints, and to solve this problem, the volume of the module is required to be increased, which is disadvantageous in terms of space efficiency. On the other hand, in the tank method, there is much spatial freedom in securing the predetermined length of safety distance d.

In addition, in the tank method, at the top of the immersion tank 100, a free space having an air layer of a predetermined depth D can be secured. The free space is very effective in preventing overpressure in the immersion tank due to the expansion and contraction of the volume of the fluid 3.

In the battery system of the present disclosure, in order to more effectively control the heat of batteries, the battery module 2 is designed to maintain a uniform flow of the fluid 3 so that the fluid 3 can cool battery cells inside the battery module at the same flow rate.

Figure 5:
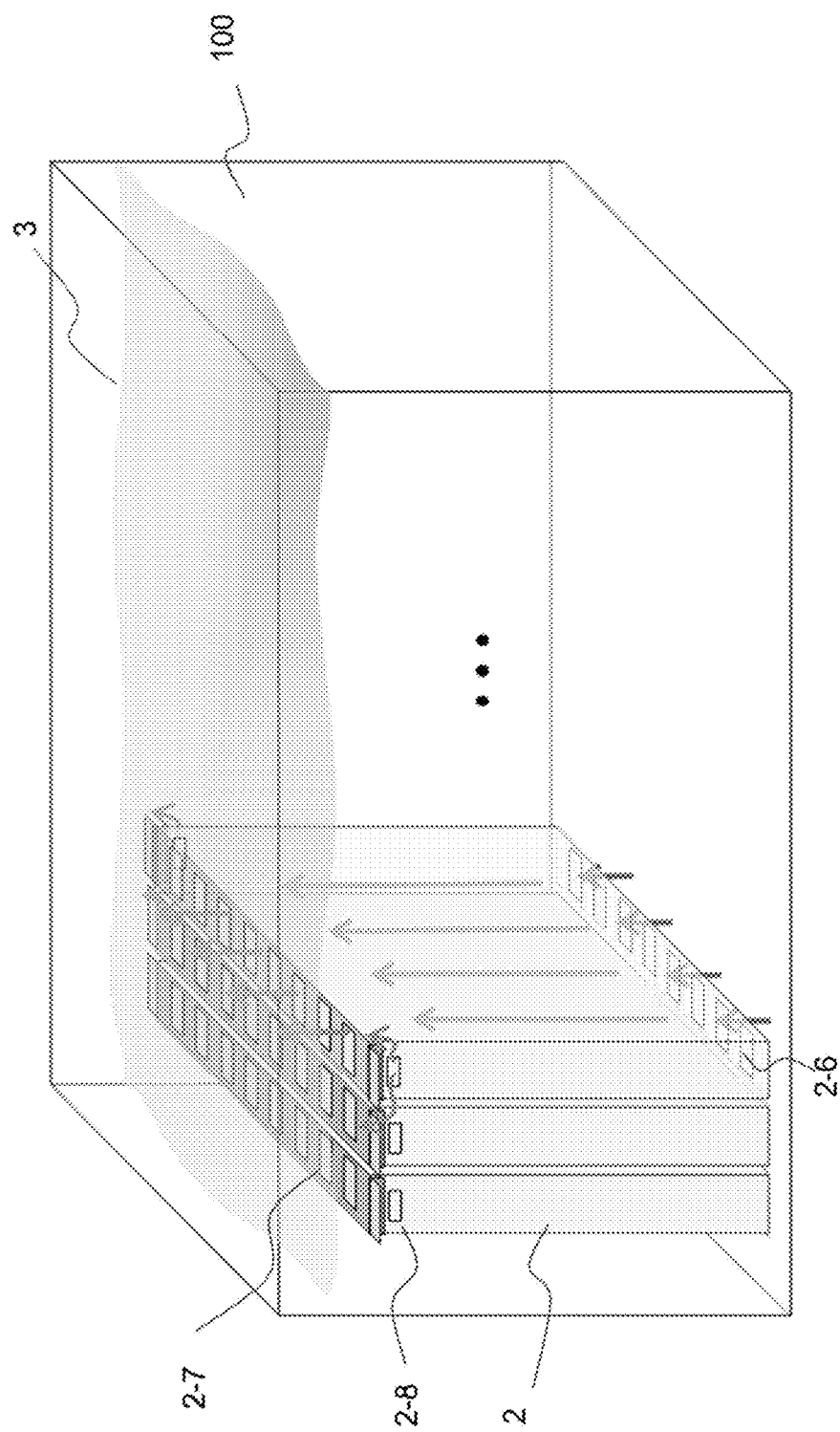
FIG. 5 is a view schematically illustrating the configuration of discharge holes of a battery module according to the embodiment of the present disclosure.

As illustrated in FIG. 5, in order to effectively remove heat from the battery module 2 according to the present disclosure, the fluid is evenly moved into and out of the battery module along with the flow direction of the fluid.

In the embodiment of the present disclosure, a plurality of first discharge holes 2-6 is formed in one of the opposite ends of the battery module 2. Each of the first discharge holes is an inlet through which the fluid enters the battery module 2, and serves to supply the fluid into the battery module 2 so that the fluid absorbs heat through direct contact with the battery cells and moves. The first discharge hole 2-6 is an important part of supplying the fluid to the battery module for the efficient cooling of the battery module.

The fluid 3 introduced into the battery module through the first discharge hole 2-6 moves upward from the lower part of the module and escapes through a plurality of second discharge holes 2-7 to the outside of the module. The second discharge hole 2-7 is formed by corresponding to the moving direction of the fluid introduced through the first discharge hole 2-6, and serves as an outlet for the fluid absorbing after passing through the battery module 2. The battery module 2 may further include a third discharge hole 2-8 formed on an upper side surface thereof.

Accordingly, this arrangement of the discharge holes allows the fluid to pass through the inside of the battery module evenly, minimize a main flow distance, effectively absorb internal heat, and transfer the heat to the outside of the battery module, thereby allowing the temperatures of battery cells inside the battery module to be effectively maintained more uniform.

In the battery system of the present disclosure, to control the evenness of heat of each battery module 2 accommodated in the immersion tank 100, a uniform flow rate of the fluid is maintained in a flowing direction inside the immersion tank 100 so that the cooling effect of the fluid can be equally applied to each module.

Figure 6A:
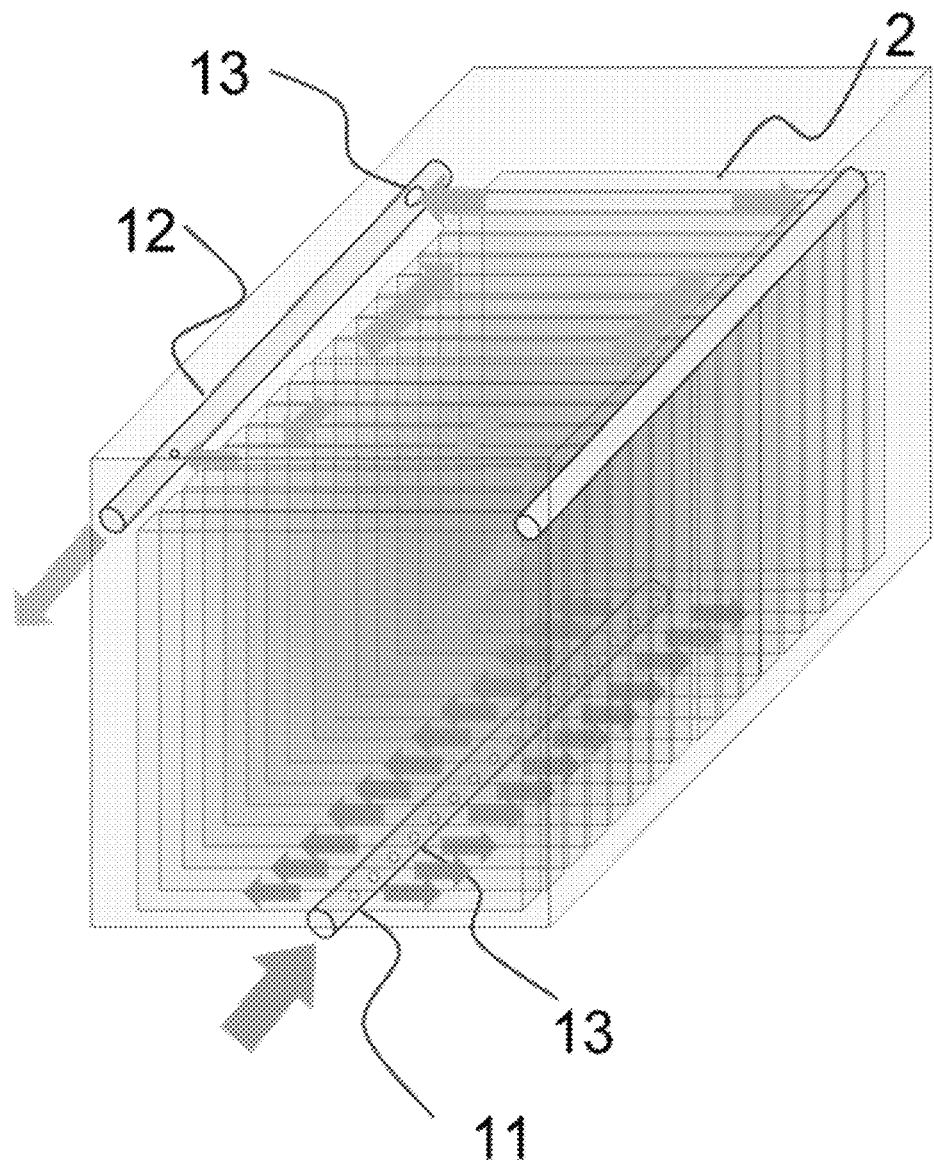
FIGS. 6A, 6B, and 6C are views schematically illustrating a fluid inlet distribution pipe and a fluid suction pipe configured inside an immersion tank, which is an internal enclosure, and a flow direction according to the inlet distribution pipe and suction pipe according to the embodiment of the present disclosure.
Figures 6B, 6C:
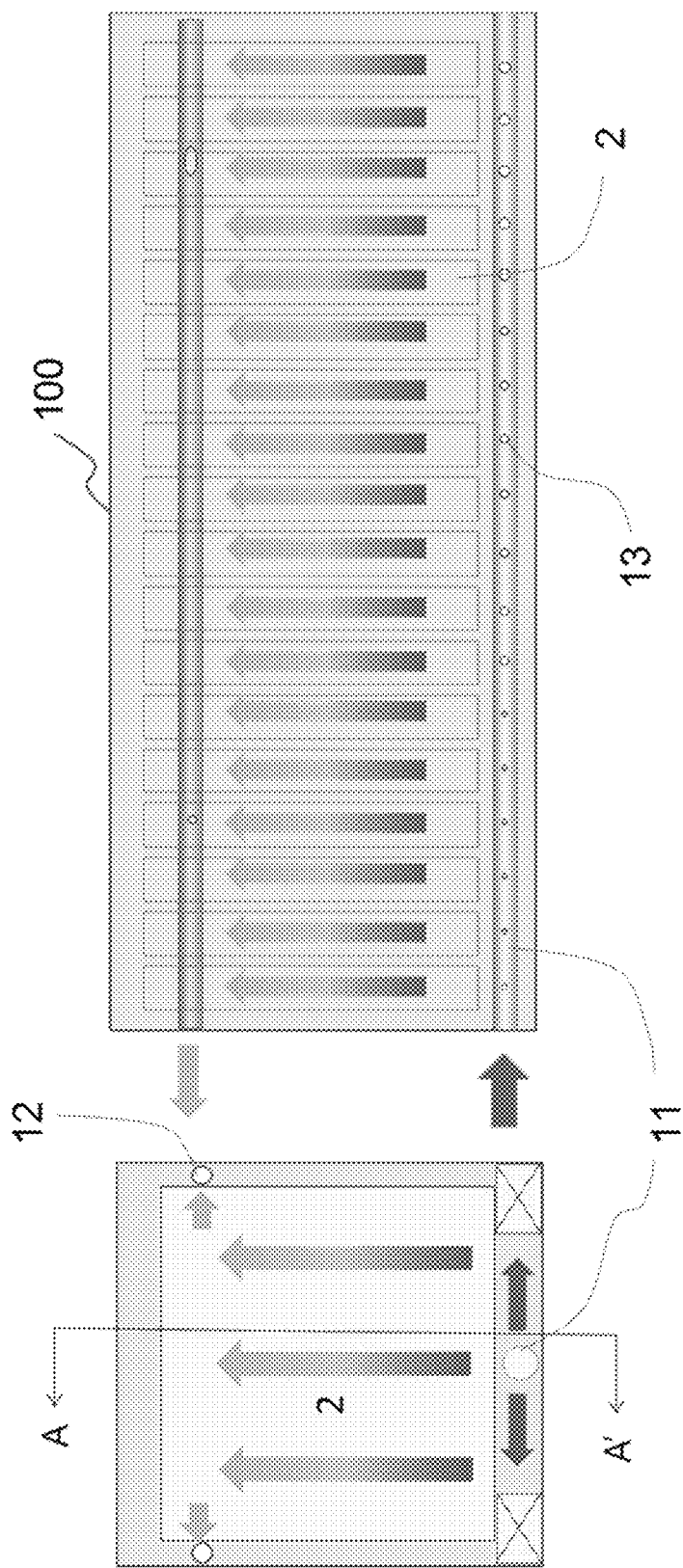

As illustrated in FIGS. 6A, 6B, and 6C, the immersion tank 100 includes an inlet distribution pipe 11 provided on a lower surface of the immersion tank 100 so that the inlet distribution pipe 11 allows the fluid to be moved and distributed inward through an inlet thereof through which the fluid is introduced from the outside; and a suction pipe 12 formed on the upper part of the immersion tank 100 and configured to return the fluid to the outside of the immersion tank 100, wherein a predetermined number of holes 13 of different sizes are formed in series in the inlet distribution pipe 11 and the suction pipe 12 in longitudinal directions thereof. This configuration allows the fluid 3 introduced into the immersion tank 100 to be moved inward and distributed at an even flow rate of the fluid to the upper part of the tank, thereby providing an equal cooling effect to each module.

Figure 7A:
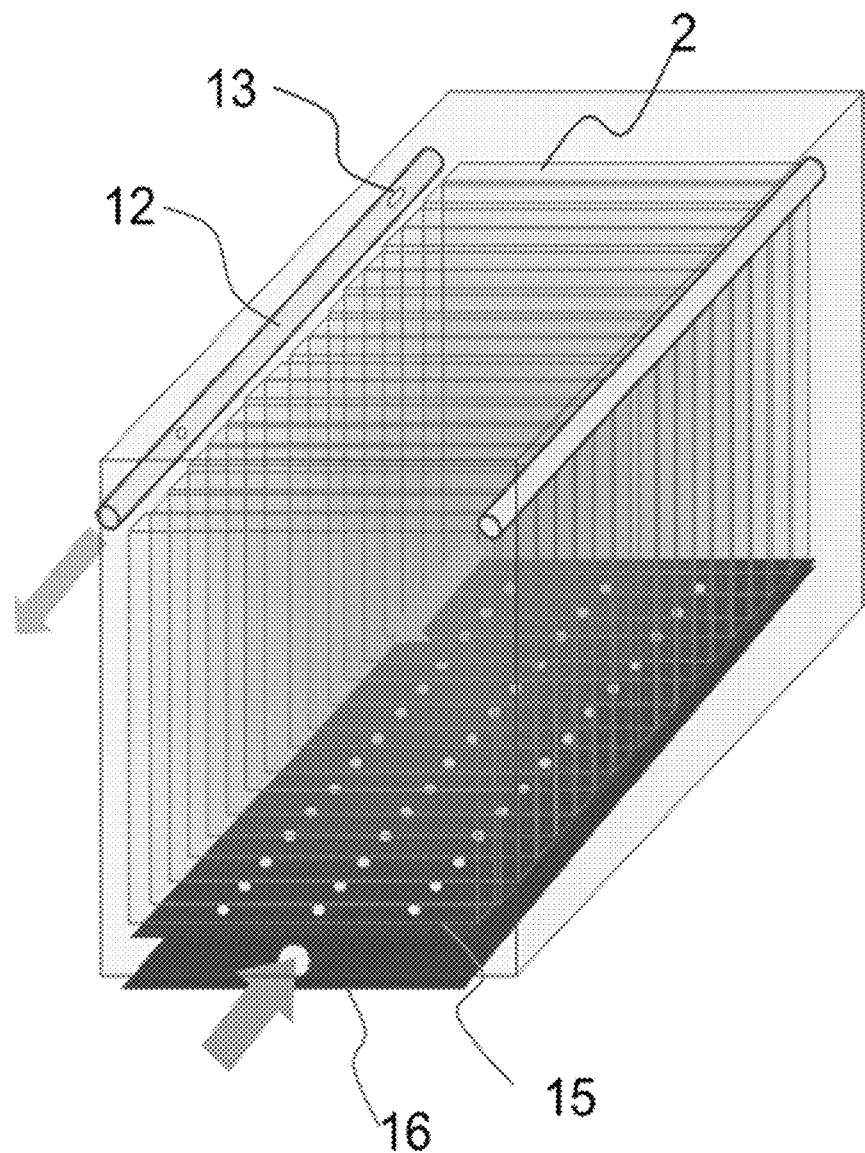
FIGS. 7A and 7B are views schematically illustrating the configurations of a porous panel and a flow rate control device inside the immersion tank according to the embodiment of the present disclosure and a flow direction according to the porous panel and flow rate control device.
Figure 7B:
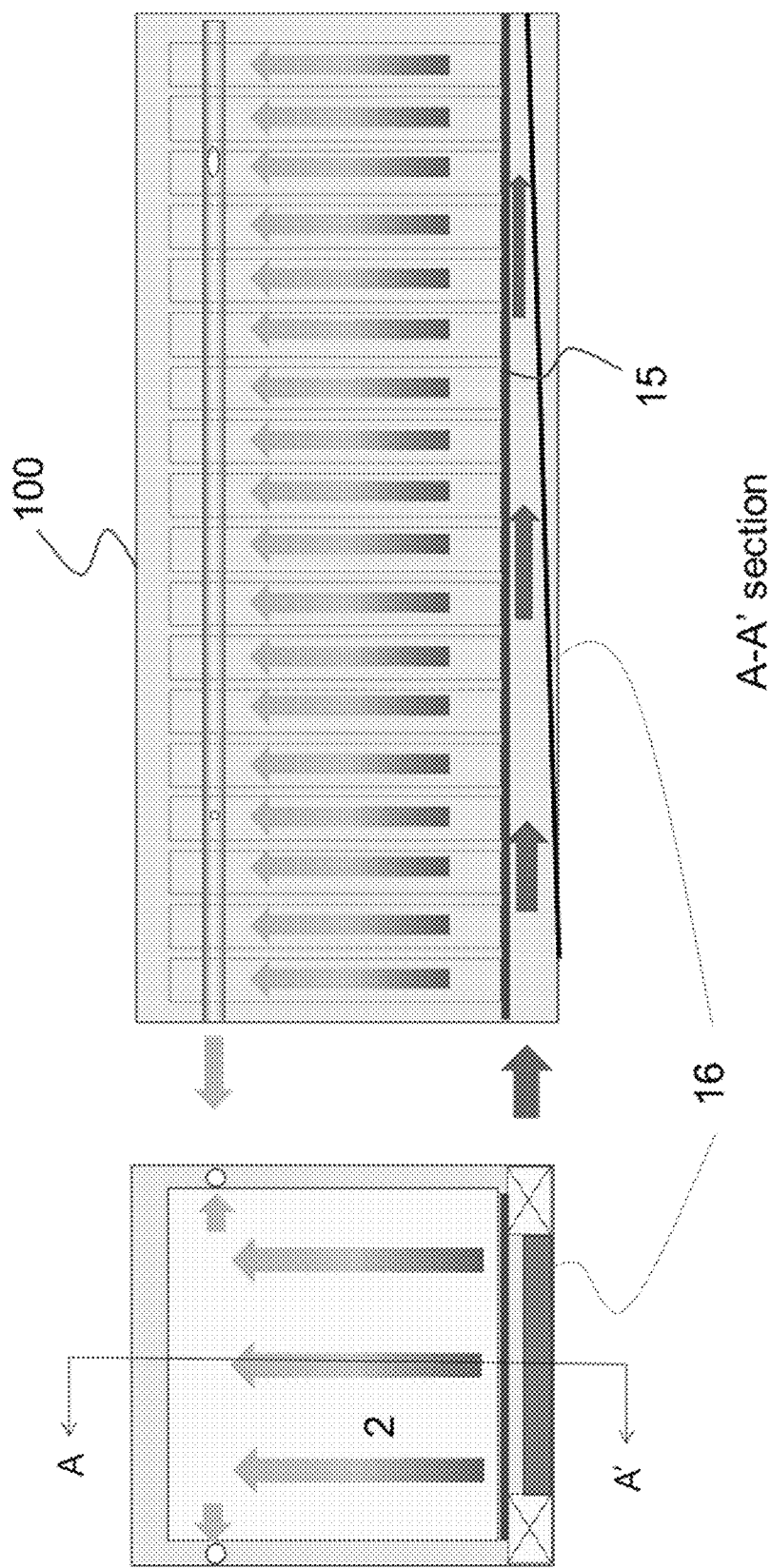

FIGS. 7A and 7B illustrate the embodiment of the present disclosure for more efficient flow distribution. The battery system of the present disclosure includes a porous panel 15 having a plurality of holes 13 formed on the lower surface of the immersion tank 100 and located under the module in replacement of the inlet distribution pipe 11, with the porous panel 15 configured to evenly deliver the fluid to the upper side of the immersion tank, wherein a flow rate control device 16 is formed under the porous panel and is configured as a panel inclining gradually toward a stop end from a start end.

Specifically, inside the immersion tank of the present disclosure, the flow rate control device 16 performs the function of distributing a fluid introduced from the outside to the upper part at an even flow rate while the fluid moves inward, thereby providing the same cooling effect to each module and reducing a temperature difference between batteries, so an effect of high reliability, safety, and life extension of the battery system can be expected.

Figure 8A:
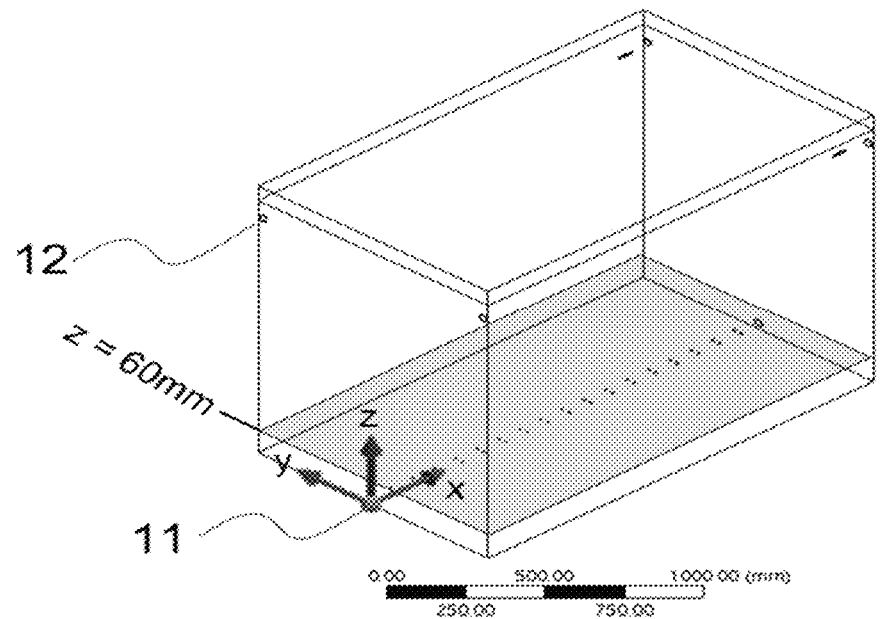
FIGS. 8A, 8B, 8C, and 8D are views illustrating a computational analysis model and analysis results illustrating flow rate distribution according to a configuration according to the embodiment of the present disclosure.
Figure 8B:
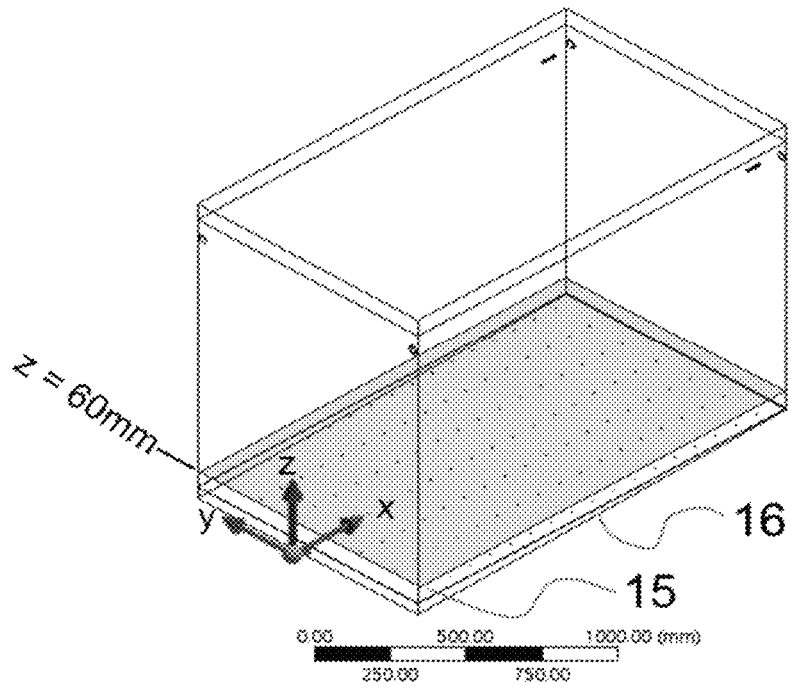
Figure 8D:
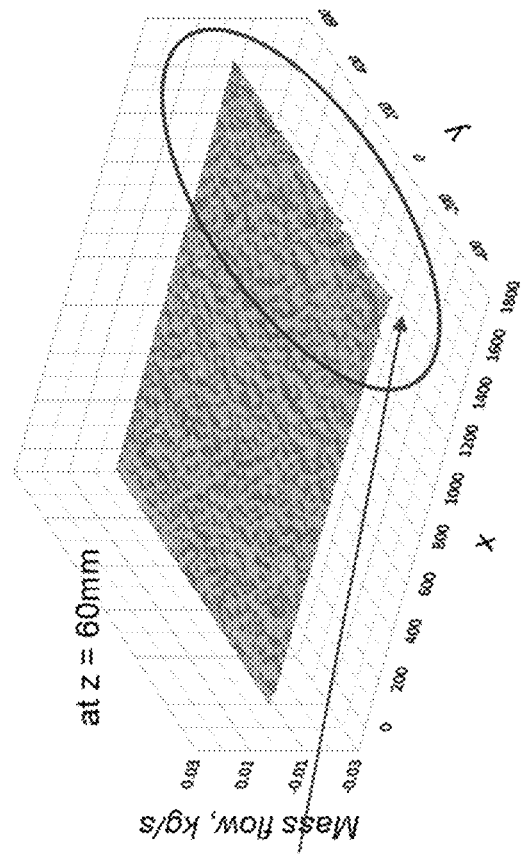

FIGS. 8A and 8B illustrate a 3D fluid dynamic model checking whether a fluid introduced into the immersion tank 100 is evenly distributed to the upper side while the fluid moves inward and a result graph of a fluid mass flow distribution calculated at a height of 60 mm from the lower side of the immersion tank while the inlet distribution pipe 11 is provided on the lower side of the immersion tank 100. FIGS. 8B and 8D illustrate a 3D fluid dynamic model for checking whether a fluid is evenly distributed to the upper side while the fluid moves inside the immersion tank and a result graph of fluid mass flow distribution calculated at a height of 60 mm from the bottom surface of the immersion tank while the porous panel 15 is provided on the lower side of the immersion tank and the slanting flow rate control device 16 is provided under the lower surface of the porous panel.

Figure 8C:
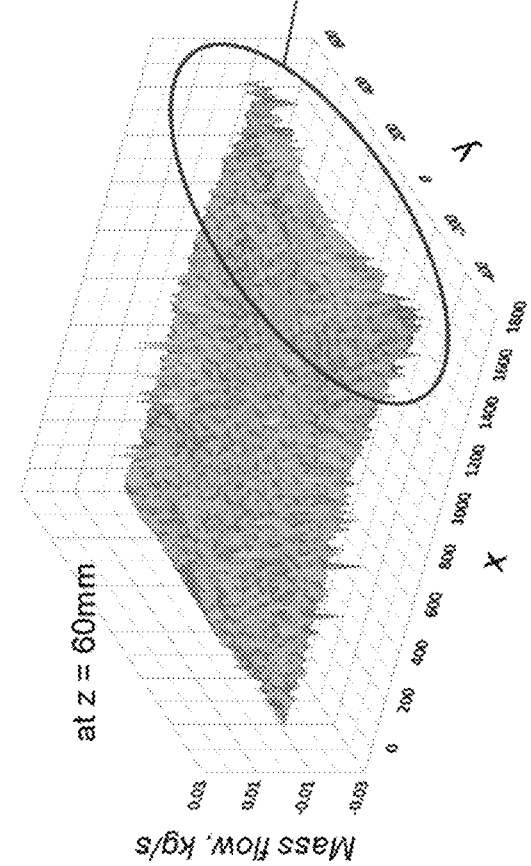

As illustrated in the flow distribution result graphs of FIGS. 8C and 8D, the distribution of flow rate is illustrated to be more uniform in the model composed of the porous panel 15 and the flow rate control device 16 than the model composed of the inlet distribution pipe 11, and thus it can be seen that a fluid can be distributed more efficiently through the porous panel and the flow rate control device. This configuration has an advantage in that need for a welding work for coupling pipes is eliminated to simplify manufacturing and efficient distribution of the fluid is achieved.

Figure 9A:
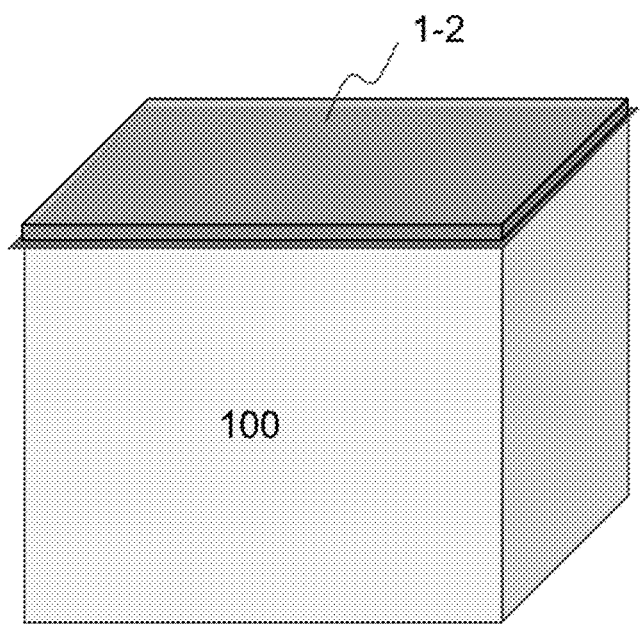
FIGS. 9A and 9B are views schematically illustrating the immersion tank and reinforcement frames for structural reinforcement by surrounding the immersion tank according to the embodiment of the present disclosure.
Figure 9B:
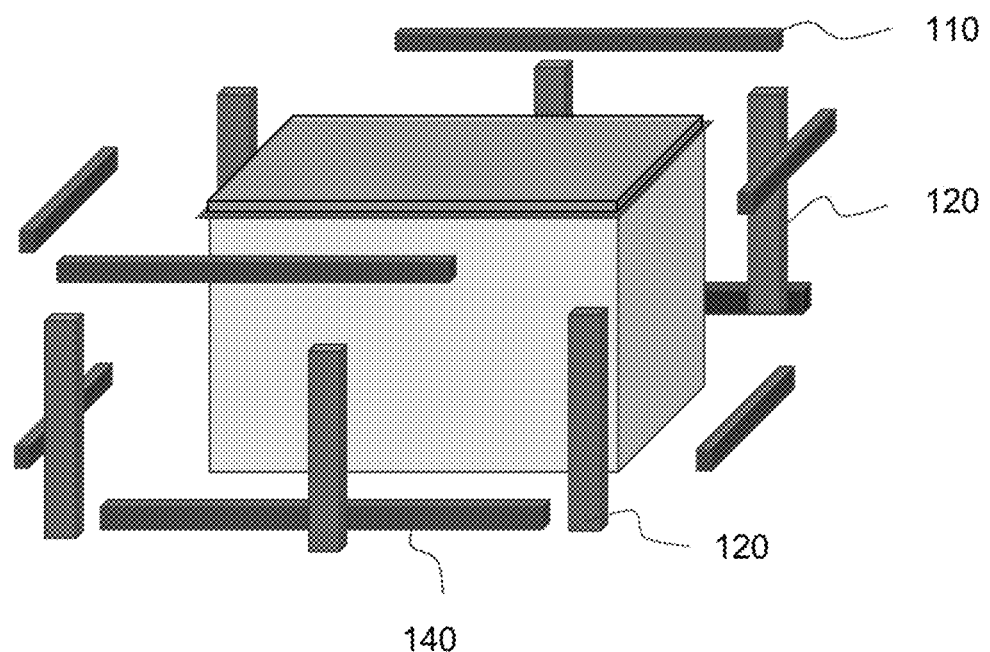

As illustrated in FIGS. 9A and 9B, according to the embodiment of the present disclosure, the immersion tank 100 includes multiple horizontal frames 110 and 140 and multiple vertical frames 120 provided around the immersion tank 100 for horizontal and vertical reinforcements thereof.

This configuration improves the structural stability of the immersion tank 100, and the horizontal frames 110 and 140 and the vertical frames 120 are components of the external enclosure constituting the double-layered enclosure to protect the immersion tank 100 from a surrounding environment.

The frames 110, 120, and 140 function to support the immersion tank 100, and are coupled to panels constituting the external enclosure to form the structure of a double-layered enclosure. The structure of a double-layered enclosure serves to confine the fluid leaking from the immersion tank in an emergency to prevent the fluid from escaping to the outside, thereby preventing environmental pollution caused by the leaking of the fluid to the outside.

Figure 10A:
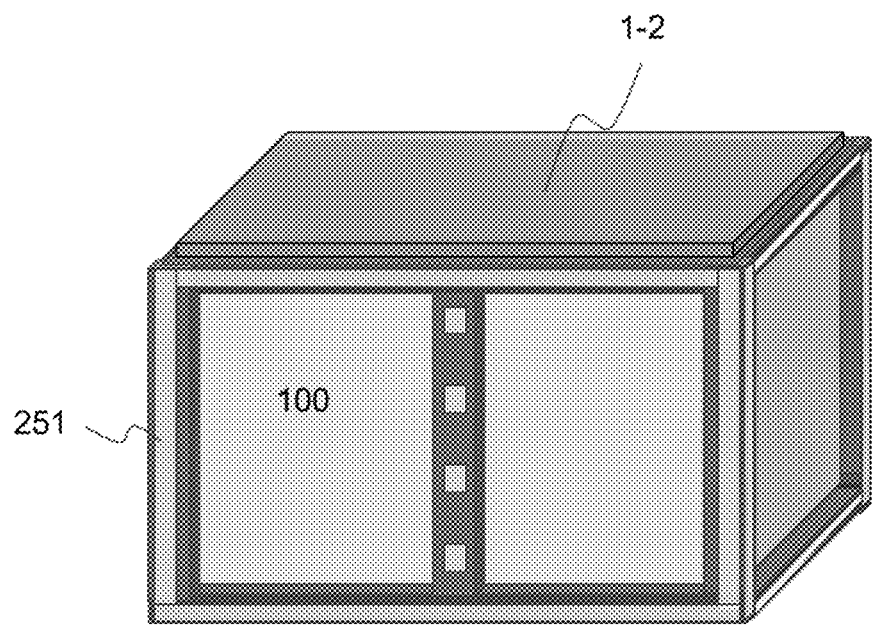
FIGS. 10A and 10B are views schematically illustrating an external enclosure constituting a double-layered enclosure configured by using external enclosure panels, the reinforcement frames, gaskets, and coupling members according to the embodiment of the present disclosure.
Figure 10B:
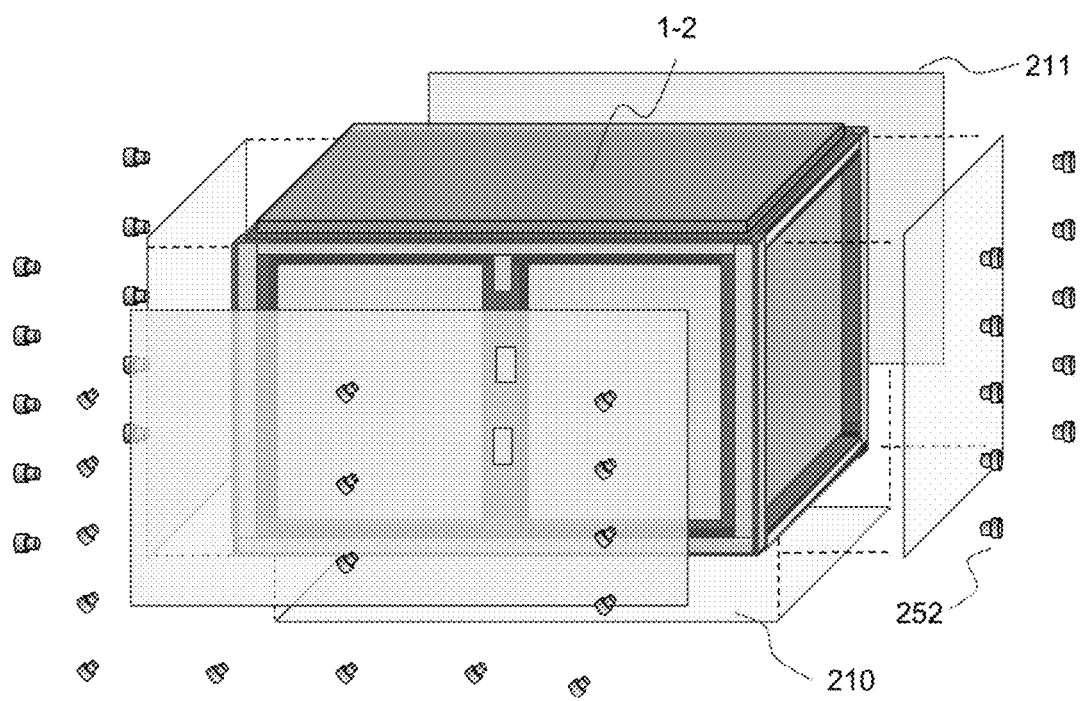

As illustrated in FIGS. 10A and 10B, gaskets 251 are attached between the frames 110, 120, and 140 coupled to panels 210 and 211. The gaskets 251 are securely coupled by coupling members 252. The coupling members may include screws, self-tapping screws, or nail guns, and provide a sealing effect by compressing the gaskets between the panels and the frames to complete the structure of a double-layered enclosure constituted by the immersion tank and external panels.

This double-layered enclosure format can protect the immersion tank from impacts caused by tornadoes, and the gasket sealing coupling prevents fluid leakage and blocks a heat conduction path through which external heat enters the inside of the immersion tank, thereby improving the reliability and safety of the immersion cooling battery system and the efficiency of thermal management.

Figure 11A:
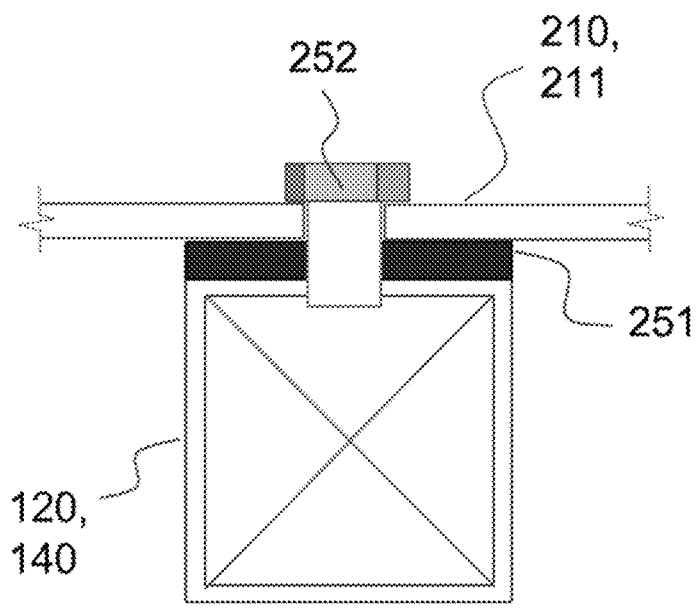
FIGS. 11A and 11B are views illustrating cross sections in which the gasket sandwiched between the external enclosure panels and the reinforcement frames is pressed and coupled thereto according to the embodiment of the present disclosure.
Figure 11B:
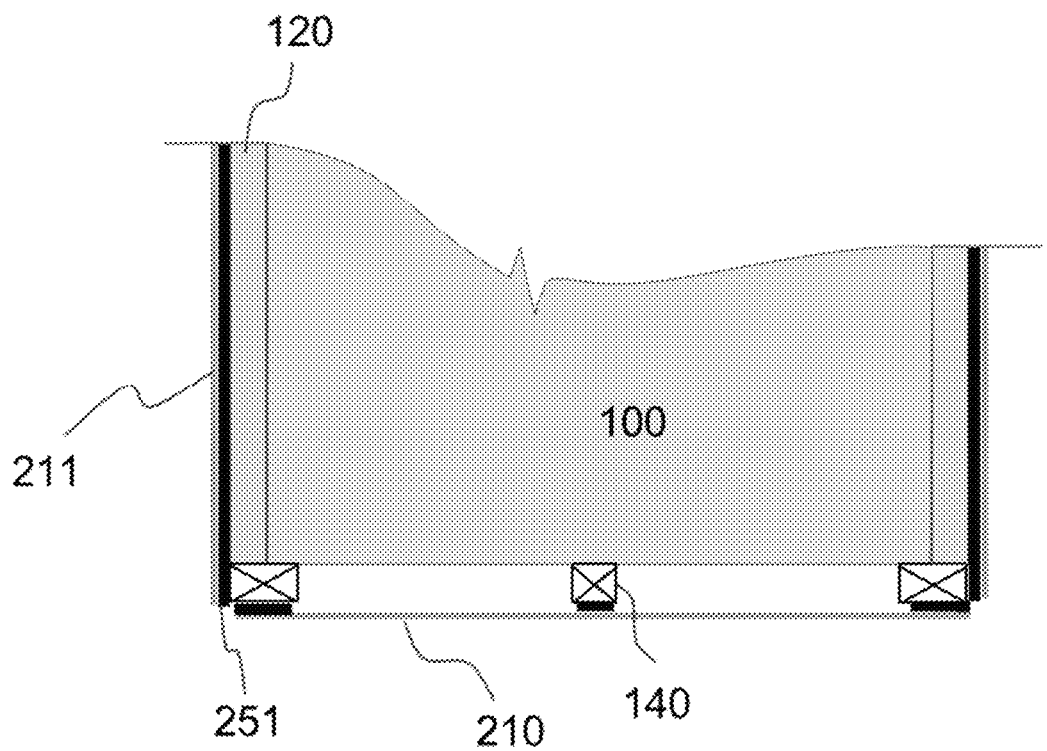

In the embodiment of the present disclosure, FIGS. 11A and 11B illustrate the cross sections of the gaskets 251 sandwiched between the external enclosure panels and the frames and the coupling member 252 coupling the gaskets to the panels and frames.

Figure 11C:
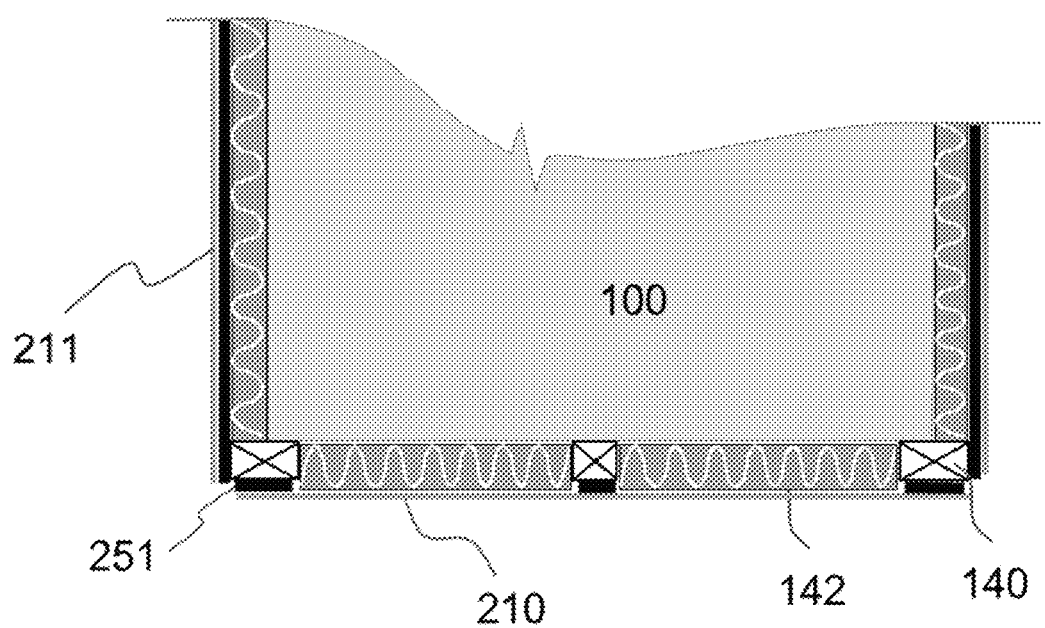
FIG. 11C is a view schematically illustrating the configuration of an insulation material included in space between the external enclosure panels and the immersion tank.

As illustrated in FIG. 11C, an insulation material 142 is accommodated in empty space defined between the outer side and bottom surfaces of the immersion tank 100 and the panels 210 and 211 of the external enclosure. The insulation material protects the immersion tank from external heat and plays an important role in maintaining the consistency of immersion thermal management efficiency and performance.

The insulation material 142 is arranged to surround the entire outer surface of the immersion tank 100 to minimize thermal influence from the outside. This configuration minimizes the influence of an external environment and keeps the temperature of the immersion tank stable.

Accordingly, the immersion cooling battery system integrated with an enclosure of the present disclosure improves the reliability and safety of a battery by responding to various heat-related problems that may occur during battery use.

Figure 12A:
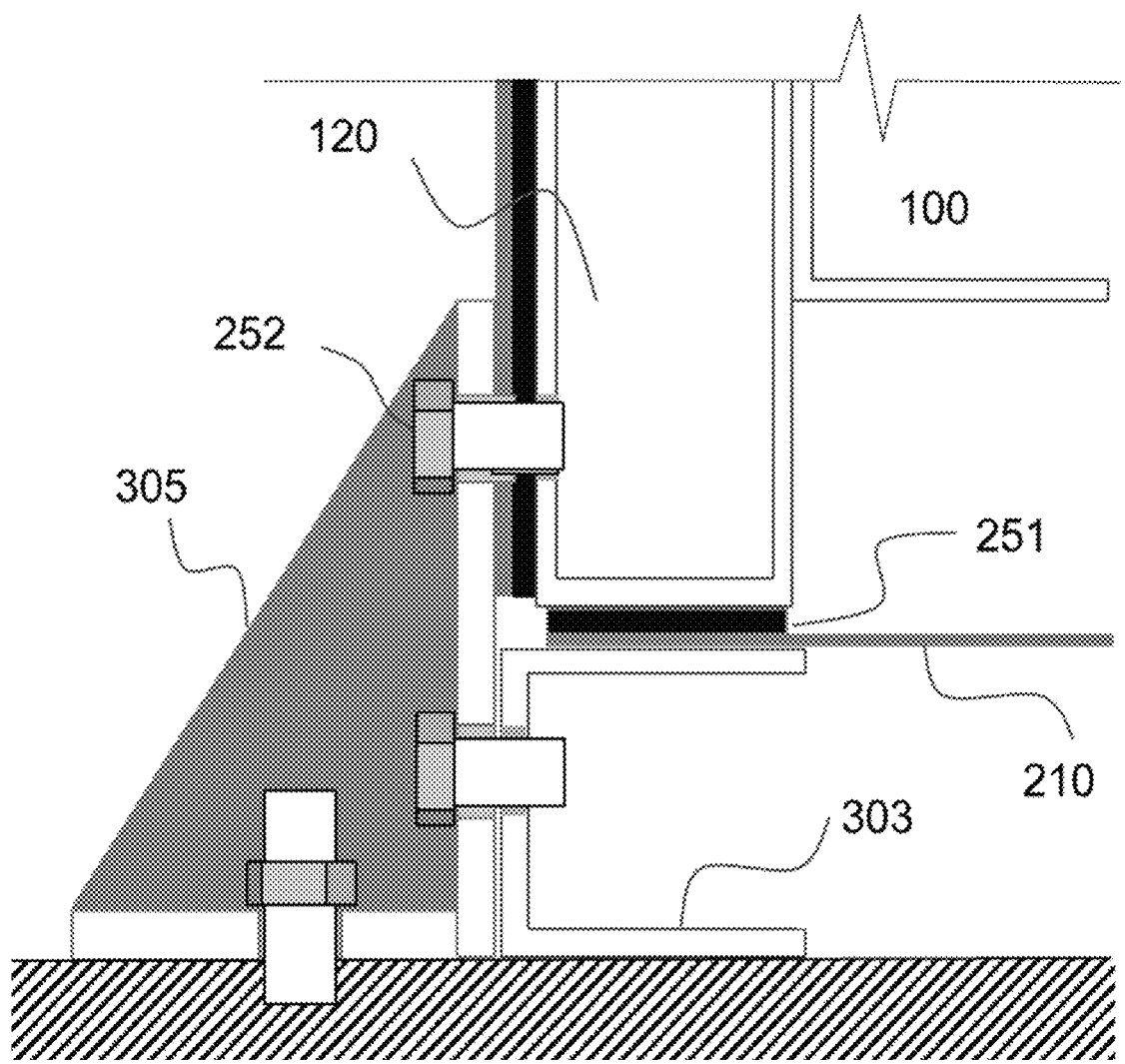
FIGS. 12A and 12B are views schematically illustrating the cross sections of a support foot and a base frame for supporting the external enclosure vertically and horizontally according to the embodiment of the present disclosure.
Figure 12B:
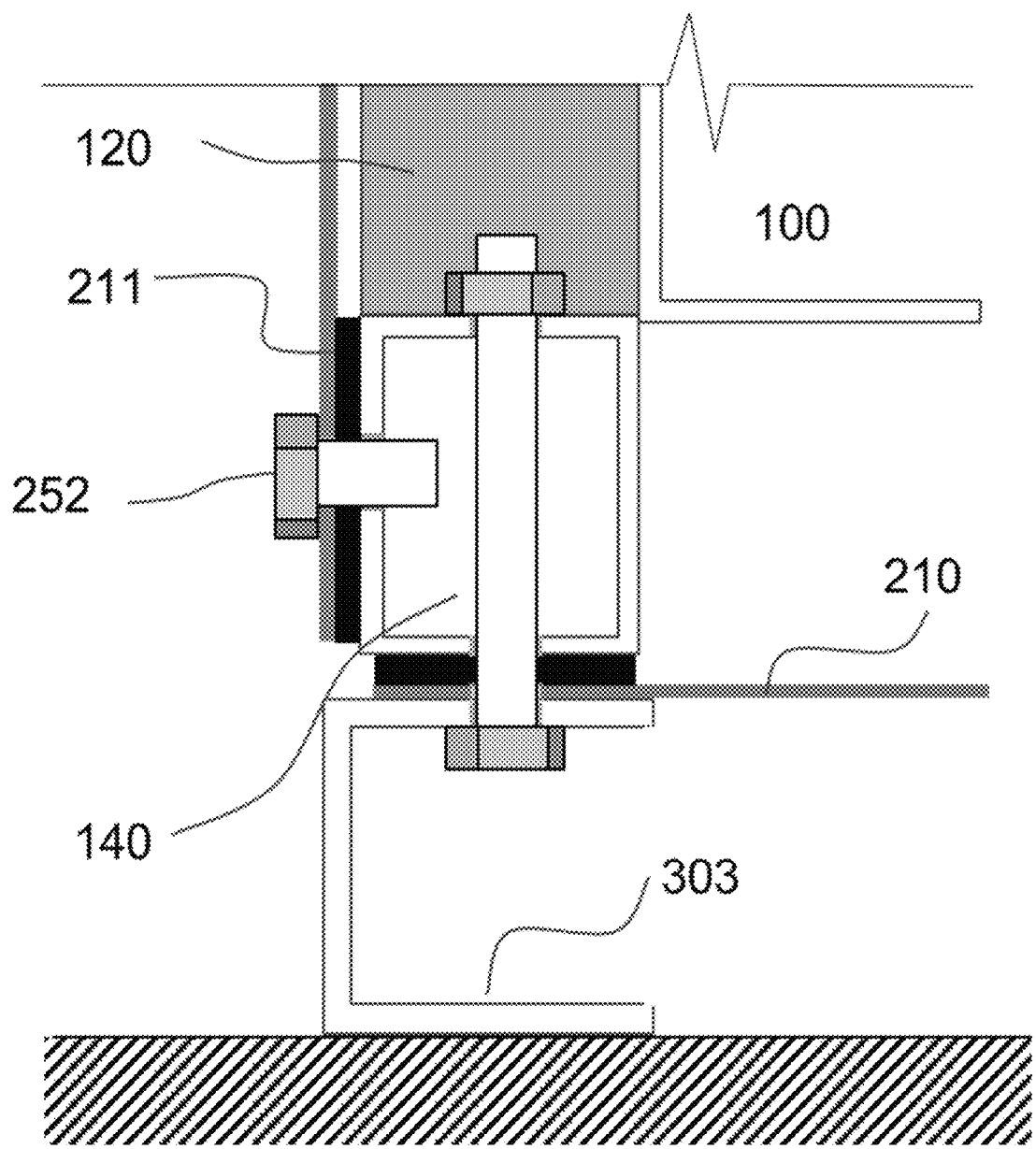

As illustrated in FIGS. 12A and 12B, to effectively support the external enclosure 200 constituting the double-layered enclosure of the present disclosure, the coupling device of a support supporting the external enclosure includes a base frame 303 and the support foot 305 installed on the floor. The base frame serves to transmit the weight of the entire system to the support foot, and the support foot performs the function of transmitting vertical and horizontal loads transmitted to the base frame to the floor.

Figure 13A:
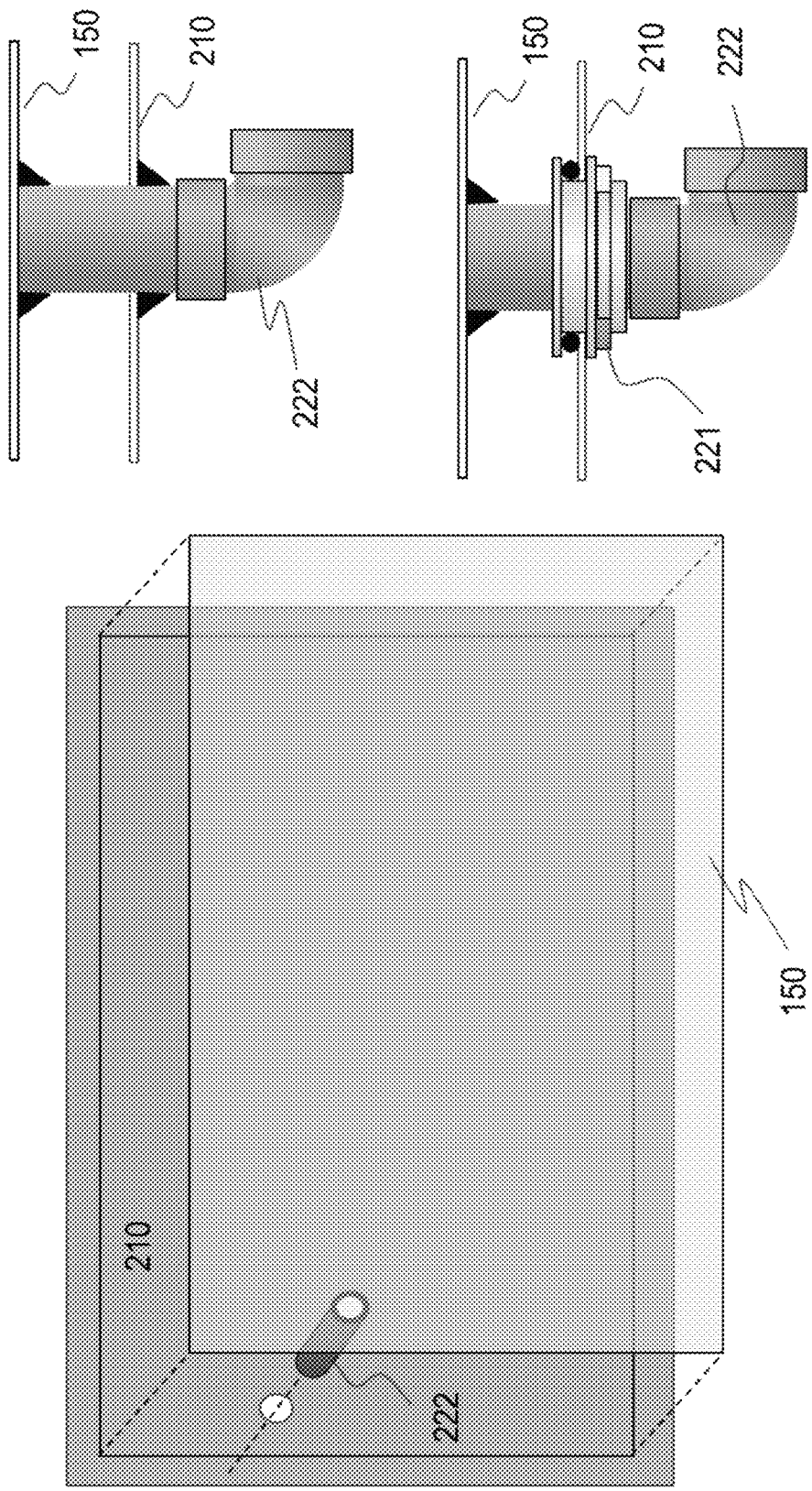
FIG. 13A is a view schematically illustrating the configuration of a fluid drain device for maintenance according to the embodiment of the present disclosure.

As illustrated in FIG. 13A, according to the embodiment of the present disclosure, in order to easily drain an internal fluid to the outside for a maintenance purpose, a drain pipe 222 is installed by passing through a bottom surface 150 of the immersion tank and a bottom panel 210 of the external enclosure, and the drain pipe and the external enclosure bottom panel are connected to each other by a tank fitting 221 to prevent fluid leakage.

The drain pipe has an open/close lock valve 223 (not shown) provided on an end part thereof so that the drain pipe can be opened and closed as needed when the fluid 3 is maintained and replaced.

As illustrated in 13B, the battery system of the present disclosure includes a device for fueling the fluid 3 without opening the upper-end cover 1-2 of the immersion tank. The battery system includes a fueling device 19, which is a device for fueling a fluid, wherein the fueling device is installed at a predetermined position on the upper-end cover.

Even if a fluid is spilled during refueling, the fueling device 19 formed on the upper-end cover 1-2 prevents the fluid from leaking to the outside along the side surface of the external enclosure. In addition, by fueling through the fueling device, the inside of the immersion tank is not required to be opened, and this prevents, as much as possible, the contamination of a fluid due to contact of the fluid with a surrounding environment during the fueling.

Figure 13B:
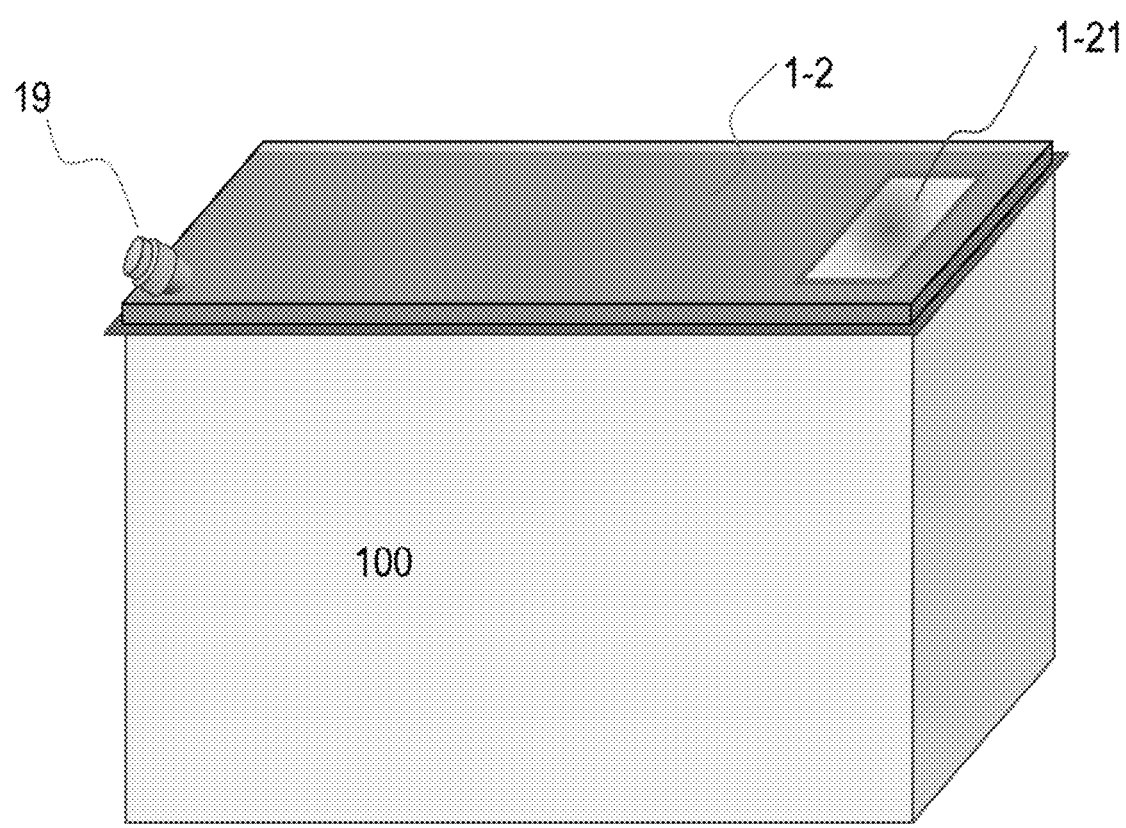
FIG. 13B is a view schematically illustrating the configurations of a fueling device and an explosion proof device according to the embodiment of the present disclosure.

Furthermore, as illustrated in FIG. 13B, the immersion tank 100 of the present disclosure includes an explosion-proof disk 1-21 or a pressure relief valve which is a device that ensure safety by detecting a sudden increase in internal pressure due to battery failure. The explosion proof disk 1-21 is disposed on the upper-end cover 1-2 of the immersion tank and opens when the internal pressure reaches an opening pressure to quickly discharge the pressure inside the immersion tank to the outside. The opening pressure is preferably 0.2 to 0.4 bar, and serves to protect the internal structure of the immersion tank by preventing internal pressure build-up.

This configuration of the present disclosure is designed to simultaneously consider safety, efficiency, manufacturing simplicity, and ease of maintenance, thereby improving the functionality and reliability of the immersion cooling battery system integrated with an enclosure.

Figure 14A:
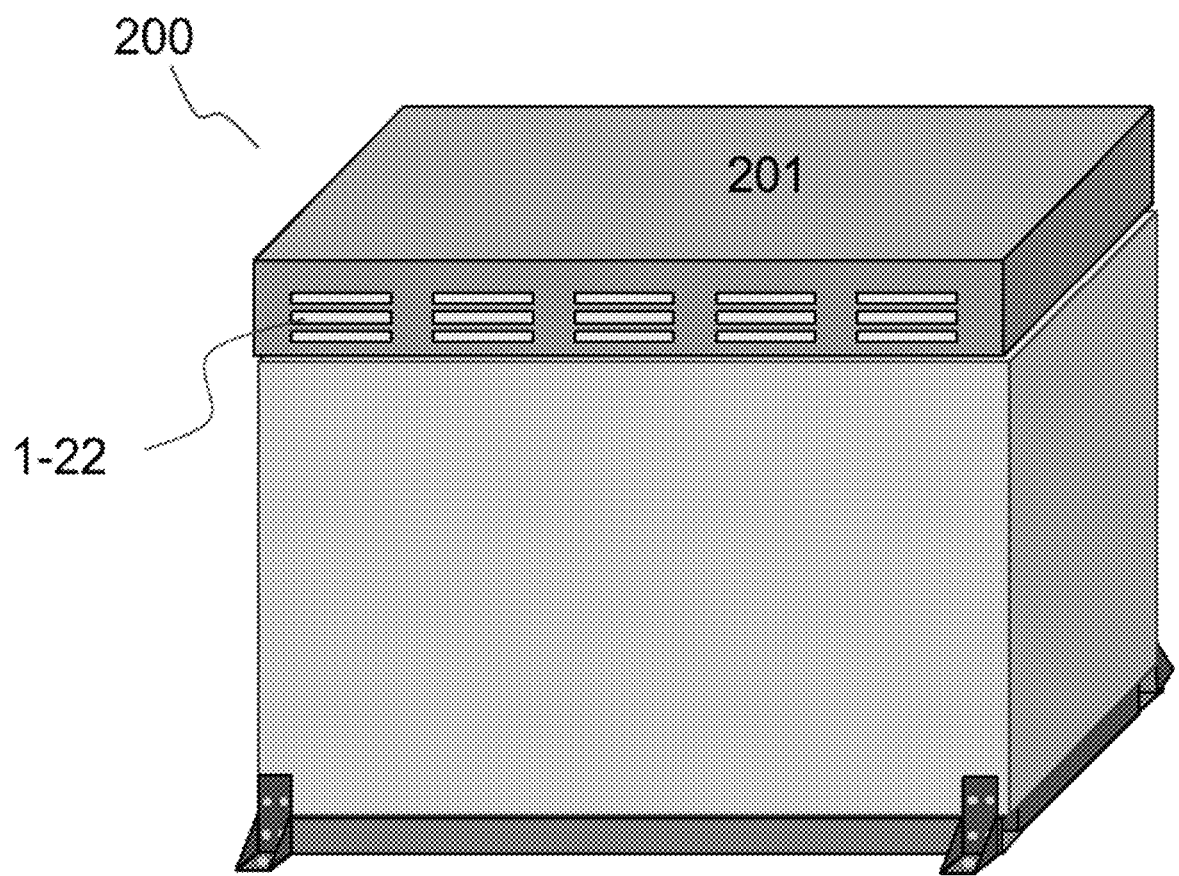
FIGS. 14A and 14B are views schematically illustrating the configuration of the roof of the external enclosure, openings formed on the side surface of the roof, and a structure for rainwater inflow prevention according to the embodiment of the present disclosure.
Figure 14B:
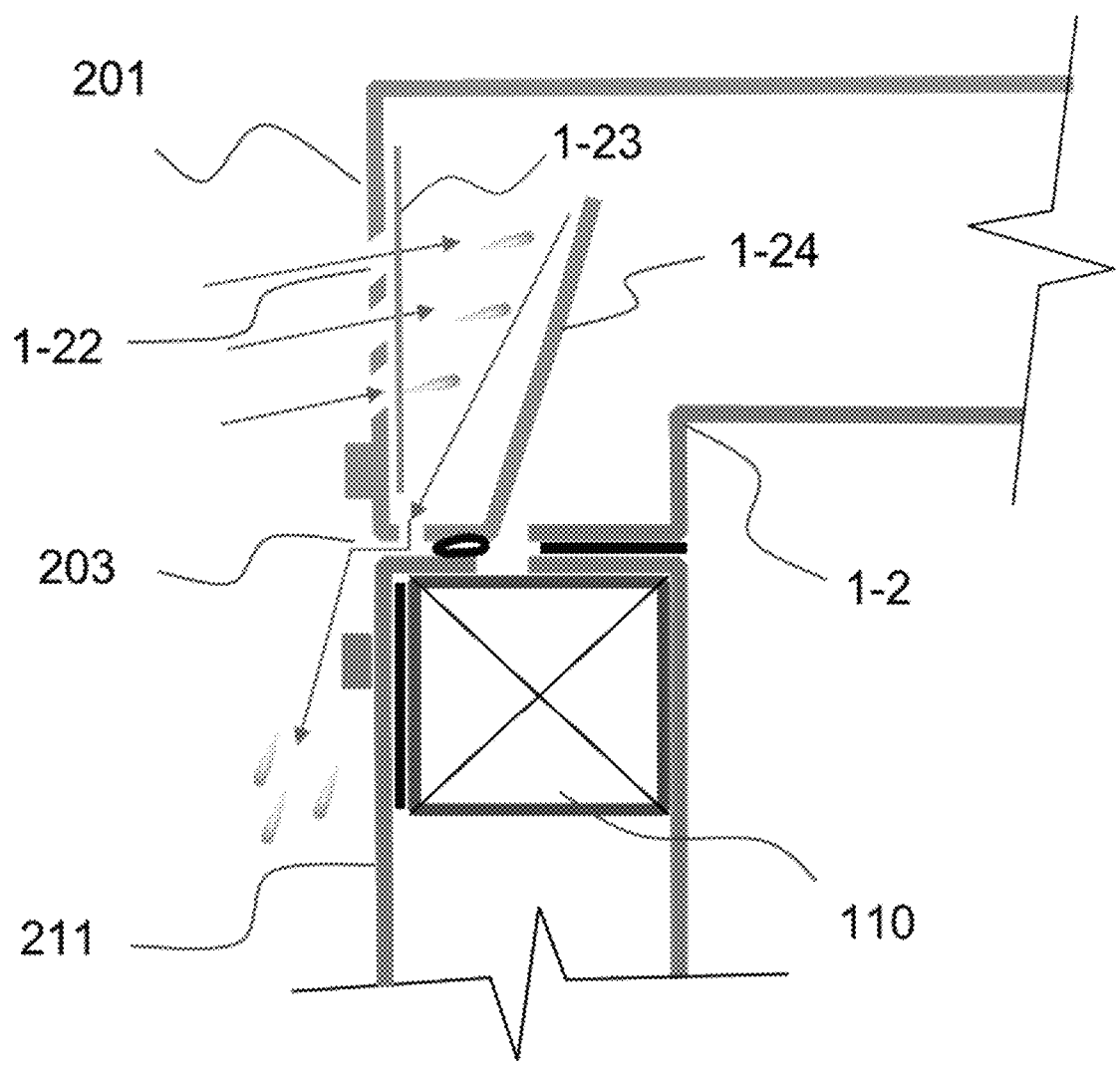

As illustrated in FIG. 14A, the external enclosure 200 constituting the double-layered enclosure includes a removable roof 201, wherein to prevent heat accumulation due to solar heat in space between the immersion tank 100 and the roof, roof openings 1-22 are formed in the side of the roof. As illustrated in FIG. 14B, a slanting rainwater inflow prevention partition 1-24 is installed in a section corresponding to the roof openings along the inner side of the roof to prevent an external fluid, such as rainwater, from being introduced into the external enclosure through the roof openings, and a drain hole 203 is provided in the lower side of the inflow prevention partition.

The rainwater inflow prevention partition 1-24 effectively blocks rainwater from entering the external enclosure. One or more drain holes 203 are provided so that rainwater collected by the rainwater inflow prevention partition 1-24 can be discharged to the outside. The drain holes prevent rainwater from accumulating on the bottom surface of an external enclosure roof, and at the same time, effectively prevent the fluid from being introduced to the inside of the external enclosure.

The external enclosure roof structure of the present disclosure can prevent the inflow of rainwater and heat accumulation inside by using natural convection, thereby minimizing negative impacts due to changes in an external environment.

Figure 15A:
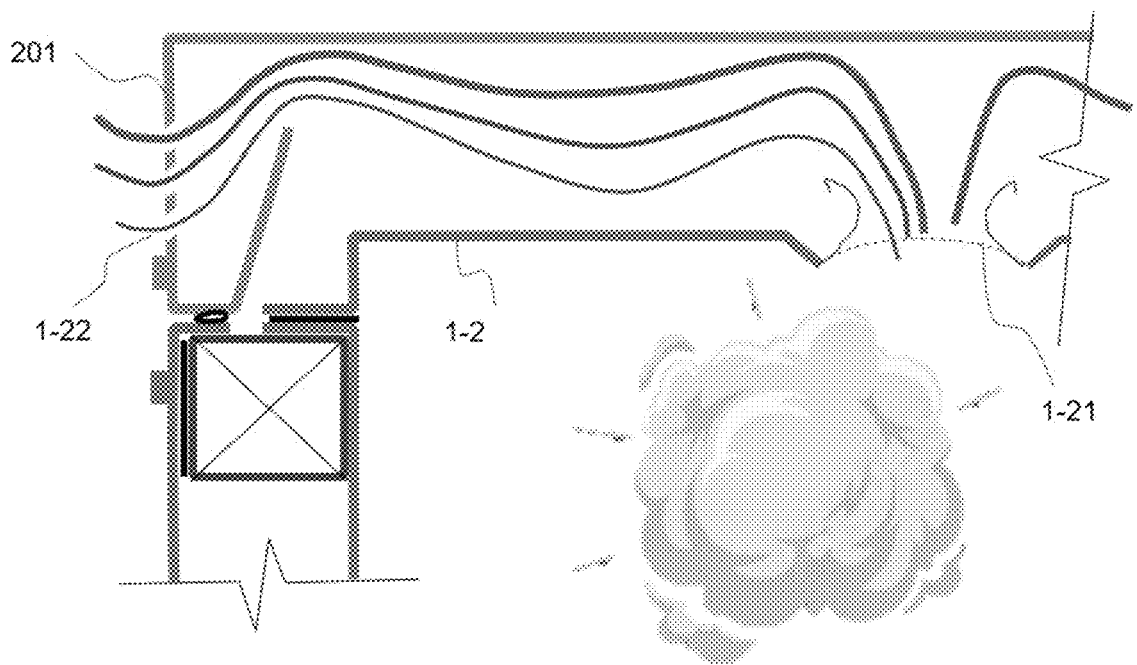
FIGS. 15A and 15B are views schematically illustrating the configuration of the structure of an explosion proof external enclosure roof according to the embodiment of the present disclosure.

As illustrated in FIG. 15A, the roof openings 1-22 serve to quickly guide gas and pressure to the outside, which are released by the opening of the explosion proof disk 1-21 installed on the upper-end cover of the immersion tank 100. In this case, the total area of the roof openings is required to be sufficiently larger than the opening area of the explosion proof disk so that the gas and pressure can be rapidly discharged to the outside.

Figure 15B:
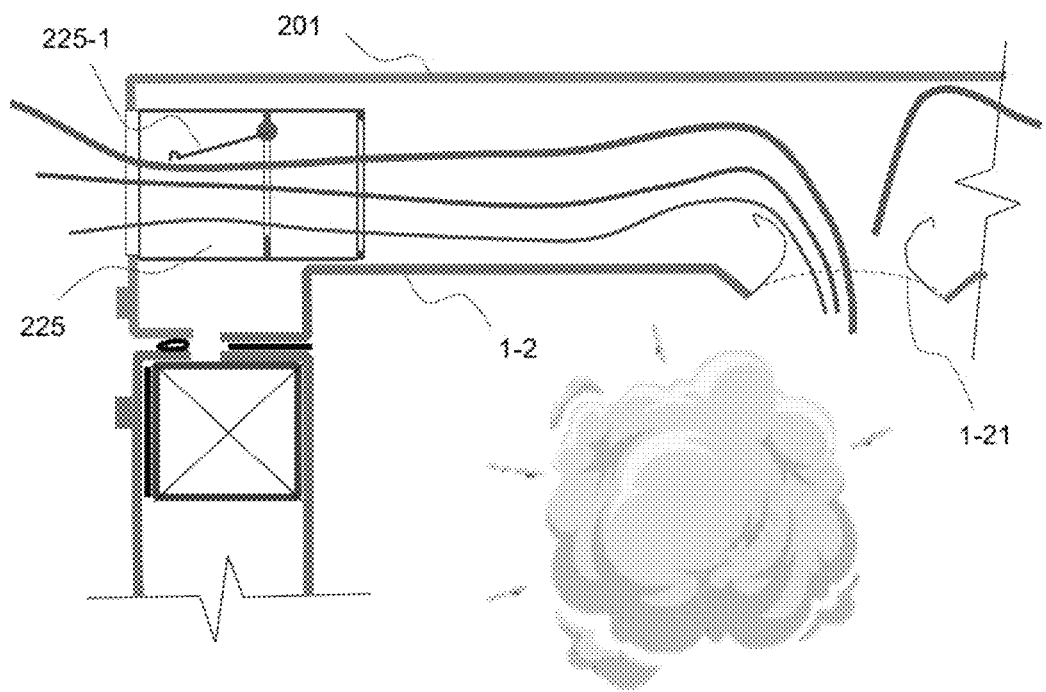
Figure 16A:
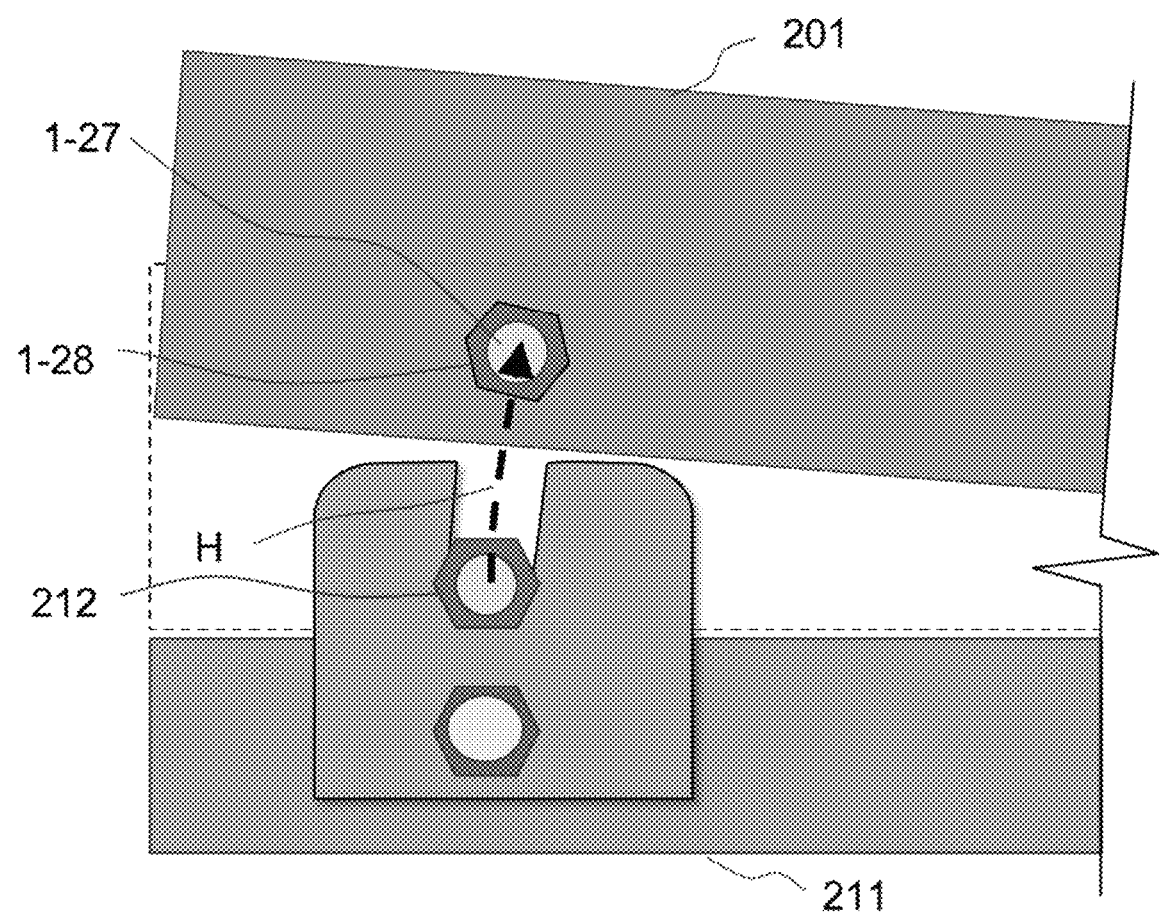
FIGS. 16A and 16B are views schematically illustrating various devices configured to allow the external enclosure roof to opened at a predetermined pressure for explosion prevention according to the embodiment of the present disclosure.
Figure 16B:
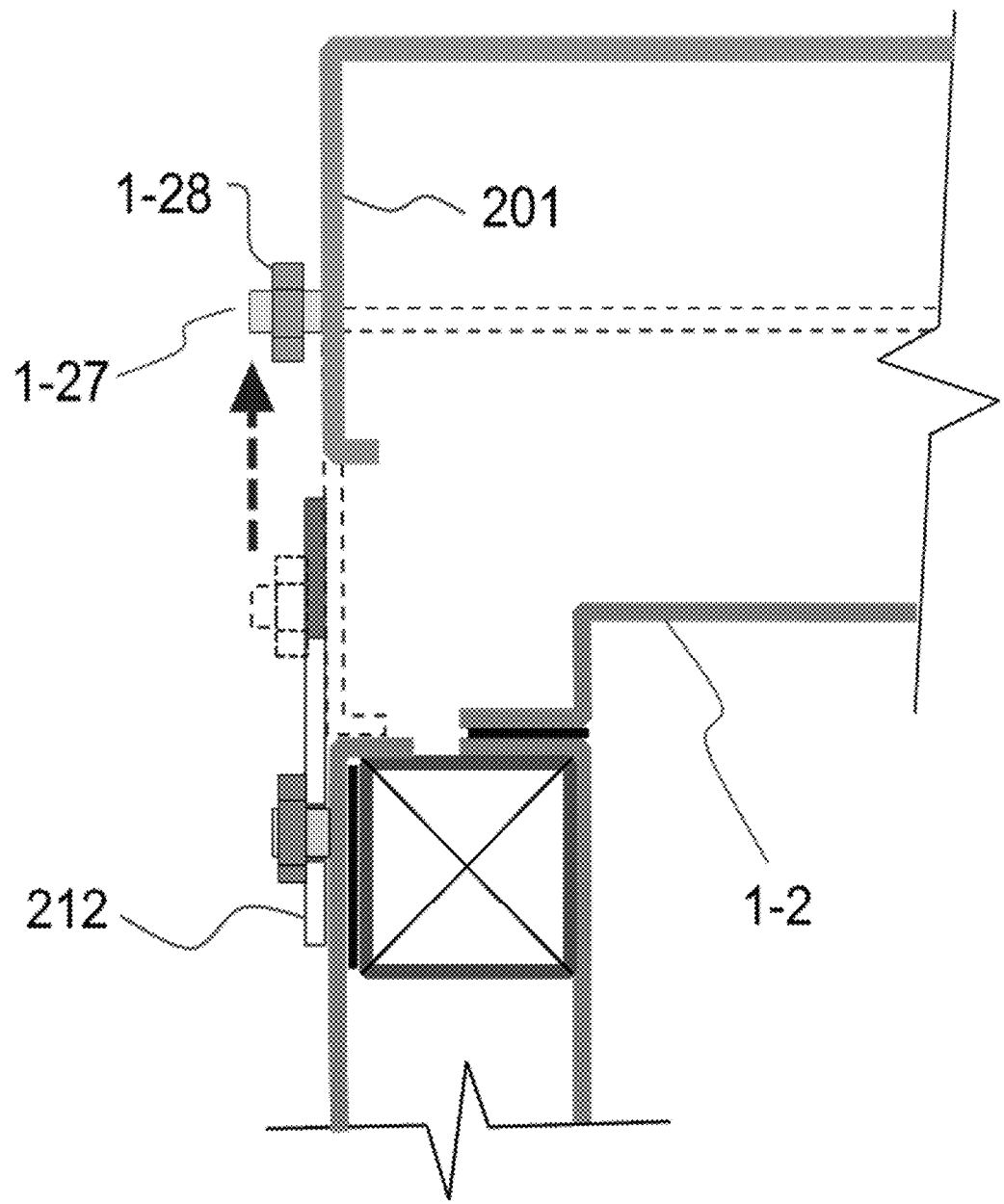

In addition, as illustrated in FIG. 15B, in the immersion cooling battery system integrated with an enclosure, a volume damper 225 is installed on the side of the external enclosure roof. The volume damper 225 functions to rapidly guide gas and pressure to the outside, which are released when the explosion proof disk is opened.

In the volume damper 225, a damper blade 225-1 opens due to the opening pressure of the explosion proof disk 1-21 so that pressure is rapidly discharged to the outside. This pressure discharge is essential for keeping a battery safe from explosion.

This structure functions as an important safety design element in the external enclosure structure of the present disclosure, which is configured as a double-layered enclosure type.

As illustrated in FIGS. 16A, 16B, 17A, and 17B, as another example of the present disclosure, the mechanism of automatic opening by explosion pressure will be described in detail by using the combined structure of the external enclosure roof 201 and a side panel 211 of the external enclosure.

In a situation in which the explosion proof disk located in the immersion tank 100 is opened due to the increase of internal pressure, the external enclosure roof 201 is designed to be opened to discharge the pressure.

To this end, the rear surface of the external enclosure roof 201 may be coupled to the external enclosure side panel 211 in contact with the rear surface by a hinge 218. It is a device that allows the external enclosure roof to be opened relative to the hinge. In this case, the lower part of a fixing plate 212 formed at a point at which the side surface of the external enclosure roof 201 and the external enclosure side panel 211 meet is fixed on the enclosure side panel, and a bolt 1-27 is fixed on the side surface of the roof corresponding to the upper part of the fixing plate.

The fixing plate is compressed by coupling a nut 1-28 to the bolt 1-27. In this case, a guide groove is formed in the upper part of the fixing plate along a path H through which the bolt moves to open the external enclosure roof. The guide groove serves to accommodate the bolt 1-27 fixed to the external enclosure roof. The bolt is fastened to the nut 1-28, and in this process, the roof is normally fixed by a compressive force developed on a surface on which the fixing plate and the nut contact with each other. The compressive force applied to the nut may be preset so that the nut slides on the contact surface of the nut with the fixing plate so that the roof can be opened relative to the hinge in an emergency.

Figure 17A:
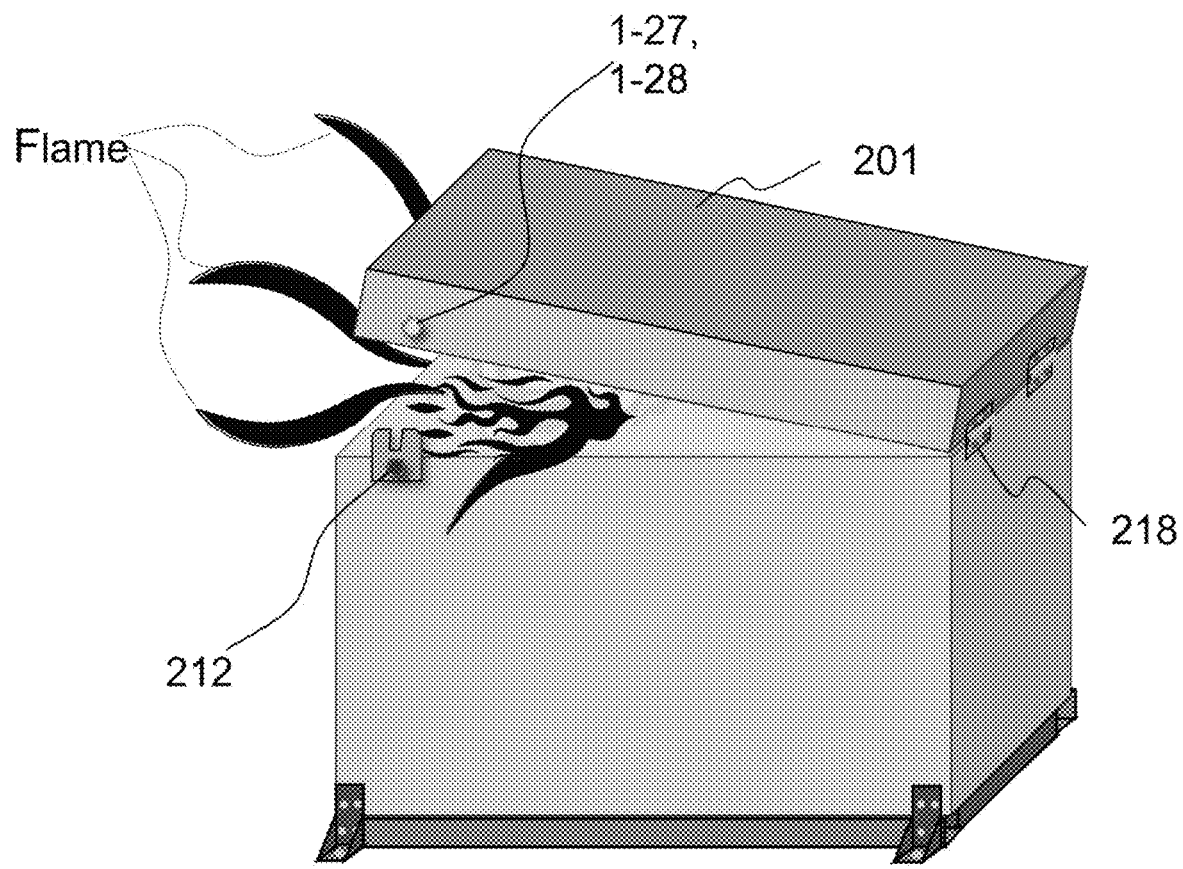
FIGS. 17A and 17B are views illustrating a relationship between the mechanism of the roof opened by using the devices described in in FIGS. 16A and 16B and force to implement the mechanism.
Figure 17B:
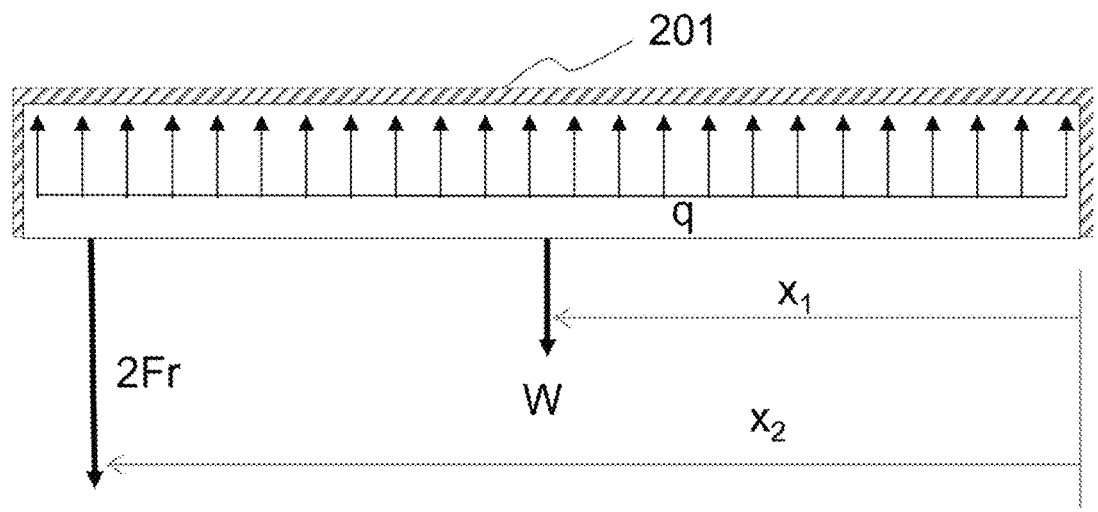
Figure 18A:
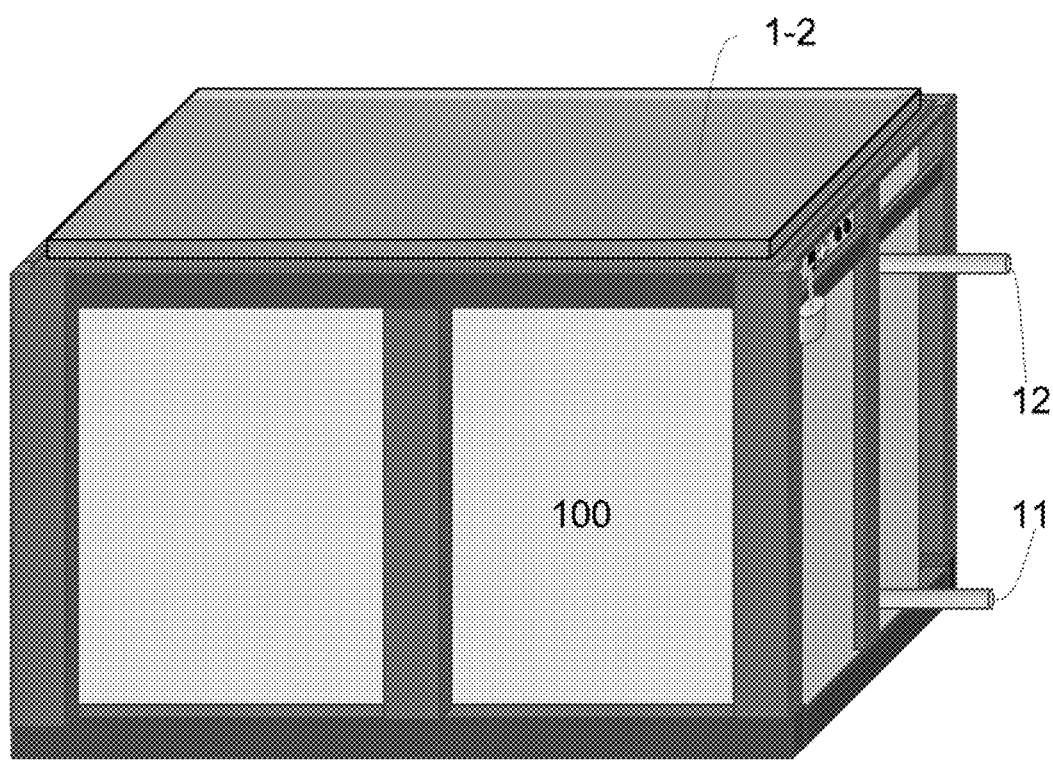
FIGS. 18A and 18B are views schematically illustrating the configuration of separate space for attached facilities located on the front part of the external enclosure according to the embodiment of the present disclosure.
Figure 18B:
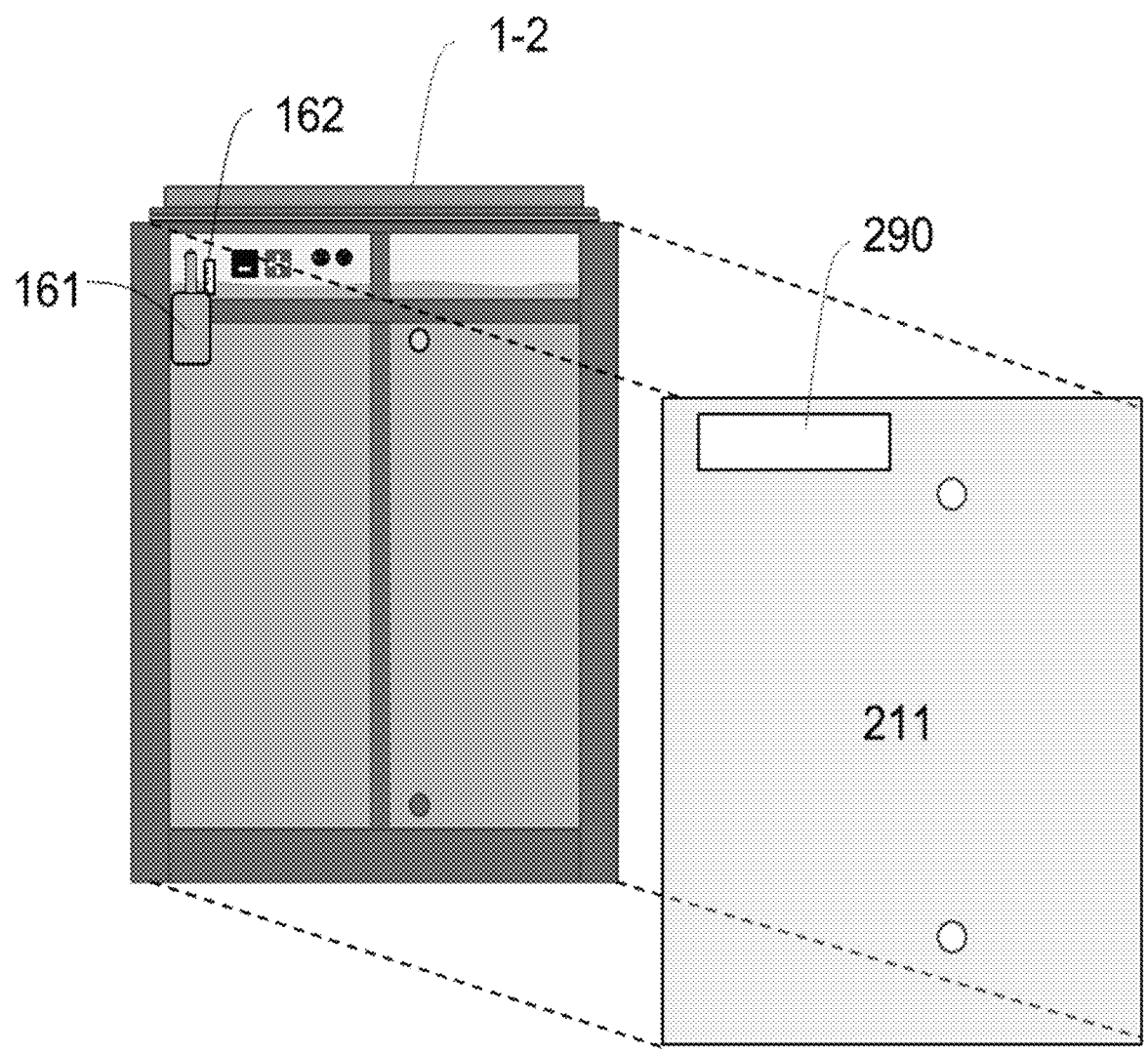
Figure 19A:
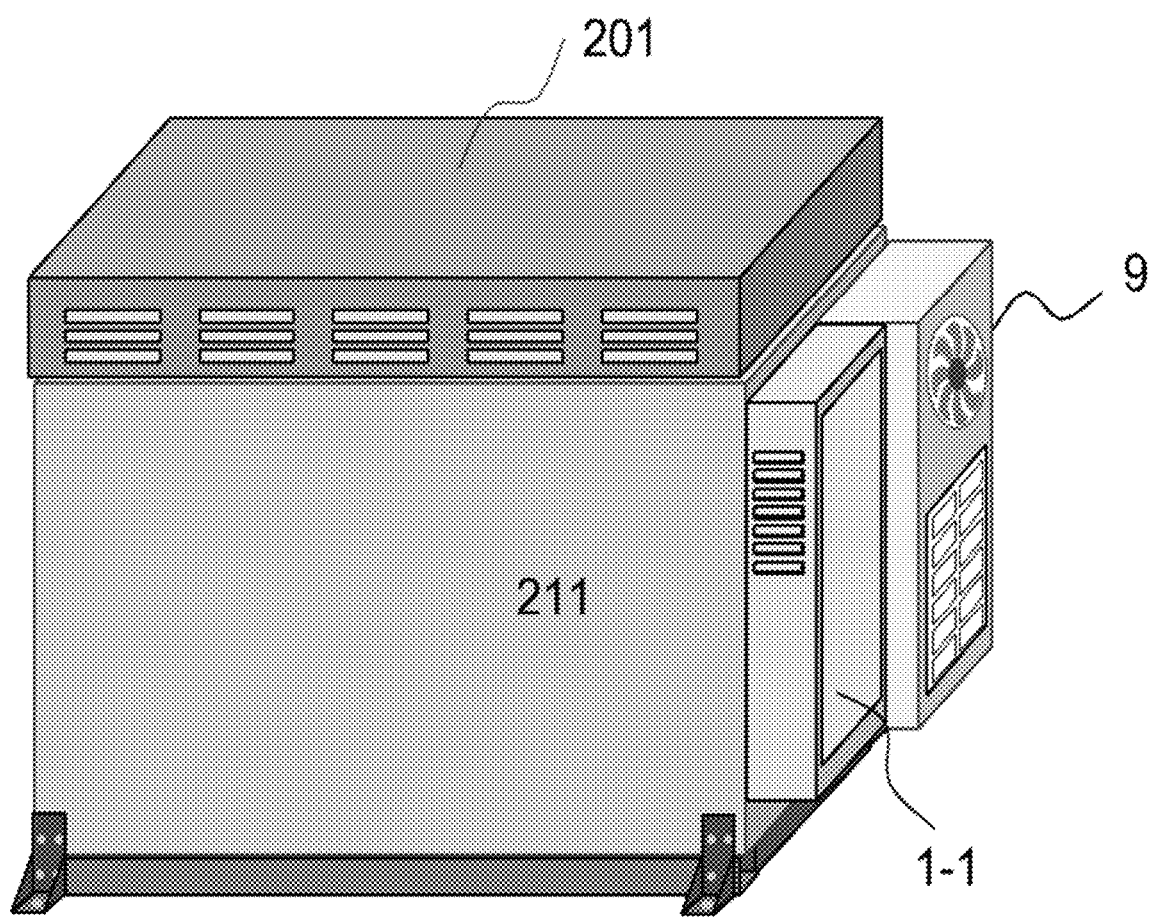
FIGS. 19A and 19B are views schematically illustrating the configurations of the external enclosure including an attached box and a heat exchanger and the attached box for dissipating heat and preventing the introduction of external substances according to the embodiment of the present disclosure.
Figure 19B:
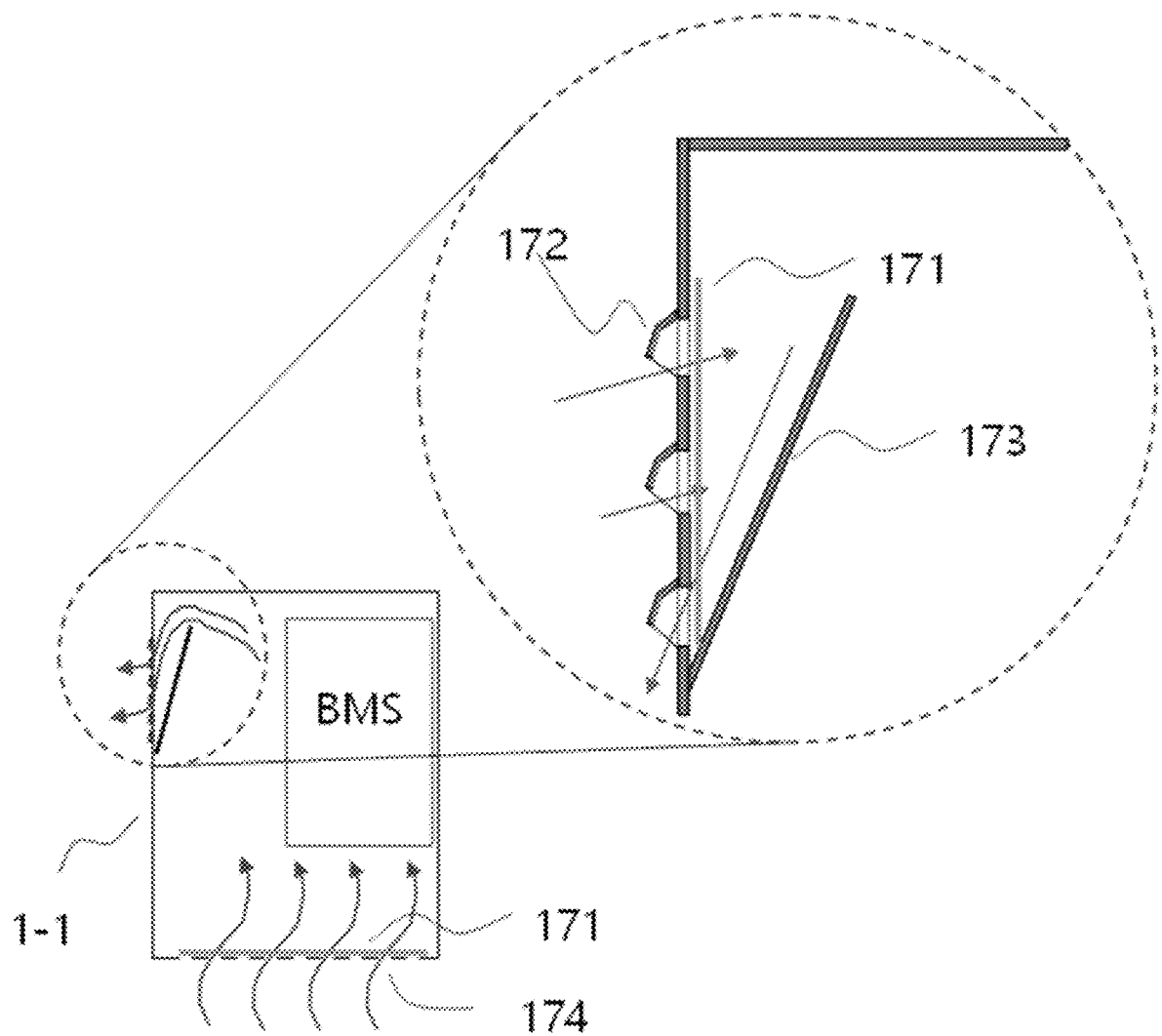

As illustrated in FIGS. 17A and 17B, a maximum friction force may be obtained by creating a conditional equation so that the moment caused by a force pushing the roof is greater than the summation of the moments caused by a roof self weight and a friction force. The friction force can be obtained by a compressive force applied to the nut 1-28 and a metal surface friction coefficient. By putting this relation into the above conditional equation, a maximum compressive force applied to the nut can be obtained as shown in Equation 1 below.

[Equation 1]

$$q*A*x_1 > (2Fr)*x_2 + W*x_1 \quad (1)$$

$$Fr < (q*A*x_1 - W*x_1)/(2*x_2) \quad (2)$$

$$Fr = \mu*N \quad (3)$$

$$N < (q*A*x_1 - W*x_1)/(2*x_2*\mu) \quad (4)$$

Where $q$: bursting pressure $A$: projection area of an enclosure roof $x_1$: distance from the hinge to the center of the roof $x_2$: distance from hinge to the nut in fixing plate $W$: the enclosure roof self weight $Fr$: friction force between fixing plate and nut $\mu$: surface friction coefficient $N$: compressive force to tighten the nut FIGS. 18A, 18B, 19A, and 19B illustrate the main components of the immersion cooling battery system integrated with an enclosure.

As the fluid 3 expands or contracts due to heat generated during battery operation, a pressure difference may occur between the inside and outside of the immersion tank. To manage this pressure difference, the immersion tank is additionally provided with a pressure equalization device 161.

The pressure equalization device controls the inflow and outflow of air by detecting difference between internal and external pressures when pressure inside the immersion tank increases. This is to protect electrical devices in the immersion tank and maintain the structural stability of the immersion tank by preventing overpressure inside the immersion tank due to thermal expansion and contraction of the fluid 3.

In addition, a desiccant for removing moisture is provided in a path through which air moves in the pressure equalization device 161 to remove moisture from air introduced from the outside, thereby protecting internal electrical devices and the fluid 3 from moisture.

In addition, the attached box 1-1, which is located outside the immersion tank and is connected to a side panel 211 of the external enclosure, accommodates power and communication cables, protection equipment and BMS so that the power and communication cables, protection equipment and BMS are separated from the fluid, thereby realizing stable management thereof.

The attached box is attached to the external enclosure side panel 211, and includes an attached box access part 290 having an opening formed in a rear surface of the attached box corresponding to the panel to which the attached box is attached. The access part 290 is located to correspond to the free space D formed in the upper part of the immersion tank so that the power cable and communication cable coming from the immersion tank can be accessed to the inside of the attached box without contamination.

In order to monitor the state of the fluid surface of the immersion tank, a level gauge 162 is installed on one surface of the immersion tank corresponding to the opening.

A plurality of openings 174 are provided on the bottom surface of the attached box 1-1 to allow cold external air to enter the attached box to remove heat from electrical devices within the attached box. In addition, a plurality of louver-type openings 172 is formed in the upper end part of the side surface of the attached box so that air heated after exchanging heat energy is discharged to the outside. A mesh net 171 is provided on the inner surface of the openings to prevent the introduction of external insects or foreign substances. To block rainwater introduced through louver-type upper side openings, a rainwater inflow prevention partition 173 installed slantingly to face the side openings is located inside the attached box.

In addition, the heat exchanger 9 connected to circulation pipes 11 and 12 constituting the external circulation loop which allow the fluid to be introduced into the immersion tank and returned to the outside of the immersion tank so as to exchange heat energy of the circulating fluid is located on the external enclosure side panel 211 to be integrated with the external enclosure.

Next, an example of the immersion cooling battery system integrated with an enclosure specifically implemented according to various configuration examples of the battery system of the present disclosure will be described.

An Embodiment

Figure 20A:
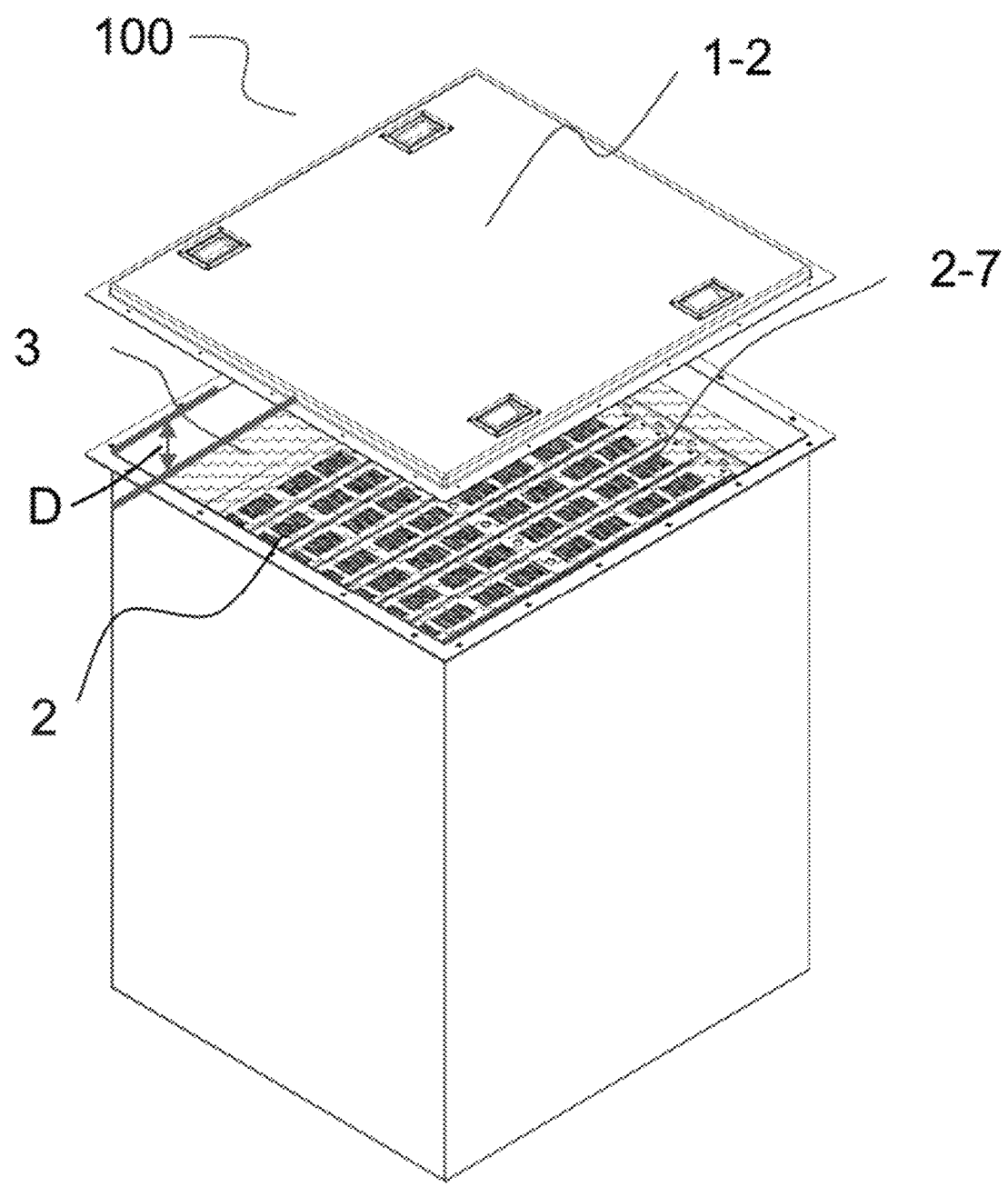
FIGS. 20A, 20B, 20C, and 20D are components of the battery system according to another embodiment of the present disclosure.

As illustrated in FIG. 20A, the battery system of the present disclosure includes the immersion tank 100, which is a battery enclosure, having space in which the battery module 2 accommodating a plurality of battery cells is accommodated and is filled with the fluid 3 having di-electric properties, and an opening and closing upper-end cover 1-2 located on the upper end of the immersion tank so that the battery module can be introduced into the immersion tank.

A plurality of openings 2-6, 2-7, and 2-8 is formed in the outer surface of the battery module 2 so that the fluid can flow in and out of the battery module. The upper part of the immersion tank is provided with the free space defined by the air layer of a predetermined depth D.

Figure 20B:
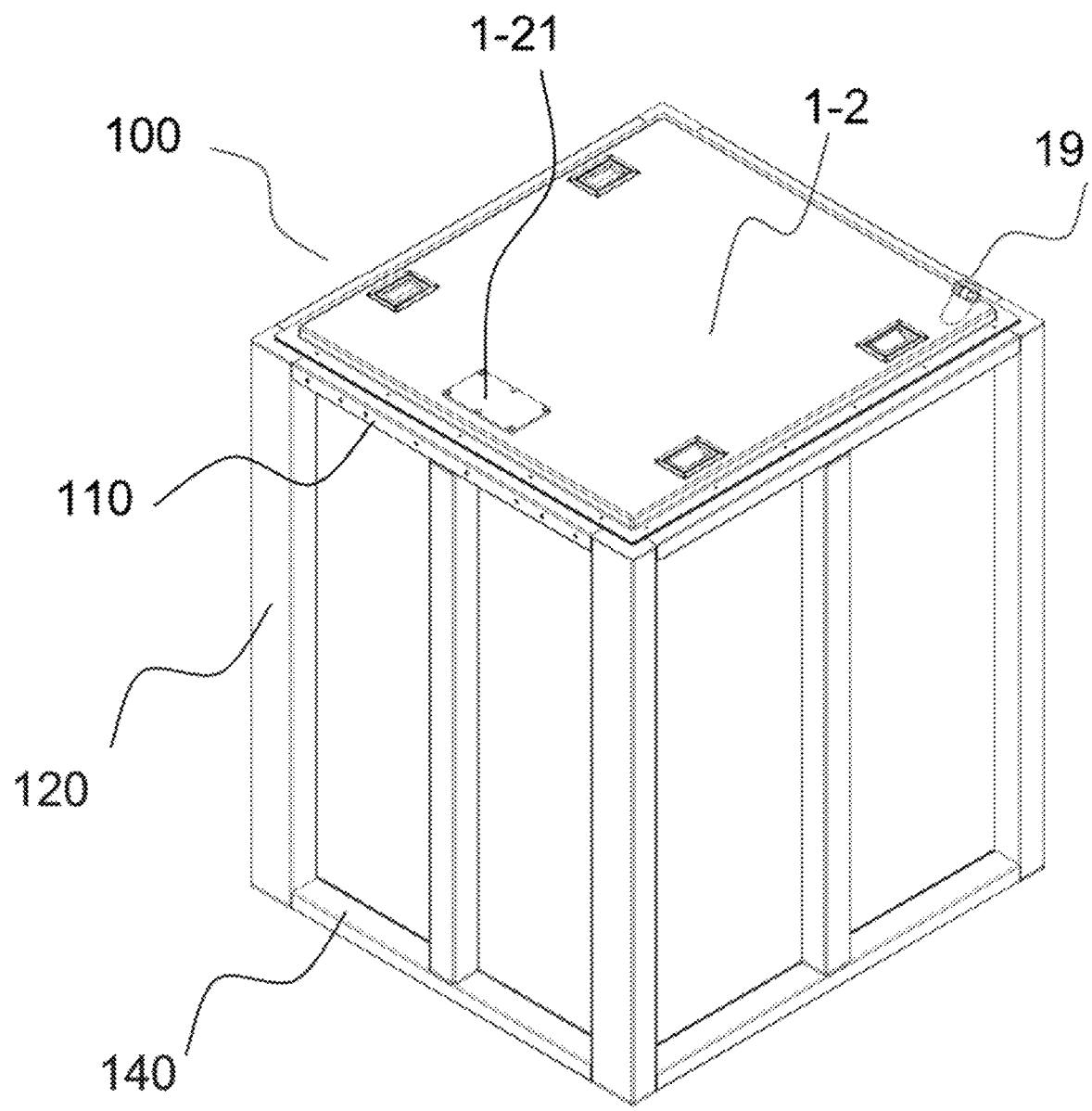

As illustrated in FIG. 20B, in the embodiment of the present disclosure, the immersion tank 100 which is a battery enclosure is surrounded by the vertical and horizontal reinforcement frames 110, 120, and 140 to increase structural safety. Additionally, an immersion tank upper-end cover 1-2 includes the explosion proof disk 1-21 which rapidly discharges gases and pressure that may occur due to a battery cell failure. The explosion proof disk is opened at a predetermined pressure and protects the immersion tank and an electrical device therein.

The immersion tank upper-end cover includes the fueling device 19 so that the fluid 3 is supplied into the tank without opening the tank cover 1-2.

Figure 20C:
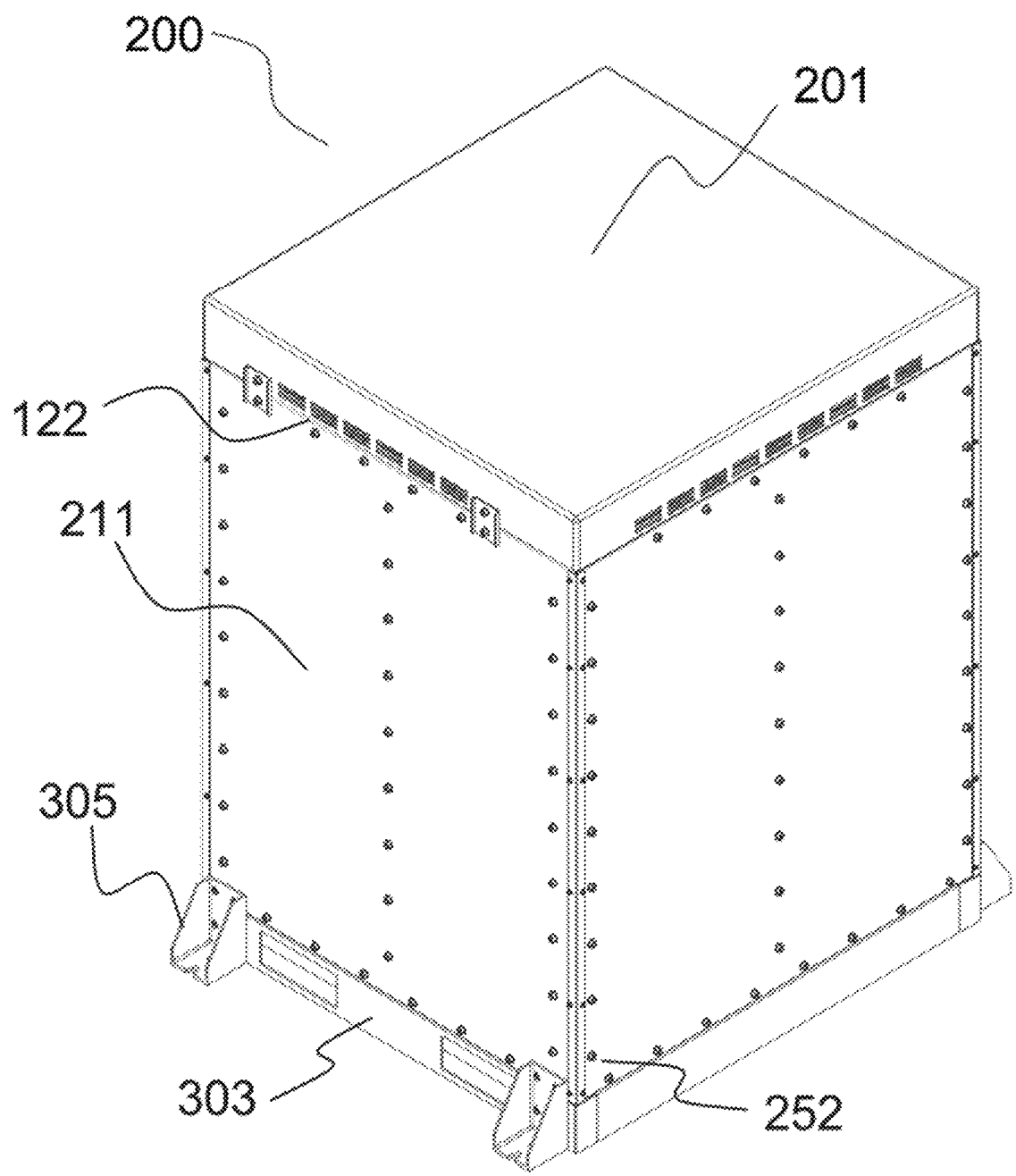

As illustrated in FIG. 20C, in the embodiment of the present disclosure, the frames and the panels 211 surrounding the immersion tank are connected to each other. In this case, the connection of the panels and the frames forms the external enclosure constituting the double-layered enclosure by using the gasket and the coupling member 252. Such configuration functions to protect the immersion tank that accommodates batteries from an external environment (climate and tornado, etc.), and to prevent the contamination of the surrounding environment by confining the fluid leaking from the immersion tank.

Additionally, the external enclosure roof 201 is provided as a removable component on the upper part of the external enclosure to allow access to the inside of the external enclosure when required. The side openings 1-22 are formed in the external enclosure roof to dissipate heat from the internal space heated by the sun.

The external enclosure finally transfers a self-weight thereof to the ground through the base frame 303 and the support foot 305.

Figure 20D:
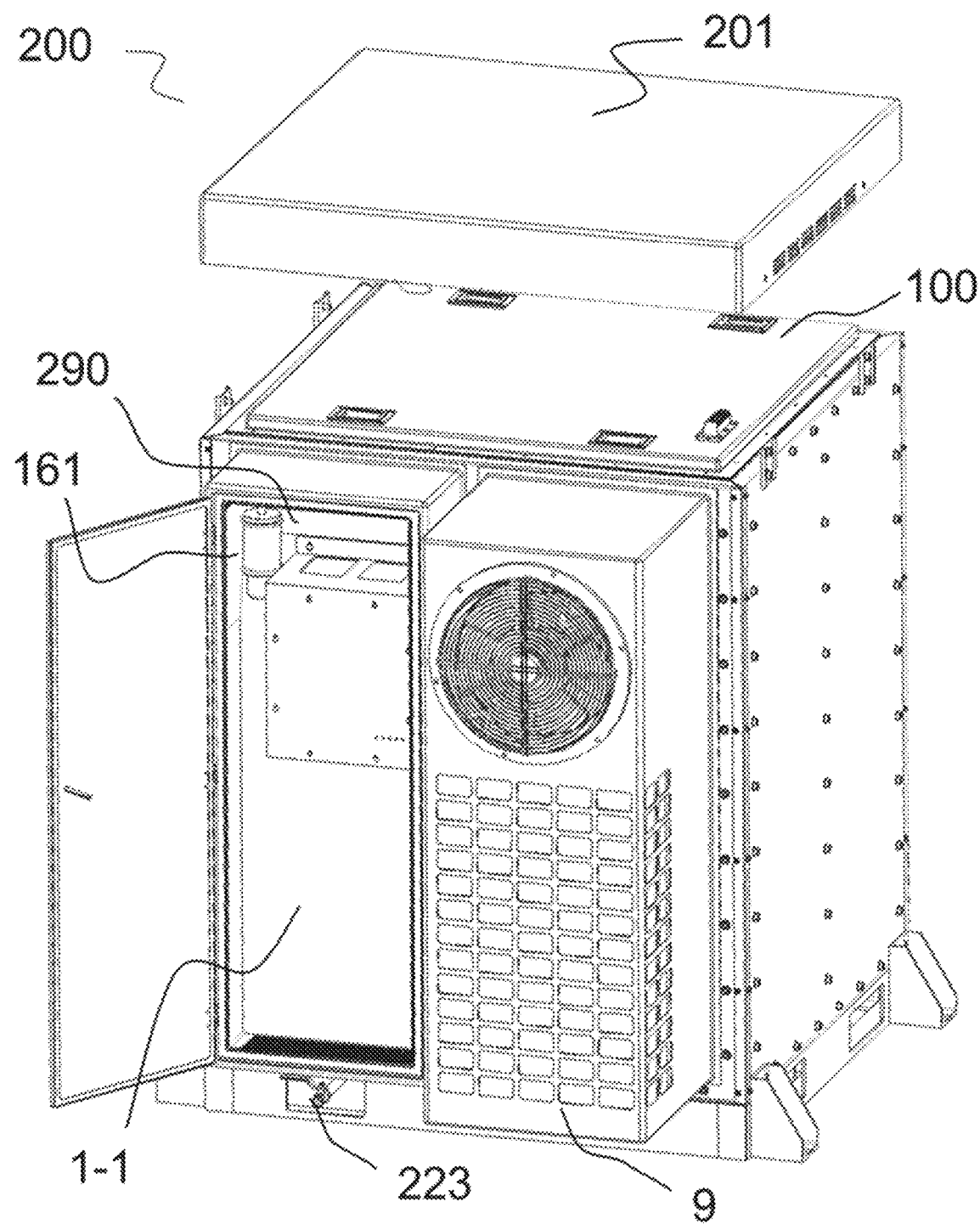

As illustrated in FIG. 20D, the battery system of the embodiment of the present disclosure is configured by integrating the immersion cooling battery system including the attached box 1-1 and the heat exchanger 9 with the external enclosure 200.

The attached box accommodates a BMS and various electrical safety devices, and power and communication cables coming from the battery system inside the immersion tank 100 are connected to various devices within the attached box through the attached box access part 290.

In addition, the battery system of the present disclosure includes the pressure equalization device 161 connected to the free space of the immersion tank and formed in attached space through the attached box access part 290. FIGS. 21A, 21B, 21C, 21D, and 21E, as an embodiment of the present disclosure illustrate the cross section and main components of the external enclosure constituting the double-layered enclosure configured by integrating the immersion cooling battery system and the heat exchanger with each other. In FIGS. 21A, 21B, 21C, 21D, and 21E, for convenience of explanation, some components are omitted.

Figures 21A, 21B, 21C, 21D:
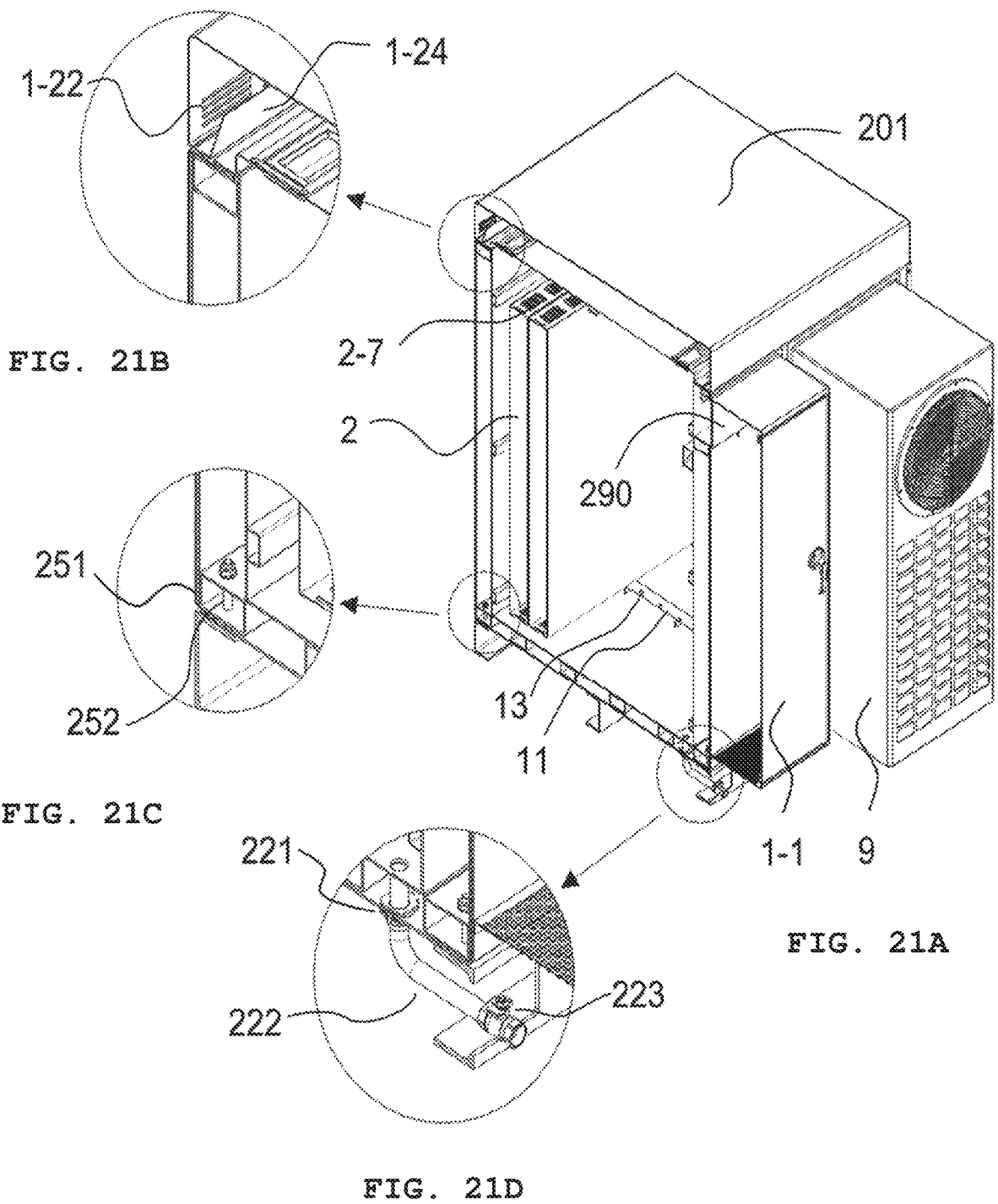
FIGS. 21A, 21B, 21C, 21D, and 21E are the detailed cross sections of the battery system according to the another embodiment of the present disclosure.

As illustrated in FIG. 21A, the inlet distribution pipe 11 having holes 13 of different sizes is located on the bottom surface of the immersion tank located inside the external enclosure so that a fluid introduced into the immersion tank is distributed at an even flow rate.

FIG. 21B is a detailed cross section illustrating the external enclosure roof side openings 1-22, the rainwater inflow prevention partition 1-24, and the drain hole.

FIG. 21C is a detailed cross section illustrating the cross section of the coupling structure of the reinforcement frames 110, 120, and 140 and the external enclosure panels 210 and 211. The external enclosure constituting the double-layered enclosure that protects the immersion tank 100 by compressing the gasket 251 sandwiched between the frames and the panel by using the coupling member 252 is formed.

FIG. 21D is a detailed cross section illustrating the drain pipe 222 composed of the open/close lock valve 223 formed on the bottom of the external enclosure and the tank fitting 221.

Figure 21E:
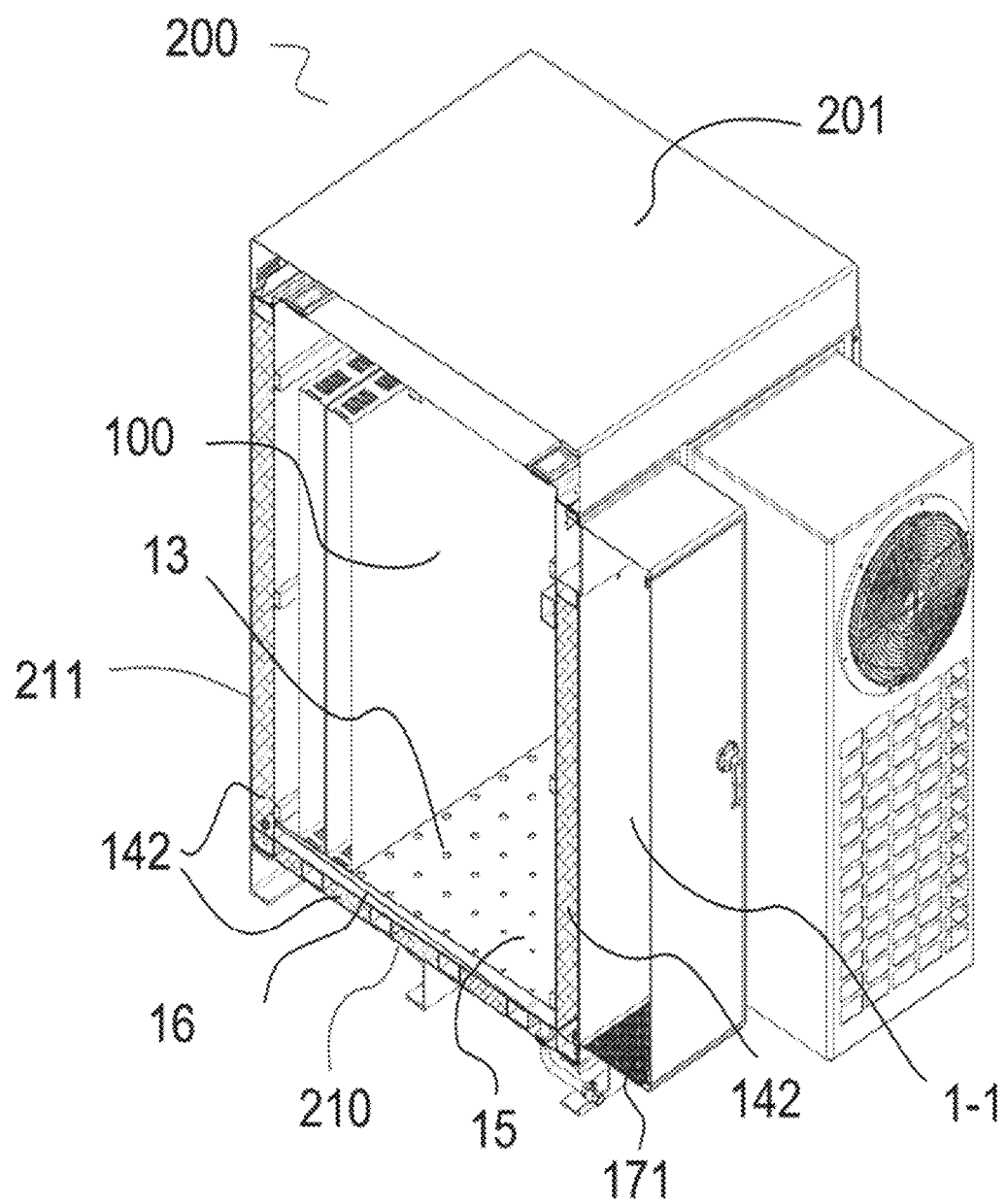

FIG. 21E illustrates the external enclosure 200 having the porous panel 15 and the flow rate control device 16 formed on the lower surface of the immersion tank 100 according to the embodiment of the present disclosure. The internal configuration as described above ensures that a fluid introduced into the tank is distributed at an even flow rate while moving and moves to the upper part of the tank.

In addition, according to the immersion cooling battery system integrated with an enclosure, the insulation material 142 is provided in space defined between the immersion tank 100 and the external enclosure panels 210 and 211 to protect the battery system from an external environment, thereby improving thermal management performance and efficiency.

What is claimed is:
1. An immersion cooling battery system integrated with an enclosure, the battery system comprising:
a battery module configured to accommodate a plurality of battery cells;
a fluid having di-electric properties;
an immersion tank, which is a battery enclosure, having space to accommodate the battery module, with the immersion tank being configured to completely immerse the battery module in the fluid by supplying the fluid into the immersion tank;
a plurality of openings provided in an outer surface of the battery module so that the fluid is capable of flowing in and out of the battery module to be in direct contact with the battery cells;
an opening and closing upper-end cover located on an upper end of the immersion tank so that the battery module is introduced into the immersion tank, and
a free space constituting an air layer of a predetermined depth (D) defined in an inner upper part of the immersion tank;
an external enclosure configured to enclose the immersion tank;
an attached box located on a side surface of the external enclosure and attached to the external enclosure side panel, with the attached box being configured to accommodate a battery management system or other electrical protection devices; and
an attached box access part provided on one surface of the attached box corresponding to an upper part of the external enclosure side panel to which the attached box is attached so that the attached box access part matches a free space constituting an air layer defined in an upper part of the immersion tank, with the attached box access part allowing a power cable and a communication cable coming from the immersion tank to access to an inside of the attached box.

2. The battery system of claim 1, further comprising:
circulation pipes constituting an external circulation loop formed outside the immersion tank to allow the fluid to enter the immersion tank and return to the outside of the immersion tank,
wherein a circulation pump is formed in the external circulation loop so that the fluid is circulated.

3. The battery system of claim 2, wherein a heat exchanger located in a path of the external circulation loop comprises a cooling part configured to cool the circulating fluid.

4. The battery system of claim 3, wherein the heat exchanger comprises a heating part configured to heat the circulating fluid.

5. The battery system of claim 2, further comprising:
an inlet distribution pipe formed on either an upper surface or a lower surface inside the immersion tank, with the inlet distribution pipe being configured to distribute the fluid introduced into the immersion tank by being discharged by the circulation pump discharges inside the immersion tank; and
a suction pipe formed on one remaining surface corresponding to a moving direction of the introduced fluid, with the suction pipe being configured to suction the fluid inside the immersion tank and return the fluid to the circulation pump,
wherein a plurality of holes of different sizes are formed in series in each of the inlet distribution pipe and the suction pipe in a longitudinal direction thereof so that the fluid is distributed or suctioned at an even flow rate.

6. The battery system of claim 2, further comprising:
a porous panel formed on a lower surface inside the immersion tank and having a plurality of holes, the porous panel allowing the fluid in the immersion tank to be evenly distributed and moved inside the immersion tank.

7. The battery system of claim 6, wherein a flow rate control device is formed under the porous panel by slanting gradually toward a stop end of the flow rate control device from a start end thereof so that the fluid is distributed at an even flow rate.

8. The battery system of claim 1, further comprising:
a level gauge formed on an outer side surface of the immersion tank so that a position of a surface of the fluid in contact with a lower surface of the free space is checked from the outside without opening an immersion tank upper-end cover.

9. The battery system of claim 8, further comprising:
an explosion proof disk located on the immersion tank upper-end cover and opened at a predetermined pressure so as to protect the immersion tank and electrical devices in the immersion tank by discharging gas and pressure released due to failures of the battery cells.

10. The battery system of claim 1, further comprising:
a plurality of reinforcement frames attached at predetermined positions around the immersion tank to structurally reinforce the immersion tank; and
external enclosure bottom and side panels coupled to outer side surfaces of the reinforcement frames to define space between the panels and the internal enclosure.

11. The battery system of claim 10, further comprising:
a level gauge configured to measure a level of a surface of the fluid in the immersion tank; and
a heat exchanger located on one side surface of the external enclosure in a path of an external circulation loop formed outside the immersion tank allowing the fluid to enter the immersion tank and returns to the outside of the immersion tank, with the heat exchanger being configured to exchange heat energy of the circulating fluid.

12. The battery system of claim 11, further comprising:
a plurality of lower openings provided in a bottom surface of the attached box so that cold outside air is introduced into the attached box through the lower openings to remove heat from an electrical device in the attached box;
a plurality of louver-type upper side openings formed in an upper end of a side surface of the attached box so that air heated after exchanging heat energy is discharged out of the attached box;
a mesh net provided on each of inner surfaces of the louver-type upper side openings and the lower openings to prevent introduction of external insects or foreign substances through the openings; and
a rainwater inflow prevention partition provided slantingly along the inner surface of the louver-type upper side openings to block rainwater introduced inward through the louver-type upper side openings.

13. The battery system of claim 10, further comprising:
a drain pipe formed on a bottom surface of the immersion tank so as to drain the fluid accommodated in the immersion tank to an outside thereof; and
a tank fitting configured to couple the drain pipe with an opening of the external enclosure bottom panel,
wherein an open/close lock valve is provided on an end of the drain pipe, and
the drain pipe protrudes outward from the external enclosure through the opening of the external enclosure bottom panel formed at a position corresponding to the bottom surface of the immersion tank on which the drain pipe is formed.

14. The battery system of claim 10, further comprising:
a fuel port provided on the opening and closing upper-end cover of the immersion tank to supply the fluid into the immersion tank.

15. The battery system of claim 10, further comprising:
an external enclosure roof provided on an upper end of the external enclosure to allow access into the external enclosure.

16. The battery system of claim 15, further comprising:
a plurality of openings provided along a side surface of the external enclosure roof to discharge pressure and gas discharged from the explosion proof disk to the outside;
a mesh net provided on an inner surface of the openings so as to prevent introduction of external insects or foreign substances through the openings;
a rainwater inflow prevention partition provided slantingly along the inner surface of the openings so that rainwater introduced through the openings is prevented from being introduced inward; and
a drain hole configured to discharge raindrops collected by being blocked by the rainwater inflow prevention partition to the outside of the external enclosure.

17. The battery system of claim 15, further comprising:
a hinge configured to couple one side surface of the external enclosure roof to the external enclosure side panel;
a fixing plate provided on each of opposite side surfaces of the external enclosure;
a bolt fixed on a surface of the external enclosure roof at a position corresponding to the fixing plate;
a groove formed in the fixing plate along a path H through which the bolt moves while the external enclosure roof opens relative to the hinge; and
a nut configured to compress the fixing plate by being coupled to the bolt and to slide along the groove of the fixing plate while the external enclosure roof is opened,
wherein a force N applied to the nut configured to compress the fixing plate so that the external enclosure roof is opened by pressure released from the explosion proof disk satisfies Equation 1 below,
wherein

[Equation 1]

$$q*A*x_1 > (2Fr)*x_2 + W*x_1 \quad (1)$$

$$Fr < (q*A*x_1 - W*x_1)/(2*x_2) \quad (2)$$

$$Fr = \mu*N \quad (3)$$

$$N < (q*A*x_1 - W*x_1)/(2*x_2*\mu) \quad (4)$$

Where q: bursting pressure
A: projection area of an enclosure roof
$x_1$: distance from hinge to the center of the roof
$x_2$: distance from hinge to the nut in fixing plate
W: the enclosure roof self weight
Fr: friction force between fixing plate and nut
μ: surface friction coefficient
N: compressive force to tighten the nut.

18. The battery system of claim 10, further comprising:
an explosion proof disk provided on the opening and closing upper-end cover of the immersion tank and configured to open at a predetermined pressure to protect the immersion tank and the devices inside by discharging gas and pressure released due to failed battery cells located inside the immersion tank.

19. The battery system of claim 18, further comprising:
a plurality of openings provided along a side surface of the external enclosure roof to discharge pressure and gas discharged from the explosion proof disk to the outside;
a mesh net provided on an inner surface of the openings so as to prevent introduction of external insects or foreign substances through the openings;
a rainwater inflow prevention partition provided slantingly along the inner surface of the openings so that rainwater introduced through the openings is prevented from being introduced inward; and
a drain hole configured to discharge raindrops collected by being blocked by the rainwater inflow prevention partition to the outside of the external enclosure.

20. The battery system of claim 18, further comprising:
a hinge configured to couple one side surface of the external enclosure roof to the external enclosure side panel;
a fixing plate provided on each of opposite side surfaces of the external enclosure;
a bolt fixed on a surface of the external enclosure roof at a position corresponding to the fixing plate;
a groove formed in the fixing plate along a path H through which the bolt moves while the external enclosure roof opens relative to the hinge; and
a nut configured to compress the fixing plate by being coupled to the bolt and to slide along the groove of the fixing plate while the external enclosure roof is opened,
wherein a force N applied to the nut configured to compress the fixing plate so that the external enclosure roof is opened by pressure released from the explosion proof disk satisfies Equation 1 below,
wherein

[Equation 1]

$$q*A**x_1 > (2Fr)*x_2 + W*x_1 \quad (1)$$

$$Fr < (q*A*x_1 - W*x_1)/(2*x_2) \quad (2)$$

$$Fr = \mu*N \quad (3)$$

$$N < (q*A*x_1 - W*x_1)/(2*x_2*\mu) \quad (4)$$

Where q: bursting pressure
A: projection area of an enclosure roof
$x_1$: distance from hinge to the center of the roof
$x_2$: distance from hinge to the nut in fixing plate
W: the enclosure roof self weight
Fr: friction force between fixing plate and nut
μ: surface friction coefficient
N: compressive force to tighten the nut.

21. The battery system of claim 10, further comprising:
gaskets sandwiched between the reinforcement frames and the panels,
wherein the external enclosure constituting a double-layered enclosure is formed by coupling the panels, the reinforcement frames, and the gaskets to each other by coupling members so that contact surfaces between the panels, the reinforcement frames, and the gaskets are compressed.

22. The battery system of claim 10, further comprising:
an insulation material accommodated in an empty space defined between the immersion tank and external enclosure panels so as to block introduction of external heat.

23. The battery system of claim 10, further comprising:
a pressure equalization device installed on a side wall of the immersion tank to match a free space defined as an air layer in the upper part of the immersion tank, configured to equalize a pressure difference caused by the thermal expansion and contraction of the fluid, and a desiccant provided in the pressure equalization device to remove moisture from the air introduced from the outside during the pressure difference equalization.

\* \* \* \* \*